United States Patent [19]

Sakai et al.

[11] Patent Number: 5,680,525

[45] Date of Patent: Oct. 21, 1997

[54] THREE-DIMENSIONAL GRAPHIC SYSTEM WITH AN EDITOR FOR GENERATING A TEXTRUE MAPPING IMAGE

[75] Inventors: Toshio Sakai, Katsuta; Atsushi Kawabata, Hitachi; Norito Watanabe, Hitachi; Tsugio Tomita, Hitachi; Akihiro Sakamoto, Hitachi, all of Japan

[73] Assignee: Hitachi, Ltd., Tokyo, Japan

[21] Appl. No.: 926,518

[22] Filed: Aug. 10, 1992

[30] Foreign Application Priority Data

Aug. 8, 1991 [JP] Japan ................................. 3-199155
Aug. 9, 1991 [JP] Japan ................................. 3-200586
Nov. 21, 1991 [JP] Japan ................................. 3-305836

[51] Int. Cl.$^6$ ................................................... G06T 17/00
[52] U.S. Cl. ............................................. 395/130; 395/120
[58] Field of Search ................................. 395/125, 126, 395/129–132, 141–143, 121, 122, 119, 120, 150, 151, 133, 135, 167, 171

[56] References Cited

U.S. PATENT DOCUMENTS

| | | | |
|---|---|---|---|
| 3,418,459 | 12/1968 | Purdy et al. | 395/125 |
| 4,918,626 | 4/1990 | Watkins et al. | 395/121 |
| 4,949,286 | 8/1990 | Ohba | 395/125 |
| 4,994,989 | 2/1991 | Usami et al. | 395/131 |
| 5,367,736 | 11/1994 | Kato et al. | 395/120 X |

OTHER PUBLICATIONS

Snider et al, "Super Paint", 1987, Part 2, pp. 15–18.
"Macintosh System Software User's Guide", 1988, p. 135.
Kato "Various Representation Techniques used for CG Picture Production–Centered Around Mapping" Mar. 1988.
Ohta, et al. "Applied Graphics" Feb. 11, 1988.
Renderman® Companion, 1990, pp. 241–271, by S. Upstill.
Pyramidal Parametrics, Siggraph83 Proceedings, vol. 17, No. 3 Jul. 1983, by L. Williams.
Solid Texturing of Complex Surface, Siggraph85 Proceedings, vol. 19, No. 3, Jul. 1985.
Applied Graphics, by Ohta, Takeucchi & Ohguchi. 1988.
One Technique of Environmental Mapping, 42nd National meeting of the Institute of Informaiotn Processing, 2–287 (1990), by Shiono & Kohno.
Steve Upstill, "Renderman Companion", 1990, pp. 241–271.
Toshiaki Kato, "Various Expressing Techniques For Use In CG Image Production–Centering Around Mapping", Pixel, Sections 51–58.
Lance Williams, "Pyramidal Parametrics", vol. 17, No. 3, Jul. 1983.
D. Peachey, "Solid Texturing Of Complex Surface", Siggraph85 Proceedings, vol. 19, No. 3, Jul. 1985.
Shiono et al., "One Technique of Environmental Mapping", 42nd National Meeting of the Institute of Information Processing, 2–287 (1990).

Primary Examiner—Almis R. Jankus
Attorney, Agent, or Firm—Antonelli, Terry, Stout & Kraus, LLP.

[57] ABSTRACT

A three-dimensional graphic system includes a scene origination equipment, a rendering apparatus and a display device. The user interface unit of the scene origination equipment displays on the display screen of the display device. The user interface unit of the scene origination equipment displays on the display screen of the display device a graph which represents the relationship between a distance from a point generated with a cursor and the density of the generated point. The setting of the shape of the displayed graph is accepted on the display screen, and the relationship between the distance from the generated point of the cursor and the density of the generated point is determined in accordance with the accepted setting of the shape of the graph. The image generation unit of the scene origination equipment displays the cursor on the display screen, and generates an image in which the point generated with the cursor and points vicinal to the generated point are drawn at densities conforming to the determined relationship. The rendering apparatus generates a video graphic in which the generated image is mapped on an object and displays the video graphic on the display screen.

27 Claims, 35 Drawing Sheets

FIG. 11(a)
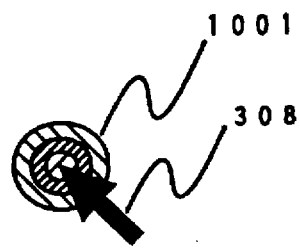
FIG. 11(b)
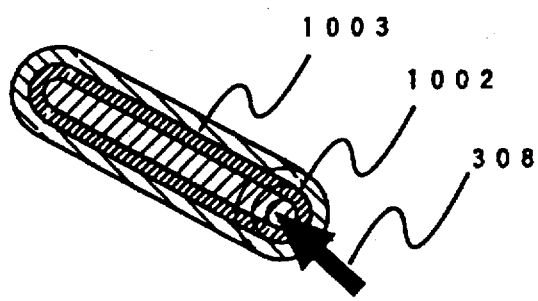
FIG. 11(c)
FIG. 11(d)
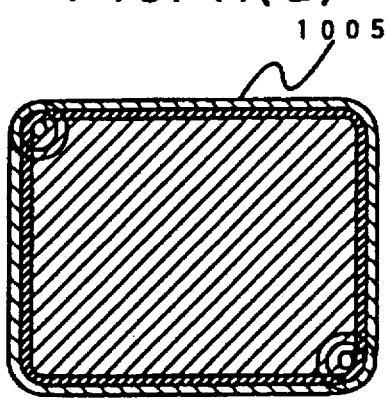
FIG. 11(e)
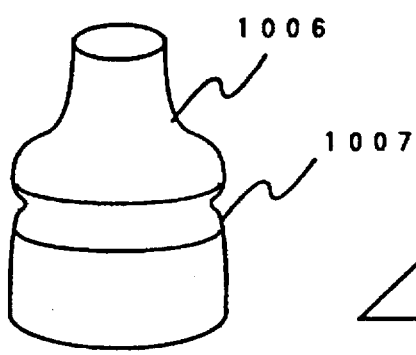
FIG. 11(f)
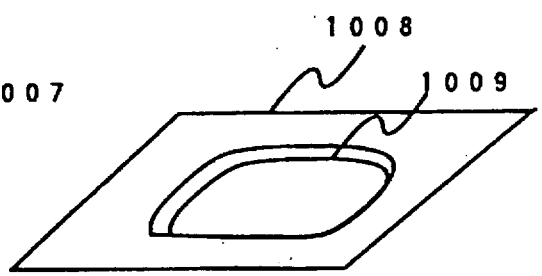

FIG. 12

SIZE OF IMAGE IW ☐
IH ☐

GENERATED PATTERN — 1102

SIZE OF TILE — REFERENCE VALUE / VARIANCE VALUE

WIDTH W ☐ We ☐
HEIGHT H ☐ He ☐

THICKNESS OF EDGE E ☐ — 1106

SHIFT OF LATERAL REFERENCE POSITION — REFERENCE VALUE / VARIANCE VALUE
S ☐ Se ☐

TILE PATTERN OF ONE CYCLE Nx ☐ — 1110

Ny ☐ — 1111

VARIANCE VALUE OF REFERENCE COLOR ☐ — 1112
VARIANCE VALUE OF NOISE COMPONENT ☐ — 1113

COLOR OF EDGE — REFERENCE VALUE / VARIANCE VALUE
☐ 1114   ☐ 1115

[ CANCEL ]  1116      [ OK ]  1117

IMAGE AREA

PATTERN DOMAIN

THREE-DIMENSIONAL GRAPHIC SYSTEM WITH AN EDITOR FOR GENERATING A TEXTRUE MAPPING IMAGE

BACKGROUND OF THE INVENTION

The present invention relates to technology for displaying patterns. More particularly, it relates to techniques for generating three-dimensional graphics.

In conventional three-dimensional graphic systems, a three-dimensional object given in the form of, e.g., a surface model or a solid model is endowed with brightness levels and colors to give a more realistic effect of volume by an operation called "rendering".

One sort of rendering is texture mapping.

In general, texture mapping signifies a technique in which an image having, e.g., a complicated pattern is not defined in three dimensions, but it is displayed by pasting a generated image of two dimensions on the surface of the three-dimensional object as a texture. The details of this technique are discussed in, for example, "Steve Upstill: RenderMan™ Companion", 1990, pp. 241–271 (Japanese version: "Invitation to Practical CG" published by Kyoritu Shuppan K. K., 1991, pp. 239–271). Also known as of the texture mapping techniques are ones stated in, for example, "Toshiaki Kato: 'Various Expressing Techniques for Use in CG Image Production—Centering around Mapping', Pixel, Sections 51 thru 58" and "Lance Williams: 'Pyramidal Parametrics', SIGGRAPH83 Proceedings, Vol. 17, No. 3, July 1983".

Methods of generating the image to be used as the texture in the mapping include method in which the data of an actual material are input from and a scanner or the like, a method in which data are originated by an existing image editor.

There has been known a technique in which the texture is pasted on the object as if a scene surrounding the object were mirrored thereon. This technique is called "environmental mapping". With environmental mapping, images to be mirrored need to be prepared as textures beforehand. In a prior-art method for environmental mapping, images in the six directions of up, down, right, left, forward and backward as viewed from the central coordinate point of the object are generated as six textures. Herein, the six textures are changed-over considering the directions of reflection and are passed on the object.

Further, as a process for patterning the surface of the three-dimensional object, there has been known the technique of functional mapping stated in "Darwyn R. Peachey: 'Solid Texturing of Complex surface', SIGGRAPH85 Proceedings, Vol. 19, No. 3, July 1985".

In the case of pasting the image on the object, the two-dimensional coordinate values U and V of the image are located on the surface of the object, whereupon the image is pasted. As a method of locating the coordinate values U and V, there has heretofore been known one in which coordinate values are allotted to the latitude and longitude of a polar coordinate system, one in which coordinate values are allotted to the longitude and height of a cylindrical coordinate system, or one in which coordinate values are allotted to the X and Y coordinates of a rectangular coordinate system.

Another sort of rendering is a process which generates a video graphic in such a manner that the three-dimensional object is photographed by an assumed camera in an assumed three-dimensional space. This process can be divided into hidden-surface removal and shading. The hidden-surface removal is a process in which only a part seen from the camera is drawn. The shading is a process in which the intensities of light reaching the camera are calculated from the optical attribute data of subjects. In general, the video graphic generation process expends most of its time on the hidden-surface removal.

Regarding the hidden-surface removal, as explained in "Ohta, Takeuchi and Ohguchi: Applied Graphics", ASCII Shuppan (1986), there have been known processing methods such as ray tracing, in each of which the intersection points between assumed light rays and objects are calculated, and methods, such as Z buffer and scan line methods, in each of which objects are processed on a screen.

Ray tracing is a technique where the light ray is stretched from a visual point toward each pixel, and that the object against which the light ray collides first is set as the subject which is to be drawn at the pixel. Reflection and refraction, for example, which are the optical attributes of the subject can also be expressed by similarly stretching the reflected and refracted light rays from the subject so as to determine the color of the subject. In this manner, the ray tracing method can precisely express the mirrored situation of the surrounding scene or subjects based on the reflection and refraction.

The Z buffer method is a process where that the subject is projected on the assumed camera screen, and that the colors of pixels existing within the projected subject are determined. Therefore, the same processing can be avoided within the projected subject.

The above methods of generating the three-dimensional graphics have disadvantages as stated below.

Regarding the generation of the image for use in texture mapping, it is impossible to express an image containing noise or delicate variation of color.

Regarding texture mapping, the following problems have been encountered:

In the environmental mapping operation, there is a method of mapping the six textures while being changed-over in accordance with the directions of reflection. This leads to the problem that the management of image data for the textures is complicated.

With the conventional mapping technique, in a case where the pasting of the images has been instructed by the use of the two-dimensional rectangular coordinate system with the intention of pasting the textures so as to confront the respective faces of a rectangular parallelepiped by way of example, there occurs the problem that the images of the side faces of the rectangular parallelepiped to be pasted run or ooze in the shape of striped patterns.

According to the texture mapping technique in the conventional mapping technique, the images prepared beforehand are used as the textures. This incurs the problem that, when a pattern to be bestowed on the three-dimensional object is enlarged, the image quality of a displayed pattern degrades to give a rough appearance.

More specifically, since the images originated beforehand have a fixed resolution, the enlargement of the pattern gives rise to a coarse grained effect, which roughens the image quality and deprives contour lines etc. of smoothness. On the other hand, when a smoothing filtering process or the like is performed in order to smooth the contour lines etc., the image quality degrades and becomes obscure.

This problem can be avoided by ensuring that the resolution of the images to be used as originals is previously set high in conformity with the largest pattern which might be used. This measure, however, leads to the problem that the quantity of data increases.

Moreover, according to the texture mapping technique in conventional systems, the image data prepared beforehand are employed for the textures. In this regard, images usually have large quantities of data. Therefore, when a variety of patterns are to be used, there occurs the problem that an enormous memory capacity is necessitated for storing the image data.

In the case of the functional mapping technique, it is very difficult to express irregular patterns such as characters, or a variety of patterns.

Regarding the processes of hidden-surface removal and shading, the ray tracing needs to perform the calculations for the respective light rays and accordingly for the individual pixels independently of one another. This incurs the problems of large quantities of computations and slow processing.

Meanwhile, as stated in "Shiono and Kohno: 'One Technique of Environmental Mapping', 42nd National Meeting of the Institute of Information Processing, 2-287 (1990)", a mapping technique such as environmental mapping must be employed in order to express reflection and refraction, the optical attributes of a subject, by means of the Z buffer method. However, the reflection and refraction expressed by environmental mapping are only simulated and are not totally accurate.

SUMMARY OF THE INVENTION

The present invention therefore has for its object the provision of an image generation method which can originate a delicate gradated image with ease.

In particular, the present invention has for its object the provision of an image generation method which can originate natural and various recurrent patterns with the instructions of a small number of data.

Another object of the present invention is to originate textures so that environmental mapping can be realized with only one texture.

Still another object of the present invention is to map a texture onto an object so that a pattern may be prevented from running or oozing even when the direction of mapping the texture and the face of the object define a wide angle, for example, when they are perpendicular to each other.

Yet another object of the present invention is to provide an image processing method in which a three-dimensional object to have images generated therefor can be endowed with a variety of patterns with high image qualities and in desired sizes on the basis of a small quantity of data.

A further object of the present invention is to quickly generate a real video graphic with the optical attribute data of subjects mirrored precisely, in the case of generating the video graphic from a database which concerns the subjects constituting an assumed three-dimensional space. That is, it is a further object to realize a high-speed rendering operation which includes a hidden-surface removal process and a shading process.

In order to accomplish these objects, regarding the generation of images for use in mapping, the present invention provides various image generation methods, e.g., an image generation method comprising the density determination step of determining a relationship between a density and a distance from a point to be instructed by a cursor; and the drawing step of generating an image in which the point instructed by the cursor and points vicinal to the instructed point are drawn at the density conforming to the determined relationship.

In addition, regarding texture mapping, the present invention provides, e.g., a three-dimensional graphic generation method wherein a two-dimensional image is mapped on a surface of a three-dimensional object, and a photographed image of the three-dimensional object with the two-dimensional image mapped thereon, the photographed image being supposed to be formed on an assumed camera screen, is generated; comprising the step of determining a resolution of the two-dimensional image to-be-mapped in accordance with a positional relationship between the assumed camera screen and the three-dimensional object; the step of accepting vector representation data which stipulate an image pattern of two dimensions; the step of generating the two-dimensional image of the determined resolution from the image pattern which is stipulated by the accepted vector representation data; the step of mapping the generated two-dimensional image on the surface of the three-dimensional object; and the step of generating the photographed image of the three-dimensional object with the two-dimensional image mapped thereon, the photographed image being supposed to be formed on the assumed camera screen.

Besides, regarding hidden-surface removal and shading, the present invention provides a three-dimensional graphic generation method wherein a photographed image is generated of a three-dimensional object which is arranged in an assumed three-dimensional space and which is stipulated by a definition of the three-dimensional object as well as definitions of optical characteristics. The photographed image is supposed to be formed on an assumed camera screen arranged in the three-dimensional space. The method comprises the step of deciding depths of respective points on surfaces of the three-dimensional objects relative to the camera screen from the definitions of shapes of the three-dimensional objects, thereby obtaining those points of the three-dimensional object surface which are to be photographed on the camera screen; and the step of finding colors of the obtained points of the three-dimensional object surface to be photographed on the camera screen, with ray tracing.

BRIEF DESCRIPTION OF THE DRAWINGS

FIGS. 11(a) thru 11(f) are diagrams showing images which are generated with a penpoint;

FIG. 12 is a diagram showing the displayed contents of a tile pattern generation window;

DETAILED DESCRIPTION OF THE PREFERRED EMBODIMENTS

Now, an embodiment of a three-dimensional graphic generation system according to the present invention will be described.

Figure 1:
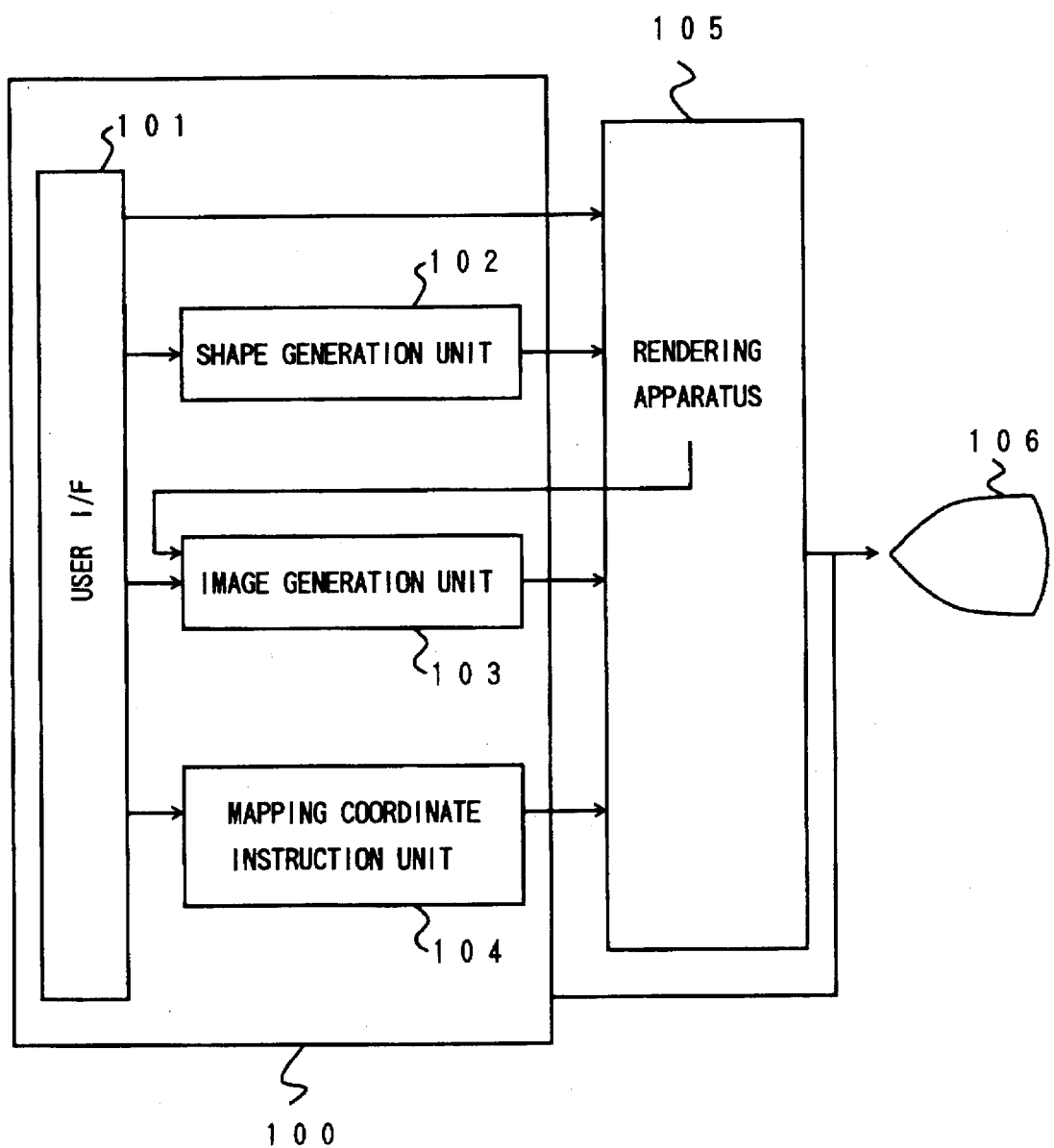
FIG. 1 is a diagram showing the architecture of a three-dimensional graphic system according to an embodiment of the present invention.

FIG. 1 illustrates the architecture of the three-dimensional graphic generation system according to this embodiment.

As shown in the figure, the three-dimensional graphic generation system in this embodiment comprises a scene generation apparatus 100, a rendering apparatus 105 and a display device 106.

The scene origination apparatus 100 accepts instructions and data interactively from a user, whereupon it generates information items on the shape of a three-dimensional object, an image (texture) to be mapped onto the three-dimensional object and the actual mapping onto the three-dimensional object and delivers them to the rendering apparatus 105.

The rendering processor 105 performs the mapping, hidden-surface removal and shading on the basis of the information items delivered from the scene origination apparatus 100, to generate a three-dimensional graphic and to display it on the display device 106.

First, the scene origination apparatus 100 will be explained.

As shown in FIG. 1, the scene origination apparatus 100 includes a user interface unit 101, a shape generation unit 102, an image generation unit 103 and a mapping coordinate instruction unit 104. The user interface unit 101 is furnished with a keyboard and a mouse.

The shape generation unit 102 accepts the instructions and data interactually from the user through the user interface unit 101, and generates the information on the three-dimensional object. The image generation unit 103 accepts the instructions and data interactively from the user through the user interface unit 101, and generates the information on the image to be mapped onto the three-dimensional object. The mapping coordinate instruction unit 104 accepts the instructions and data interactually from the user through the user interface unit 101, and generates the information on the mapping of the image onto the three-dimensional object. The generated information items are delivered to the rendering apparatus 105.

Figure 2:
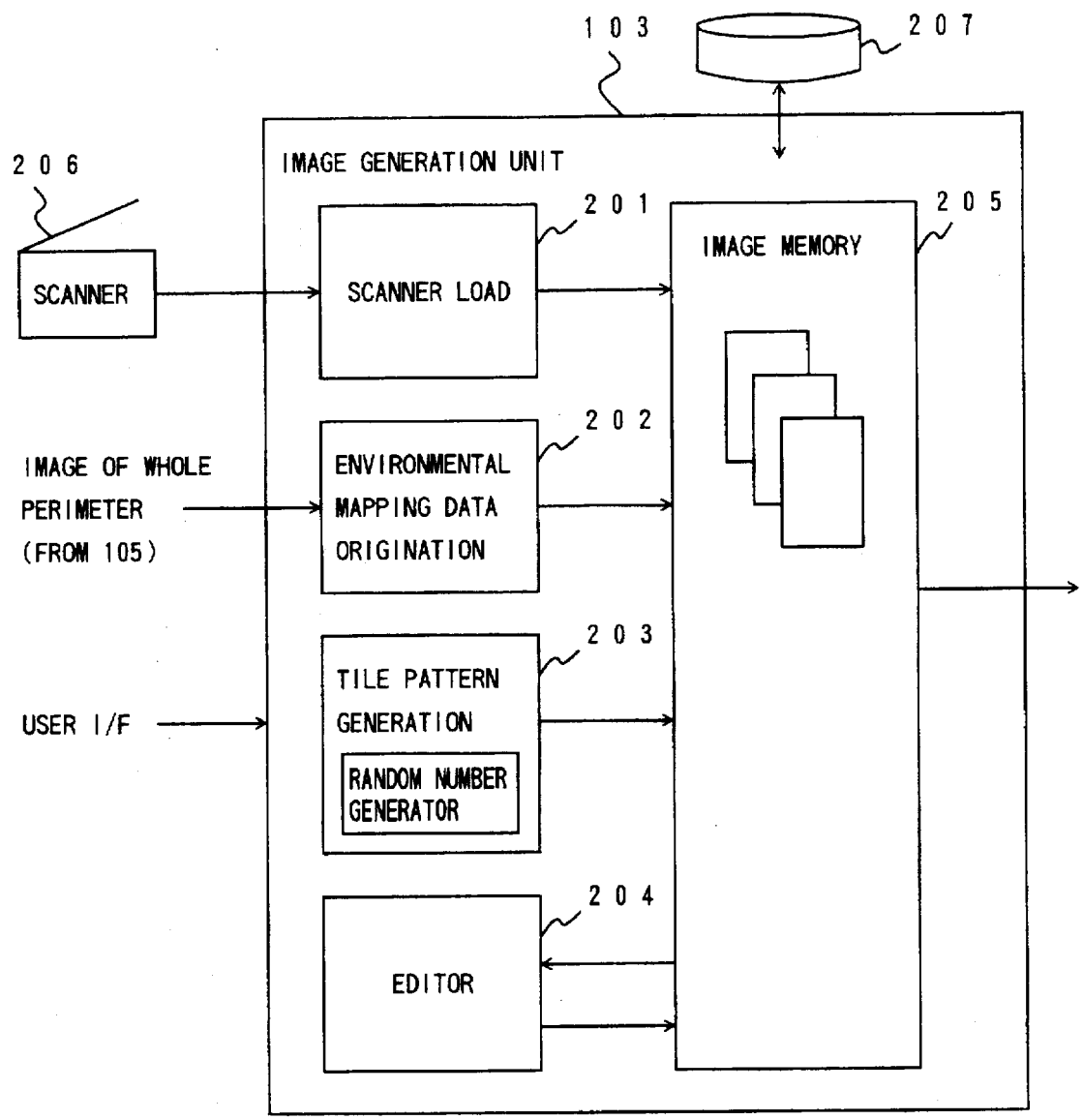
FIG. 2 is a diagram showing the internal construction of an image generation unit.

FIG. 2 is a diagram showing the internal construction of the image generation unit 103 depicted in FIG. 1. The image generation unit 103 includes a scanner loader 201, an environmental mapping data originator 202, a tile pattern generator 203, an editor 204 and an image memory 205. An external scanner 206 is connected to the scanner loader 201. The environmental mapping data originator 202 receives the image data of the whole perimeter from the rendering processor 105 shown in FIG. 1. The tile pattern generator 203 has a built-in random number generator. The image memory 205 accumulates images to-be-mapped. Numeral 207 denotes an external memory.

Figure 3:
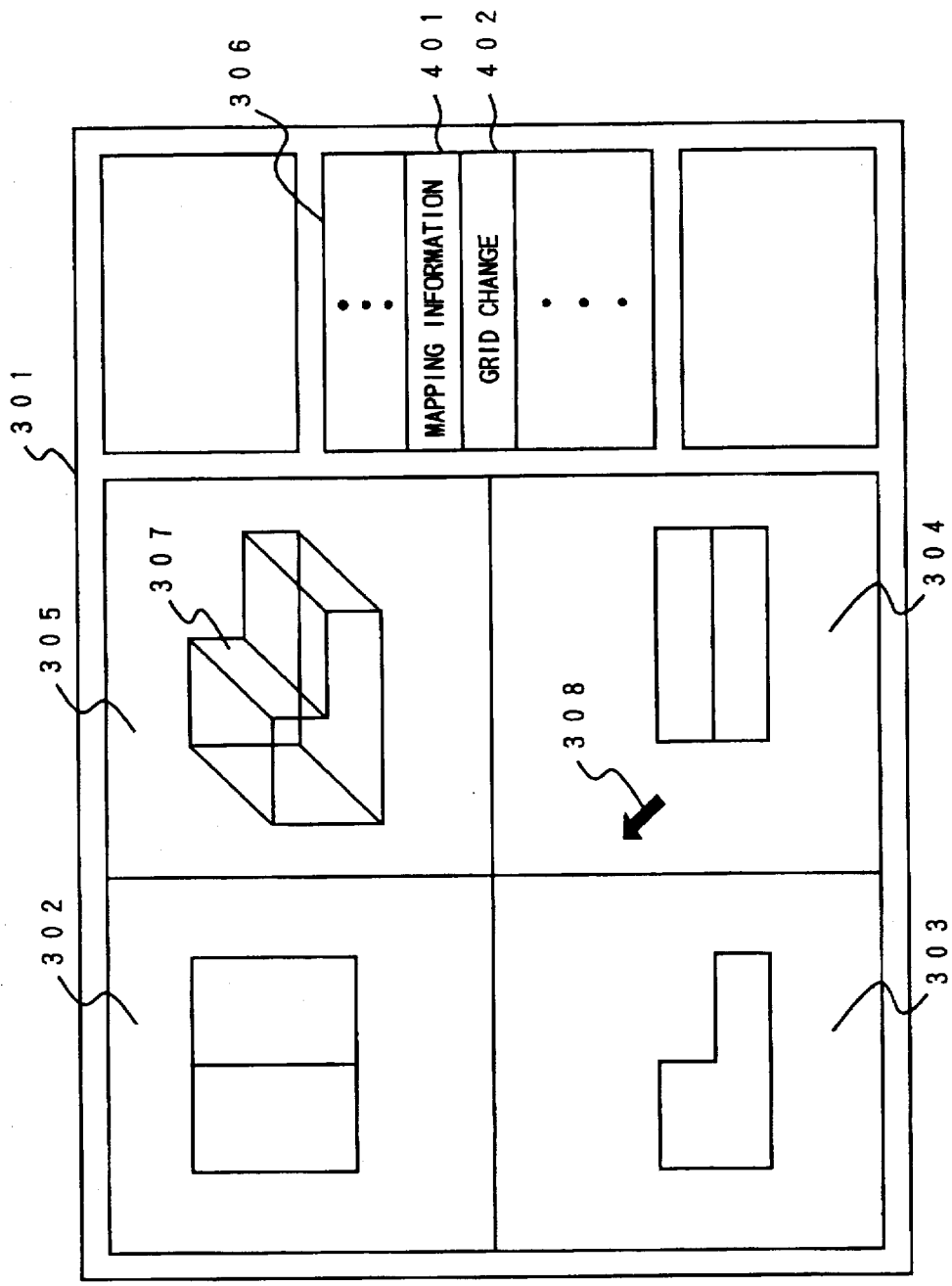
FIG. 3 is a diagram showing the displayed contents of an operating frame.

When started, the user interface unit 101 displays on the screen 106 an operating frame 301 which is shown in FIG. 3 by way of example.

The top plan view 302, front view 303, side view 304 and bird's-eye view 305 of the shape indicated by the shape data accepted by the shape generation unit 102 are displayed in respective areas formed by quartering the principal part of the screen 106, while an operating menu 306 is displayed on the right-handed side of the screen 106.

The shape generation unit 102 accepts data in an exchange data format from other pattern generation systems etc., and it generates and edits the data defining the shape of the three-dimensional object, interactively with the user through the user interface unit 101.

Each of the top plan view 302, front view 303, side view 304 and bird's-eye view 305 is displayed in accordance with a display size, a visual angle, etc. designated by the operating menu 306 and the coordinate input device such as a mouse. Incidentally, a cursor 308 is displayed at that position on the screen 106 which is instructed by the mouse or the like coordinate input device, and it can be used for selecting the menu and for instructing coordinate positions on the views.

Next, there will be explained the image to be mapped onto the object displayed on the operating frame 301, and the operation of defining the coordinates to have the image mapped thereat. The definitions of the mapping image and the mapping coordinates shall be called "mapping definitions".

On the operating frame 301, the object to have the image mapped thereonto is selected with the cursor 308, and the mapping information menu 401 of the operating menu 306 is subsequently selected. Then, the user interface unit 101 fetches and displays the definitions of mapping already defined in relation to the selected object as stored in a three-dimensional scene database.

Figure 4:
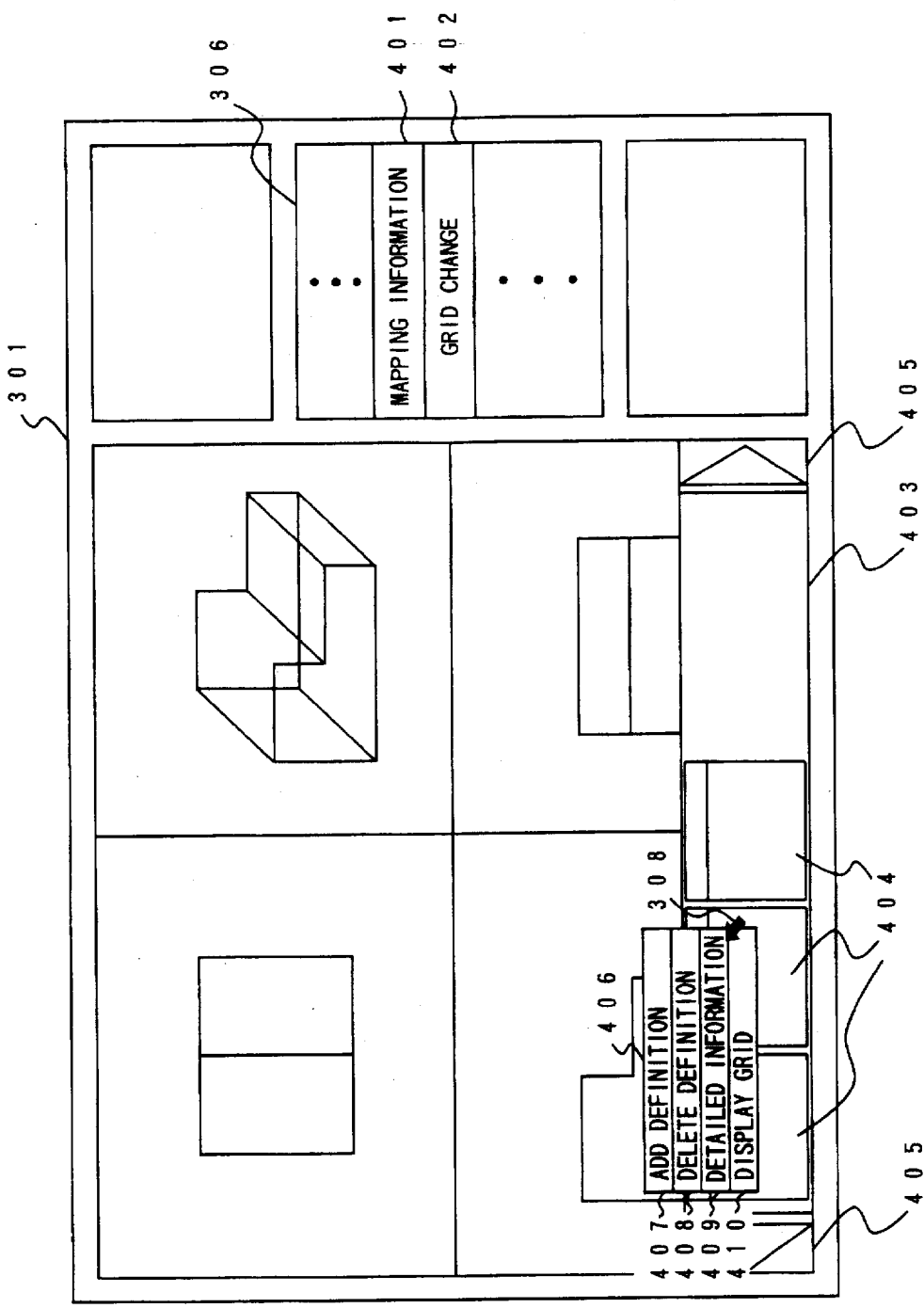
FIG. 4 is a diagram showing the displayed contents of a mapping registration window in the operating frame.

The situation of the definitions is displayed by a mapping registration window 403 which is displayed on the operating frame 301 shown in FIG. 4.

In the mapping registration window 403, the situation of the mapping currently registered is displayed by registration cells 104. A plurality of mapping items can be simultaneously defined for one object, and the display is done so that one mapping registration cell 404 may correspond to one definition. Besides, the defined state of the mapping is displayed by characters or an image in the registration cell 404 of each mapping item. Thus, how the mapping is defined can be discerned at a glance.

In a case where all the mapping registration cells 404 cannot be displayed at one time within the mapping registration window 403, the mapping registration cell (or cells) not displayed is (are) displayed by laterally or vertically scrolling the display by means of any of the scroll buttons 405 adjacent to the mapping registration window 403.

Here, a menu 406 is displayed by locating the cursor 308 within the mapping registration window 403 and pressing the button of the mouse.

Figure 5:
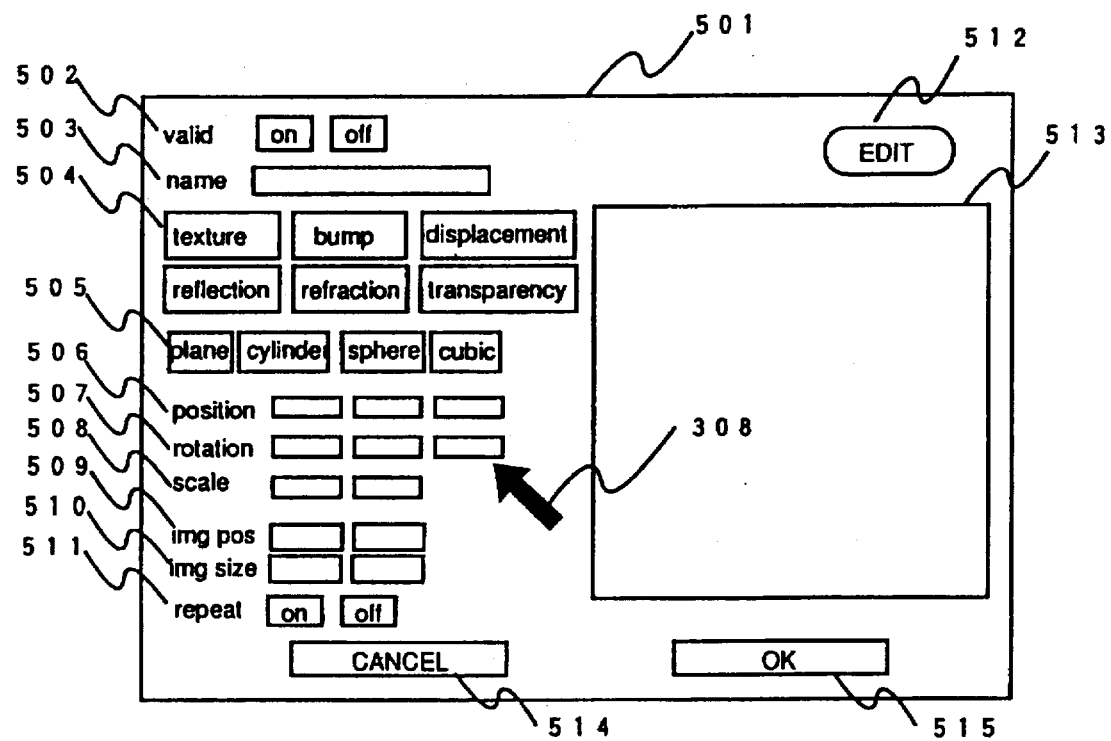
FIG. 5 is a diagram showing the displayed contents of a mapping in setting window.

Then, when an item "Add Definition" 407 in the menu 406 is chosen, the mapping registration cell 404 is added for the object currently selected. On the other hand, when an item "Delete Definition" 408 is chosen, the mapping definition registered in the mapping registration cell 404 where the cursor 308 lies is excluded. When an item "Detailed Information" 409 is chosen, the detailed information of the mapping registered in the mapping registration cell 404 where the cursor 308 lies is displayed in a mapping information setting window 501 as shown in FIG. 5. The mapping definition is afforded using the mapping information setting window 501.

When an item "Display Grid" 410 is chosen, the definition grid of the mapping registered in the mapping registration cell 404 where the cursor 308 lies is displayed in each of the views 302, 303, 304 and 305 (FIG. 3). The definition grid of the mapping is a grid for indicating the position at which the image is to be mapped. When the item "Display Grid" 410 is chosen again in the above displayed state, the displayed grid disappears.

FIG. 5 illustrates a display example of the mapping information setting window 501 for affording the mapping definition.

As shown in the figure, the mapping information setting window 501 is provided with "valid" buttons 502 (valid/invalid), a "name" area 503 (image name display input area), mapping sort selection buttons 504, mapping grid selection buttons 505, "position" areas 506 (grid position display input areas), "rotation" areas 507 (grid angle display input areas), "scale" areas 508 (grid enlargement ratio display input areas), "img pos" areas 509 (image position input areas), "img size" areas 510 (image size input areas), "repeat" buttons 511 (repetition/no repetition), an "EDIT" button 512 (image edit), an image display area 513, a "CANCEL" button 514 (cancelling an instruction), and an "OK" button 515 (acknowledging an instruction).

the "valid" buttons 502 are buttons for instructing whether or not the image defined in the mapping information setting window 501 is to be actually mapped onto the object.

The "name" area 103 is an area for displaying and inputting the name of a file storing the image for use in the mapping. In the case of altering the image to-be-mapped, the cursor 308 is located on this area 503, and the mouse button is pressed, whereupon the name of the file of a new image is input.

The mapping sort selection buttons 504 are buttons for selecting the type of mapping to be done onto the object, such as "texture", "bump", "displacement", "reflection", "refraction" and "transparency", and any of them can be selected.

In a case where the "texture" button is picked, the rendering apparatus 105 maps the image with the color thereof as the color of the surface of the object.

In a case where the "bump" button is picked, the rendering apparatus 105 first calculates the brightness levels of the pixels of the image as the data of heights, calculates normal vectors at the individual pixels from the height differences between the respectively adjacent pixels and calculates the deviations of the respective normal vectors relative to the vertical direction. Subsequently, the rendering apparatus 105 maps the image onto the object, and it shifts the directions of the normal lines of the individual positions of the object in such a way that the deviations from the vertical direction as have been previously calculated for the image pixels mapped onto the positions of the object are added to the normal lines of these positions.

In a case where the "displacement" button is picked, the rendering apparatus 105 displaces the heights of the individual positions of the abject in the normal directions in correspondence with the brightness levels of those pixels of the image which are to be mapped onto the object positions.

In a case where the "reflection" button is picked, the rendering apparatus 105 maps the image onto the object as if the image lay around the object and was mirrored on the object. Such mapping is called the "environmental mapping".

In a case where the "refraction" button is picked, the rendering apparatus 105 maps the image onto the object as if the image lay on the far side of the object and was refractedly seen through the object.

In a case where the "transparency" button is picked, the rendering apparatus 105 changes the transparencies of the individual positions of the object in accordance with the brightness levels of those pixels of the image which are to be mapped onto the object positions. By way of example, the transparencies are set to be opaque, semitransparent and transparent, in correspondence with the brightness levels of the pixels.

The mapping grid selection buttons 505 are buttons for picking coordinate systems with which the image is to be mapped onto the object.

More specifically, in a case where the "plane" button is picked, the rendering apparatus 105 maps the image in such a manner that an image on a plane is projected in parallel with the normal direction of the plane. In a case where the "cylinder" button is picked, the rendering apparatus 105 maps the image in such a manner that an image on a cylinder is projected in the direction of the center line thereof. In a case where the "sphere" button is picked, the rendering apparatus 105 maps the image in such a manner that an image on a spherical surface is projected on the center thereof. In a case where the "cubic" button is picked, the rendering apparatus 105 maps the image in such a manner that an image on each face of a cube is projected in parallel with the normal direction of each face.

The processing in the case of the "cubic" button will be explained in more detail below. It is assumed that the coordinate system with which the mapping is instructed is a rectangular coordinate system, and that the image is designated on the XY-plane in the rectangular coordinate system by way of example. In calculating those positions of the image to which the individual points of the object for the mapping correspond, respectively, a normal vector at a point on the object is first calculated. That point on the object at which the normal vector is to be evaluated, is set at one point of each polygon constituting the object or at the vertex of each polygon. In some cases, a point inside each polygon is also contained. Herein, an axis which exhibits the greatest value of the absolute values of the X, Y and Z values of the evaluated normal vector is nearest to parallel to the normal vector. Therefore, the image projected in the direction of the axis is brought into correspondence with the point on the object. That is, when the nearest parallel axis is the X-axis of the rectangular coordinate system, the image on the YZ-plane thereof is projected in the X-axial direction thereof; when it is the Y-axis, the image on the XZ-plane is projected in the Y-axial direction; and when it is the Z-axis, the image on the XY-plane is projected in the Z-axial direction. This method can be extended to realize the mapping grids of any desired polyhedrons such as a tetrahedron and an octahedron.

The "position" areas 506, "rotation" areas 507 and "scale" areas 508 serve to determine the required reference coordinates, rotational angle and size of the mapping, and current values are displayed in the corresponding areas. When any of the values is to be altered, the corresponding area is appointed with the cursor 308, and new data is input from the keyboard or the like.

Alternatively, these data items can be interactively set with the mapping coordinate instruction unit 104 by utilizing the mapping grid expressive of the data of the reference coordinates, rotational angle and size.

Figure 6A:
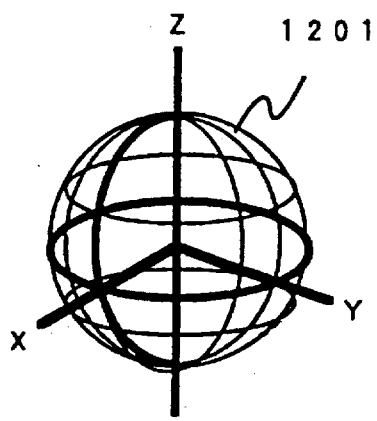
FIG. 6A–D are diagrams showing the displays of mapping instruction grids.
Figure 6B:
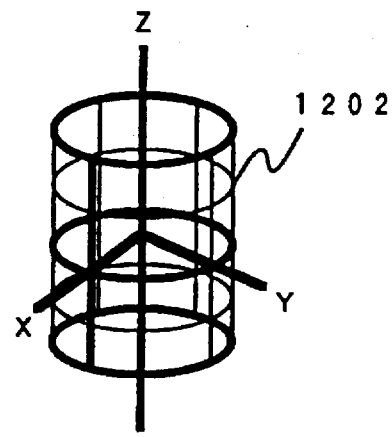
Figure 6C:
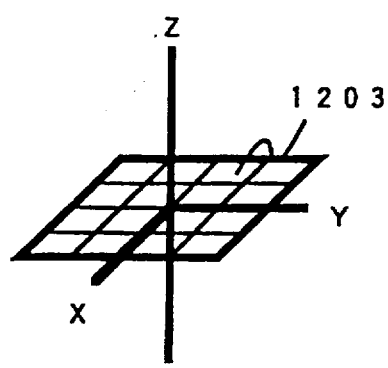
Figure 6D:
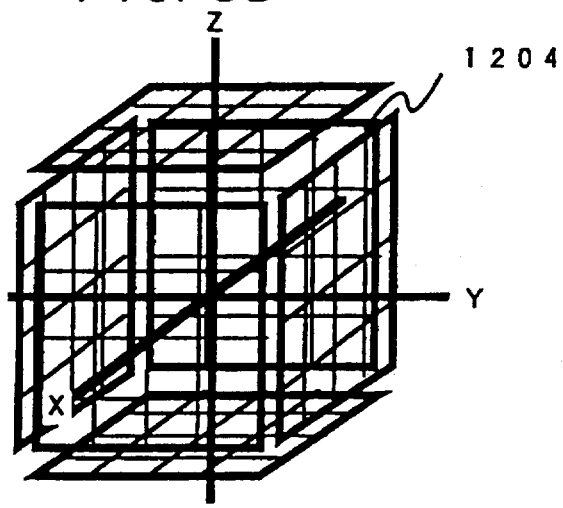

By way of example, in the case where the "sphere" button is picked from among the mapping grid selection buttons 505, the grid 1201 of a polar coordinate system in FIG. 6A is displayed in superposition on each of the views 302, 303, 304 end 305 (FIG. 3). Besides, in the case where the "cylinder" button is picked, the grid 1202 of FIG. 6B of a cylindrical coordinate system is superposedly displayed, and in the case where the "plane" button is picked, the grid 1203 of FIG. 6C of a plane coordinate system is superposedly displayed. Further, in the case where the "cubic" button is picked, the grid 1203 of the plane coordinate system or a cubic grid 1204 of FIG. 6D consisting of six grids 1203 of the plane coordinate system in combination is displayed.

Incidentally, by affording a plurality of mapping definitions to a single object, the grid 1202 of the cylindrical coordinate system and the grid 1203 of the plane coordinate system can be simultaneously defined for the single object.

Each mapping grid has control points for altering the position, size and rotational angle. The position, size and rotational angle can be designated by catching and moving the points with the cursor 308. For example, in the case of the grid 1201 of the polar coordinate system, the coordinate axes X, Y and Z of the system form the control points for instructing the movements of the positions, the distal ends of the respective coordinate axes form the control points for instructing the rotational angles, and the equatorial line of the system (a sectional line on the X-Y plane of the system) forms the control point for instructing the size. Herein, the position, size and rotational angle of the mapping grid are controlled so that the corresponding control points may follow up the movements of the cursor 308, whereby the reference coordinates, rotational angle and size of the resulting mapping grid are respectively set as the new data of the "position" area 506, "rotation" area 507 and "scale" area 508.

Meanwhile, in the mapping information setting window 501 shown in FIG. 5, the image display area 513 serves to display how the image is arranged within the instructed grid. Here in this area, the image being currently edited may well be displayed as it is, but symbols, for example, arrows indicative of the arrayal of the data of the image can alternatively be displayed.

Next, the "img pos" areas 509 and the "img size" areas 510 serve to instruct and display how the image is to be arranged within the mapping grid instructed with the "position" area 506, "rotation" area 507 and "scale" area 508.

Figure 7:
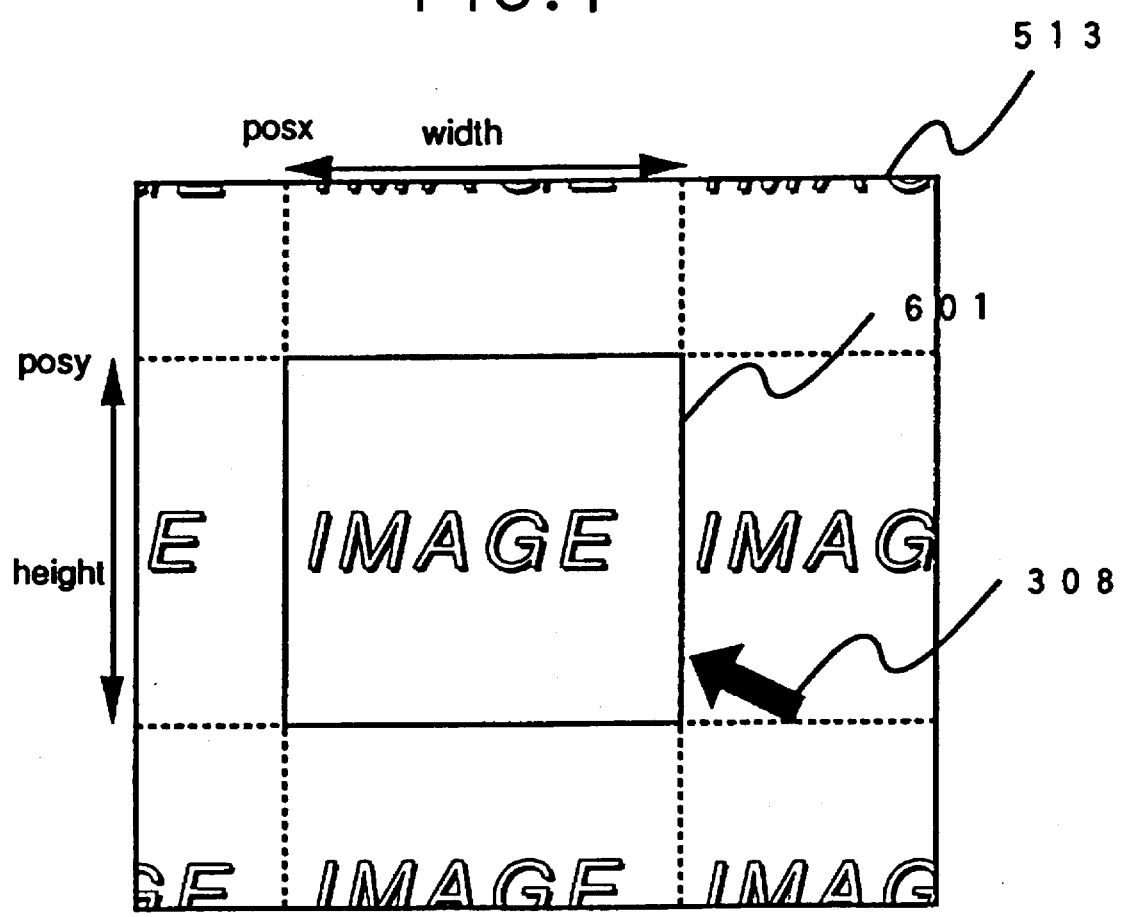
FIG. 7 is a diagram for explaining how to instruct the arrangement position of an image.

As illustrated in FIG. 7, the image is arranged in an area which is determined by a width and a height with a position (posx, posy) as a reference point, within the grid displayed in the image display area 513. On this occasion, in a case where the width or the height has a minus value, the image is inverted laterally or vertically, respectively. In a case where both the width and the height have minus values, the image is inverted laterally and vertically.

In altering the width and height values, the input areas 509 and 510 are appointed with the cursor 308, and new values are input with the keyboard or the like. Alternatively, the values can be altered by changing an image display frame 601 in the image display area 513 by means of the cursor 308. More specifically, in a case where the cursor 308 is moved vertically and laterally with this cursor located inside the image display frame 601 and with the button of the mouse kept pressed, the display position of the image display frame 601 is moved to alter the values (posx, posy) in correspondence with the movement magnitudes of the cursor 308. Besides, in a case where the cursor 308 is moved vertically and laterally with this cursor located near the image display frame 601 and with the button of the mouse kept pressed, the display size of the image display frame 601 is altered together with the width and height values, in correspondence with the movement magnitudes of the cursor 308.

In a case where the object exists in excess of the area of the instructed image in the image mapping operation, the "repeat" buttons 511 serve to instruct whether or not the reference pattern of the image is to be repeatedly mapped onto an excessive area.

The "EDIT" button 512 is a button for generating and editing the image for use in the mapping. By picking this button, the image generation unit 103 is started, an image edit window 701 (FIG. 8) is displayed on the screen 106. The edit of the image will be described later.

The "CANCEL" button 514 and the "OK" button 515 serve to instruct whether or not the contents instructed with the mapping information setting window 501 are to be canceled, respectively. By picking either of these buttons, the process for setting the mapping information is ended, and the mapping information setting window 501 is erased from the screen 106.

Figure 8:
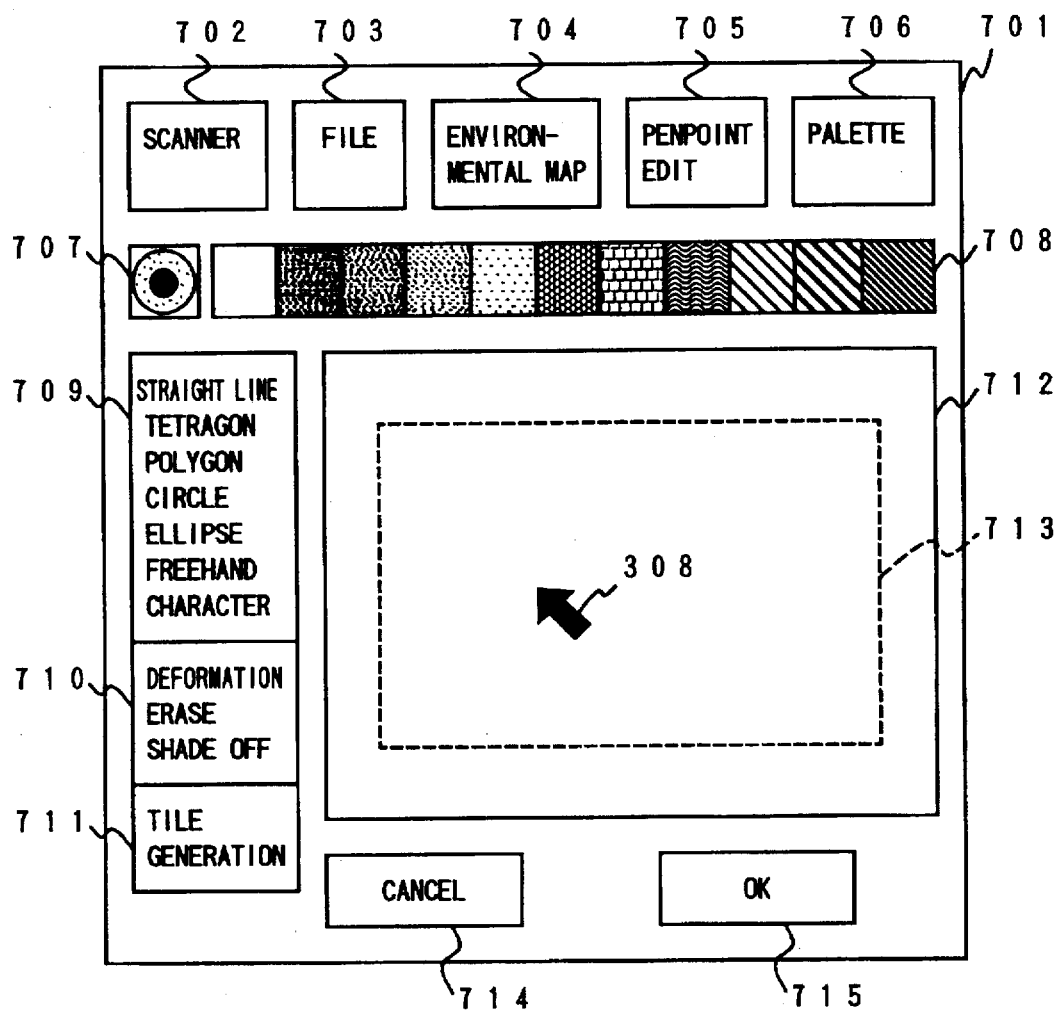
FIG. 8 is a diagram showing the displayed contents of an image edit window.

As stated above, in the case where the "EDIT" button 512 has been picked in the mapping information setting window 501 shown in FIG. 5, the image generation unit 103 is started, and the image edit window 701 shown in FIG. 8 is displayed in superposition on the mapping information setting window 501.

Referring to FIG. 8, numeral 712 indicates an edit image display area, and numeral 713 an area in which the edit image is actually displayed within the image display area 712.

A scanner button 702 is a button for starting the scanner loader 201. In case of intending to utilize an actual material for the image which is to be mapped onto the object, the scanner button 702 is picked, and image data is loaded from the scanner 206. The loaded image is displayed in the edit image display area 712, and is stored in the image memory 205.

A file button 703 is a button for transferring image data between the image memory 205 and the external memory 207.

An environmental map button 704 is a button for generating that image data for the environmental mapping which corresponds to an instructed point within a three-dimensional space. The generation of the environmental mapping image will be described later.

Figure 10A:
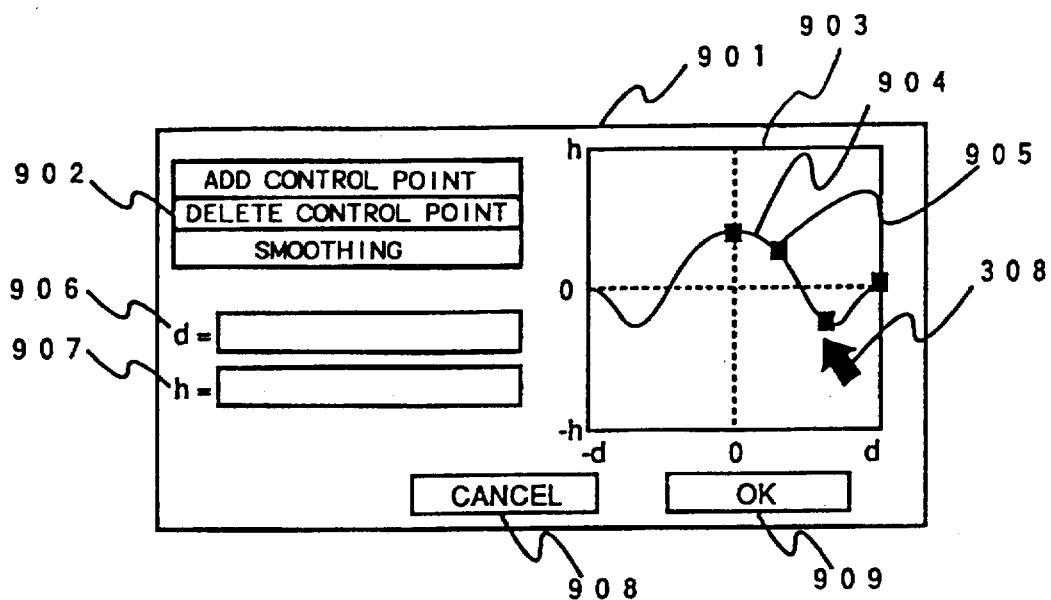
FIGS. 10(a), 10(b), 10(c) and 10(d) are diagrams showing the displayed contents of a penpoint edit window.

A penpoint edit button 705 is a button for editing the to shape of the point of a pen for use in the image edit operation. When the penpoint edit button 705 is picked, a penpoint edit window 901 as shown in FIG. 10(a) is displayed. The operation of editing the shape of the penpoint will be detailed later.

A palette button 706 serves to designate a color for use in the image edit operation.

A current penpoint display area 707 displays the state of the current penpoint.

An area 708 displays those colors and patterns of the pen which are currently available.

A drawing tool menu 709 contains such items as "Straight Line", "Tetragon", "Polygon", "Circle", "Ellipse", "Freehand" and "Character". By picking any of the items with the cursor 308, the corresponding drawing tool required can be chosen to draw a pattern in the edit image display area 712. In the drawing operation, the pattern is drawn under the current state of the penpoint.

An edit tool menu 710 contains such items as "Deform", "Erase" and "Shade off". By picking any of the items with the cursor 308, the corresponding edit tool required can be chosen to edit the pattern and image which are displayed in the edit image display area 712. When the "Deform" item picked, the rendering apparatus 105 falls into a mode in which the coordinates of the vertex of the drawn pattern, for example, are altered. When the "Shade off" item is picked, the rendering apparatus 105 falls into a mode in which image data of a position appointed with the cursor 308 can be altered to form a shaded-off or obscure image.

Such a shading-off process is performed as stated below. After the "Shade off" item has been picked, the cursor 308 is moved, and the button of the mouse is pressed, thereby fetching an image of N vertical pixels and N lateral pixels lying at the position of the cursor 308. The individual pixels of the fetched image data are subjected the following processing: The data items of the pixel to-be-processed and eight pixels adjacent thereto are averaged into new data of the pixel to-be-processed. Such averaging operations are performed for all the data items of the N*N pixels (where symbol*denotes the operator of a multiplication), and such new data items are brought back into the original positions again. The shaded-off or obscure image is formed by repeating the above operations with the movements of the cursor 308. Incidentally, the effect of shading off or obscuring the image may well be adjusted in such a way that the averaging operation in the process is implemented as weighted averaging which corresponds to the positions of the pixels. Also, the user can designate the weight values of the weighted averaging prepared in the form of a table beforehand. By utilizing the shading-off process, the user can originate an image in which a part exhibiting a great change in image data is emphasized.

In this regard, when the image is repeatedly mapped, it is sometimes the case that the values of the recurrent patterns of the image do not continue at the boundary between the recurrent patterns, so a boundary line is seen. On such an occasion, the boundary can be made inoffensive to the eye by utilizing the shading-off or obscuring process.

In order to facilitate the designation of the shading-off et the boundary, therefore, this embodiment is so contrived that the edit image display area 712 is held larger than the size 713 of the edit image, and that the recurrent pattern of the image is displayed in an area outside the area 713. Thus, the user can directly designate the shading-off or obscuring between the image patterns which form the boundary.

Next, a tile generation button 711 is a button for generating regular patterns such as tiles. A tile pattern generation window 1101 (FIG. 12) is displayed by picking the button 711. The generation of the tile patterns will be detailed later.

A "CANCEL" button 714 and an "OK" button 715 serve to instruct whether or not the contents instructed and generated with the image edit window 701 are to be canceled, respectively. By picking either of the buttons 714 and 715, the image edit process is ended, and the image edit window 701 is erased from the screen 106.

Next, there will be explained operations which proceed in the case where the environmental map button 704 of the image edit window 701 has been picked.

Figure 9A:
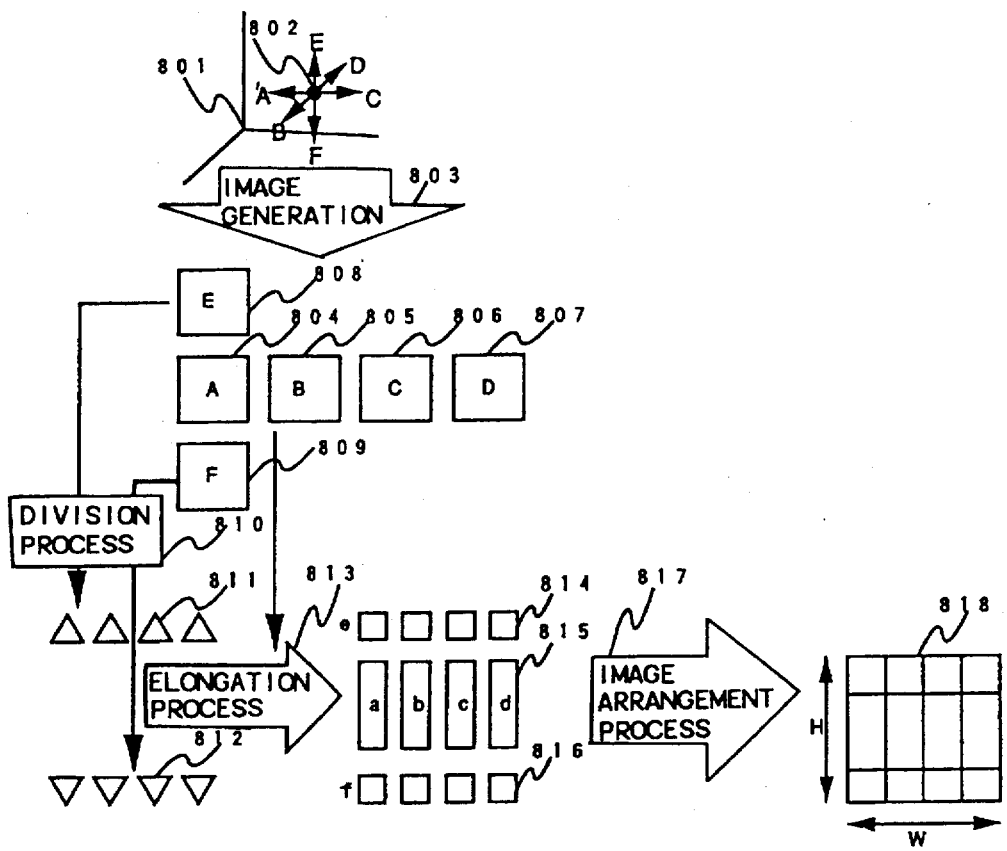
FIG. 9A and 9B are diagrams showing how to generate an image for environmental mapping.

FIGS. 9A and B are diagrams showing the situation of the generation of the image for the environmental mapping.

The environmental mapping is the method in which images are mapped as if things around an object were mirrored on the object. In other words, the plurality of images having photographed the whole perimeter of the object to-be-processed need to be prepared. In this embodiment, such plurality of images are put together into a single image, thereby permitting the user to perform the mapping through one instruction. In order to generate the single image, processes to be stated below are executed. Herein, it is premised that the rendering apparatus 105 manages the space of a world coordinate system 801 for generating a three-dimensional graphic therein, and that the object to-be-processed is already arranged in the space of the world coordinate system 801.

When the environmental map button 704 of the image edit window 701 has been picked, the rendering apparatus 105 generates the images of the objects other than the pertinent object to-be-processed lying in the space of the world coordinate system 801, with the forward, backward, right, left, up and down parts of the space of the world coordinate system 801 viewed from the reference coordinates 802 of the pertinent object. The generated results are delivered to the image generation unit 103. By the way, when the angle of view of the image generation is set at about 90 degrees for all the images, the images are obtained at a good quality. Incidentally, the image generation by the rendering apparatus 105 may well be replaced with a measure in which the images of pictures obtained by photographing the forward, backward, right, left, up and down parts of the actual world are loaded from the scanner 206.

As shown in FIG. 9A, the generated forward image (A) 804, leftward image (B) 805, backward image (C) 806, rightward image (D) 807, upward image (E) 808 and downward image (F) 809, each of which has a size of width W and height H, are combined into the single image in the following way: First, the upward image 808 and the downward image 809 are respectively turned into four triangular images 811 and four triangular images 812 by division processes 810. In the division process 810, the four triangles are formed by dividing the image 808 or 809 by means of two diagonal lines.

Figure 9B:
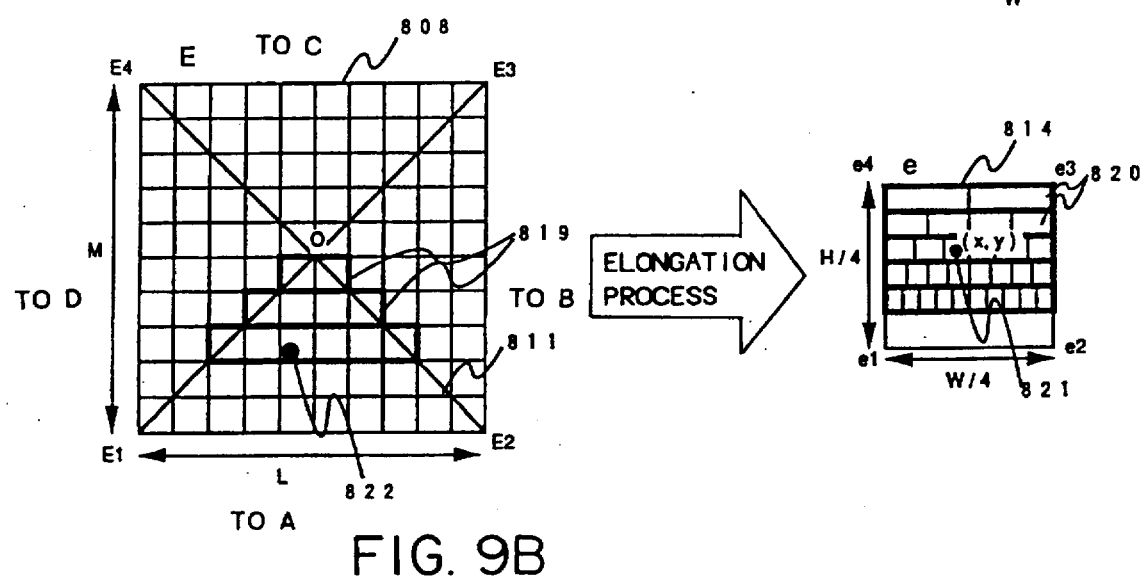

By way of example, as shown in FIG. 9B, the upward image 808 is turned into the four triangles E1-E2-E0, E2-E3-E0, E3-E4-E0 and E4-E1-E0 where symbols E1, E2, E3 and E4 denote the respective vertices of the image 808 and where symbol E0 denotes the center thereof. In these triangles, a line E1-E2 corresponds to the upper latus of the image A, a line E2-E3 corresponds to that of the image B, a line E3-E4 corresponds to that of the image C, and a line E4-E1 corresponds to that of the image D, respectively. Such holds true also of the downward image 809.

Subsequently, a process 813 for elongating or stretching the images is carried out. Letting letters W and H denote the width and height of the size of the finished final image, respectively, each of the forward image 804, leftward image 805, backward image 806 and rightward image 807 is elongated to a size having a width of W/4 and a height of H/2. The four images a, b, c and d thus formed are indicated at numeral 815. In addition, the triangular images 811 and 812 obtained by dividing the upward image 808 and downward image 809 are respectively elongated into rectangular images 814 and 816 each having a size of width W/4 and height H/4.

The elongation of the triangular image into the square image proceeds as follows: By way of example, in elongating the triangle E1-E2-E0 into the rectangle e1-e2-e3-e4, the data of a pixel at a point (x, y) 821 in the rectangle e1-e2-e3-e4 is set to the data of 8 pixel at that position 822 the triangle E1-E2-E0 which is expressed by:

$$((4*L*x)W+(2*L*y)/H-(16*L*x*y)/(W*H), (2*M*y)H)$$

where letter L denotes the length of the line E1-E2, and letter M denotes the length of the line E1-E4 (the coordinates are taken on rectangular coordinate systems having their origins at the points E1 and e1). In this way, a pixel train 819 within the triangle is elongated into a pixel train 820 within the rectangle.

The twelve images 814, 815 and 816 generated in the above way are synthesized into a single image 818 by an image arrangement process 817. On this occasion, the generated images 815 are arrayed in the order of, for example, the forward, leftward, backward and rightward images from the left to the right, while the generated upward and downward images 814 and 816 are respectively arranged over and under the corresponding ones of the forward, leftward, backward and rightward images. The image 818 thus generated is used as data for the environmental mapping.

By the way, the images to be divided into the triangles and then rearranged are not restricted to the upward and downward images, but they may well be other images. In this case, the two images to be divided are the images of directions opposite to each other, and the four images to be laterally arrayed in the middle of the generated final image are brought into an order in which these four images are successively located clockwise or counterclockwise round a line as an axis passing through the middle point of the two images to be divided into the triangles. On this occasion, the order of the deformed rectangular images to be arranged at the upper and lower parts of the generated final image is held consistent with the order of the images arrayed in the middle thereof.

The environmental mapping image thus generated is mapped onto the whole perimeter of the object in compliance with the designation of the "reflection" button of the mapping sort selection buttons 504 of the mapping information setting window 501 shown in FIG. 5, by the rendering apparatus 105. Incidentally, a distortion ascribable to the mapping can be relieved in such a way that, in arranging the elongated images into the generated final image or after having generated the final image, the elongated images are deformed so as to broaden the vertical extents of the pixels more in the middle of the final image and to narrow them more in the upper and lower parts thereof.

Next, there will be explained operations which proceed in the case where the penpoint edit button 705 of the image edit window 701 when the picked.

When the penpoint edit button 705 of the image edit window 701 has been picked, the penpoint edit window 901 illustrated in FIG. 10(a) is displayed.

As shown in FIG. 10(a), the penpoint edit window 901 includes a penpoint edit menu 902, a penpoint density graph display area 903, distance and height value display input areas 906, 907, etc. The density graph 904 of a current penpoint is displayed in the penpoint density graph display area 903. This graph represents the relationship between a distance from the point instructed with the cursor 308 (on the axis of abscissas) and the modulating rate or value of the density or color of each pixel (on the axis of ordinates). The graph 904 has its object determined on the basks of a plurality of control points 905. The penpoint edit menu 902 contains such items as "Add Control Point", "Delete Control Point" and "Smoothing".

Figure 10B:
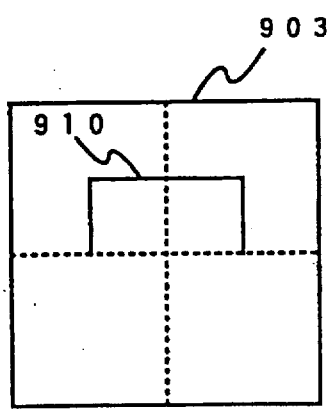

The penpoint is edited as follows: In the state in which no quantity is set, the density graph 904 of the penpoint exhibits a distribution which, as shown at numeral 910 in FIG. 10(b), has a constant value up to a certain distance from the center of the area 903 and has 0 (zero) beyond the distance.

Figure 10C:
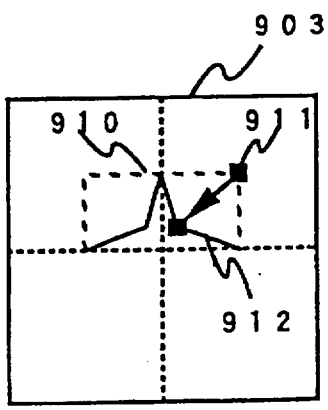
Figure 10D:
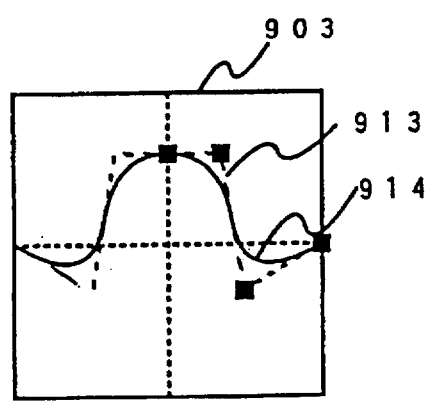

In order to alter the distribution, the item "Add Control Point" of the penpoint edit menu 902 is picked, and a control point 911 is originated on the graph 910 in FIG. 10C. The control point 911 can be designated with the cursor 308, and can have its position moved with the movement of the cursor 308. Thus, the graph 910 can be altered into a graph 912. Further, a graph 913 FIG. 10D can be displayed by adding a control point. Any unnecessary control point can be deleted by picking the item "Delete Control Point" of the penpoint edit menu 902. In the state thus far explained, the displayed graph is a polygonal line graph passing through the control points. However, the curve interpolation between the control points is effected by picking the item "Smoothing" of the penpoint edit menu 902. A curve generation algorithm for, e.g., a spline curve can be employed for the interpolation.

The range of the distance in which a density variation is to be applied, and the range of the variation can be instructed using the distance and height value display input areas 906 and 907.

A "CANCEL" button 908 (for canceling an instruction) and an "OK" button 909 (for acknowledging an instruction) serve to instruct whether the contents instructed and generated with the penpoint edit window 901 are to be canceled or acknowledged, respectively. By picking either of the buttons 908 and 909, the process for editing the penpoint is ended, 30 and the penpoint edit window 901 is erased from the screen 106.

The penpoint edited in this way is employed for the drawing operation in the image edit window 701 shown in FIG. 8.

The drawing operation will be detailed with reference to FIGS. 11(a) thru 11(f). The cursor 308 is moved to a start point for starting the drawing of a pattern, and the button of the mouse is pressed, whereby a gradation value 1001 is written in the state of the current penpoint (FIG. 11(a)). The cursor 308 is moved with the mouse button pressed. Then, on condition that the "Straight Line" item is picked as the drawing tool, a straight line is drawn extending from the start position to a position 1002 appointed by the cursor 308, thereby obtaining a gradated image 1003 whose density distribution depending upon the distance from the straight line is represented by the designated graph (FIG. 11(b)). Subsequently, when the button is released, the straight line is settled at the time of the release, and a straight line 1004 having the gradation distribution is finally drawn (FIG. 11(c)). A shown in FIG. 11(d), on condition that the "Tetragon" item for designating diagonal points is picked as the drawing tool, a pattern 1005 which has a density distribution depending upon the distance from the boundary of a tetragon, at the peripheral edge part of the tetragon, can be drawn.

The obtained image thus drawn is mapped onto the object by the rendering apparatus 105. On this occasion, in the case where the "displacement" button of the mapping sort selection buttons 504 of the mapping information setting window 501 shown in FIG. 5 is designated, the object can be formed with a recess or a protrusion in such a way that the density or brightness values of the individual pixels are deemed to be the data of the heights in the three-dimensional space, and that the information items of the individual positions of the three-dimensional object are displaced in the normal directions of the object. As shown in FIGS. 11(e) and (f) by way of example, when the image as exemplified in FIG. 11(d) is mapped onto an object in a shape indicated at numeral 1006 or 1008, a recess 1007 or a protrusion 1009 can be generated. Likewise, in the case where the "bump" button 504 is designated, the effect of a recess or a protrusion can be presented in such a way that only the normal lines of a surface are shifted in correspondence with the variation magnitudes of the data of an image.

Next, the generation of the tile patterns will be explained.

In the case where the tile generation button 711 of the image edit window 701 shown in FIG. 8 is picked, the tile pattern generation window 1101 shown in FIG. 12 is displayed.

The tile pattern generation window 1101 includes display input areas for various parameters, and a display area 1102 for generated tile patterns resulting from the inputs of the parameters. The parameters which can be designated are as stated below.

The "Size of Image" 1103 indicates the size of an image to-be-generated. The size of the tile of each tile pattern is controlled using the "Reference Value" 1104 and "Variance Value" 1105 of the size of the tile. The actual size of the tile is evaluated in accordance with:

$$\text{Width}=W+We*(0.5-R)$$

$$\text{Height}=H+He*(0.5-R)$$

Here, symbols W and H denote the reference values of the width and height of the tile, respectively, while symbols We and He denote the variance values of the width and height, respectively. In addition, letter R denotes a random number, which is set to take a value of −1.0 to 1.0 every tile.

The "Thickness of Edge" 1106 indicates the thickness of each edge or Joint between the adjacent tiles, that is, the width of the interspace between the adjacent tiles. The "Reference value" 1107 and "Variance Value" 1108 of the shift of a lateral reference position serve to determine how the tiles of each row are to be shifted and arranged. The actual shift of the tiles in each row is evaluated in accordance with the following equation:

$$\text{Shift}=S+Se*(0.5-R)$$

Here, symbol S denotes the reference value of the shift, and symbol Se the variance value of the value of the shift. In addition, letter R denotes a random number, which is set to take a value of −1.0 to 1.0. The value obtained is added to the shift component of the previous row, thereby determining arrangement coordinates.

The cyclic patterns of the tiles are set using the number (Nx) 1110 and number (Ny) 1111 of the tiles of one cycle in the lateral direction and in the vertical direction, respectively; the color reference array 1109 of the tile pattern; the variance value 1112 of a reference color; and the variance value 1113 of a noise component. Colors serving as the reference of recurrence are displayed in the tile pattern color reference array 1109.

The colors of the individual pixels of the tiles are evaluated as stated below. The color of each of the tiles is first determined. To this end, the No. of the pertinent tile in the recurrence cycle is calculated, and the tile pattern color reference array 1109 is searched on the basis of the calculated No. for the reference color C of the pertinent tile. The actual color of the pertinent tile is evaluated by subjecting the color C to the following calculation:

$$\text{Color of Tile}=C+Ce*(0.5-R)$$

Here, symbol Ce denotes the variance value 1112 of the reference color. Subsequently, the color of each of the pixels in the tile is determined by calculating:

$$\text{Color of Pixel}=\text{Color of Tile}+Cn*(0.5-R)$$

Incidentally, letter R denotes a random number, which is set to take a value of −1.0 to 1.0. Besides, the color is designated in accordance with a color display system such as RGB (red, green, blue) or HLS (hue, luminosity, saturation), and the calculation is performed for each of the components.

The color of the edge or joint is calculated using the reference color 1114 and variance value 1115 of the edge. On this occasion, the color of each pixel of the edge is evaluated in accordance with:

$$\text{Color of Edge} = EC + ECe*(0.5-R)$$

Here, symbol EC denotes the reference color 1114 of the edge, and symbol ECe the variance value 1115 of the color of the edge. Incidentally, letter R denotes a random number, which is set to take a value of −1.0 to 1.0. Besides, the color is designated in accordance with the color display system such as RGB (red, green, blue) or HLS (hue, luminosity, saturation), and the calculation is performed for each of the components.

A "CANCEL" button 1116 (for canceling an instruction) and an "OK" button 1117 (for acknowledging an instruction) serve to instruct whether or not the contents instructed and generated with the tile pattern generation window 1101 are to be canceled, respectively. By picking either of these buttons, the process for generating the tile patterns is ended, and the tile pattern generation window 1101 is erased from the screen 106.

Here, the flow of the processes of the user interface unit 101 thus far described will be put in order.

Figure 13:
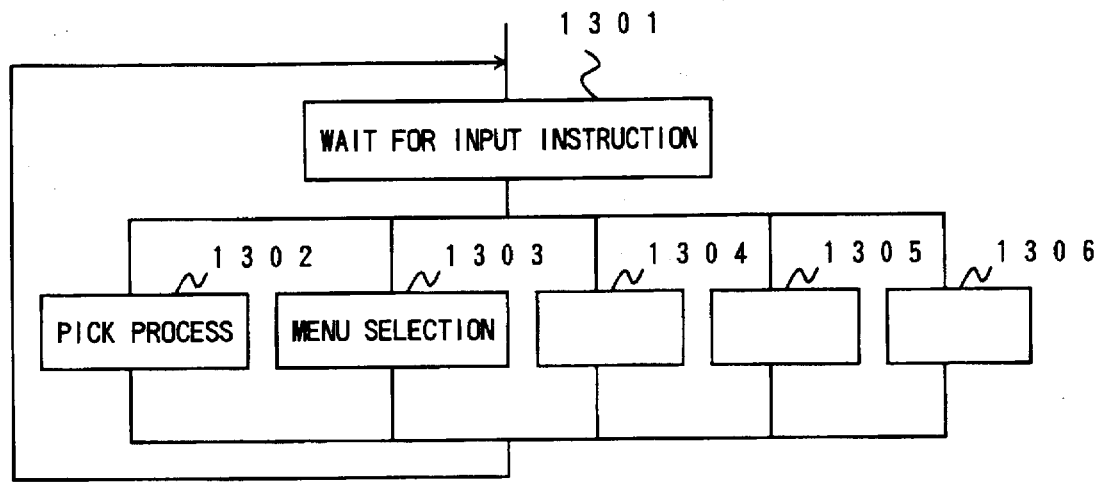
FIG. 13 is a flow chart showing the flow of the processes of a scene origination apparatus.

FIG. 13 illustrates the flow of the processes of the whole three-dimensional graphic generation system. In the operating frame 301 shown in FIG. 3, the user interface unit 101 performs the following processing:

In the process 1301, the unit 101 waits an input from the keyboard or mouse. Upon receiving the input, the unit 101 picks the displayed object in the process 1302 on condition that the input concerns the views 302–305. It calls the process of a selected menu in the process 1303 on condition that the input concerns the selection of any of the menus. By way of example, in the case where the mapping information menu 401 has been selected, the user interface unit 101 calls the mapping information process 1303 shown in FIG. 14. Other processes for system controls are performed by the processes 1304, 1305 and 1306. When the processes have ended, the unit 101 waits an input instruction in the process 1301 again.

Figure 14:
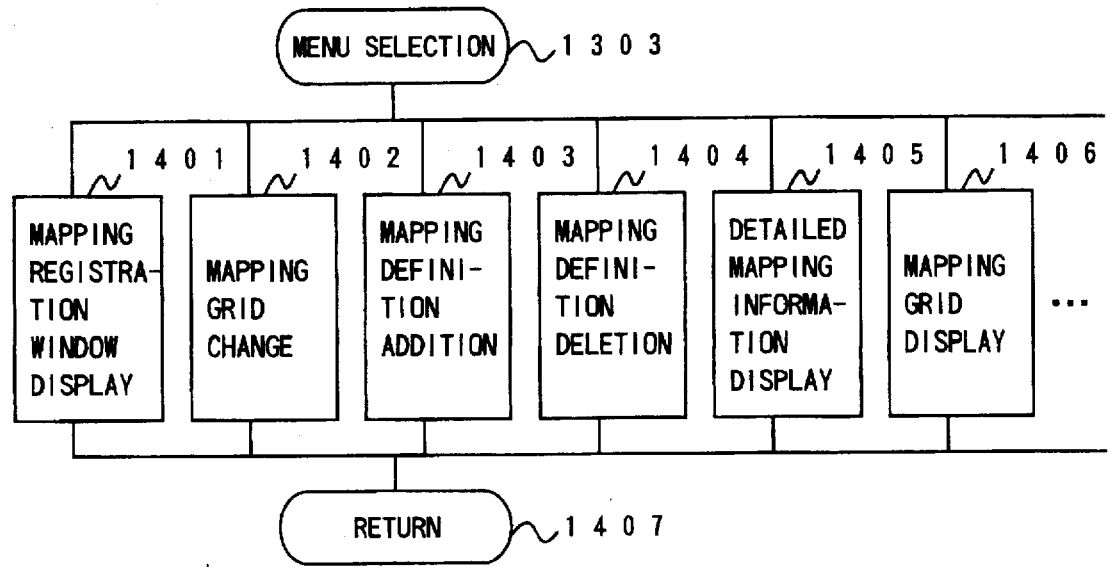
FIG. 14 is a flow chart showing the internal processing steps of a menu selection process.

Next, reference will be had to FIG. 14 showing the contents of the mapping information process 1303 which is called when the mapping information menu 401 has been picked in the operating frame 301 depicted in FIG. 3. In this process 1303, the mapping registration window 403 shown in FIG. 4 is first displayed at a mapping registration window display process 1401. When any of the menus is chosen in the menu 406 displayed as to the mapping registration window 403, any of a mapping grid change process 1402, a mapping definition addition process 1403, a mapping definition deletion process 1404, a detailed mapping information display process 1405, a mapping grid display process 1406, etc. is called in accordance with the chosen menu. By way of example, when the detailed mapping information display 409 is chosen for the mapping registration window 403, the detailed mapping information display process 1405 is called. When the called process has ended, the control returns to the process having called the menu selection process 1303, in a process 1407.

Figure 15:
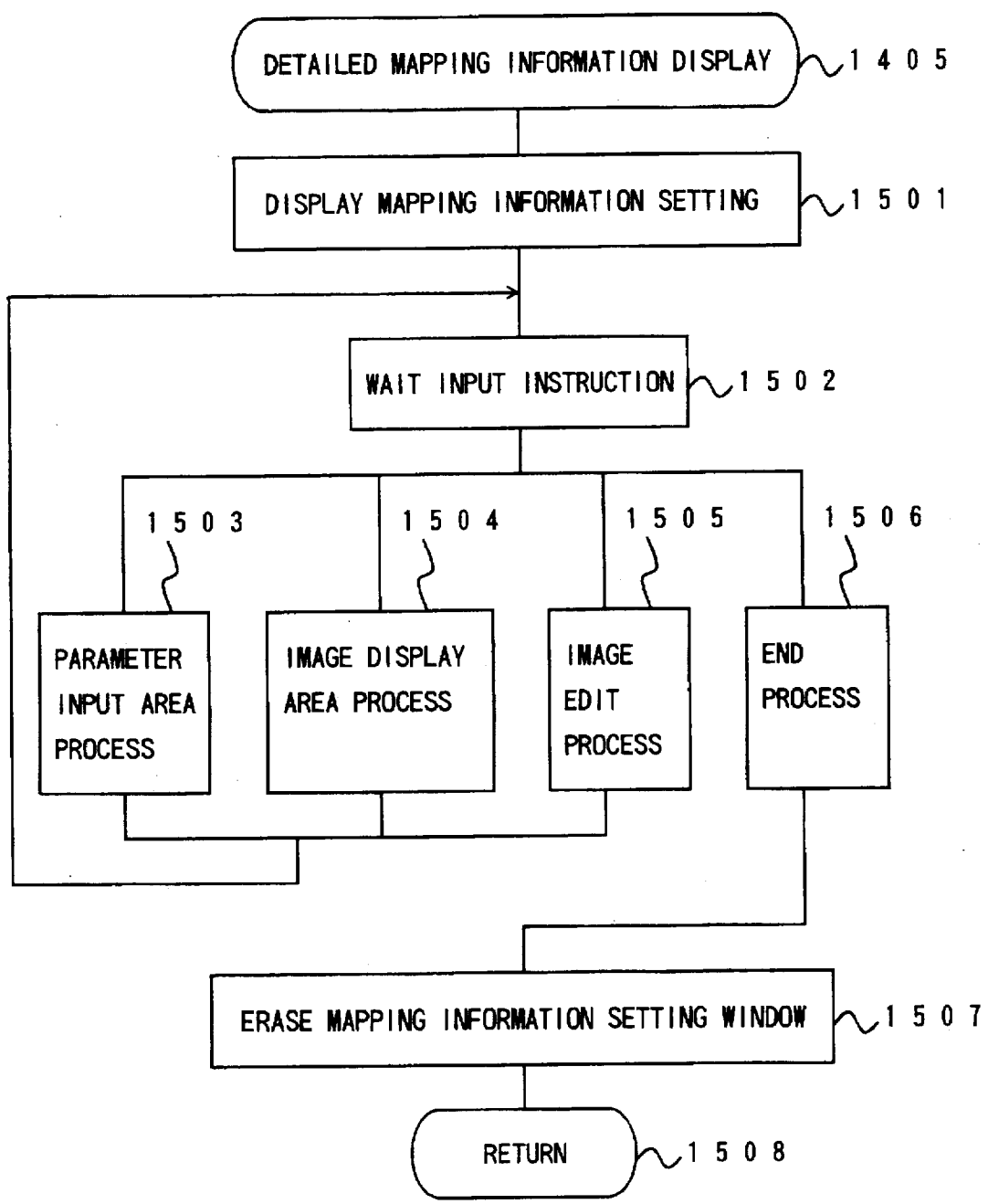
FIG. 15 is a flow chart showing the internal processing steps of a detailed mapping information display process.

Next, FIG. 15 illustrates the contents of the detailed mapping information display process 1405 which is called by the mapping information process 1303. In the detailed mapping information display process 1405, current information items on the mapping are first displayed on the mapping information setting window 501 shown in FIG. 5, by a process 1501. Thereafter, an input from the mouse, the keyboard or the like is waited in a process 1502. When the input has been received, any of a parameter input area process 1503, an image display area process 1504, an image edit process 1505 and an end process 1506 is called in accordance with the input. By way of example, when the "EDIT" button 512 is picked in the mapping information setting window 501, the image edit process 1505 is called. In the process 1503, the alteration of the instruction of the coordinate system for the mapping, etc. are executed. In the process 1504, the size of the image is altered within the image display area 513. The instructed parameters are stored or abandoned in the end process 1506, the mapping information setting window 501 is erased in a process 1507, and the control is returned to the process having called the detailed mapping information display process 1405, in a process 1508.

Figure 16:
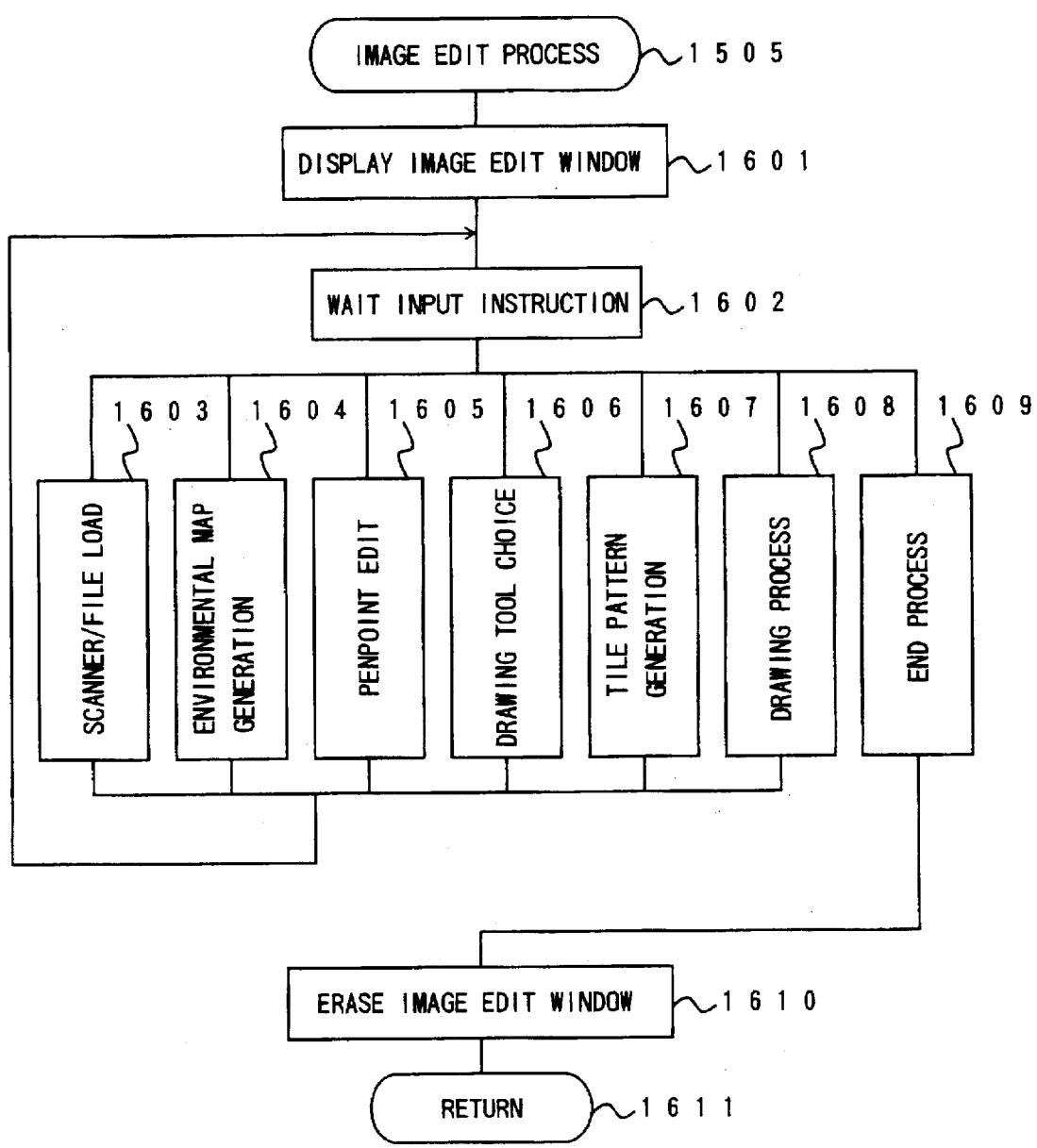
FIG. 16 is a flow chart showing the internal processing steps of an image edit process.

Next, FIG. 16 illustrates the contents of the image edit process 1505 which is called by the detailed mapping information display process 1405. As shown in the figure, the image edit process 1505 first displays the image edit window 701 depicted in FIG. 8, in a process 1601. Thereafter, an input from the mouse, the keyboard or the like is waited in a process 1602. When the input has been received, any of a scanner/file load process 1603, an environmental map generation process 1604, a penpoint edit process 1605, a drawing tool choice process 1606, a tile pattern generation process 1607, a drawing process 1608 and an end process 1609 is called in accordance with the input. By way of example, in the case where the penpoint edit button 705 is picked in the image edit window 701, the penpoint edit process 1605 is called, and in the case where the tile generation button 711 is picked, the tile pattern generation process 1607 is called. In the drawing process 1608, the pattern conforming to the drawing tool currently chosen is drawn in the edit image display area 712 under the state of the penpoint currently set. The generated image is stored or abandoned in the end process 1609, the image edit window 701 is erased in a process 1610, and the control is returned to the process having called the image edit process 1505, in a process 1611.

Incidentally, the scanner/file load process 1603 is executed by the scanner/file loader 201 of the image generation unit 103, while the environmental map generation process 1604 is executed by the environmental map origination processor 202. The tile pattern generation process 1607 is executed by utilizing the tile pattern generation unit 203, and the penpoint edit process 1605, drawing tool choice process 1606, tile pattern generation process 1607 and drawing process 1608 are executed by utilizing the editor 204.

Figure 17:
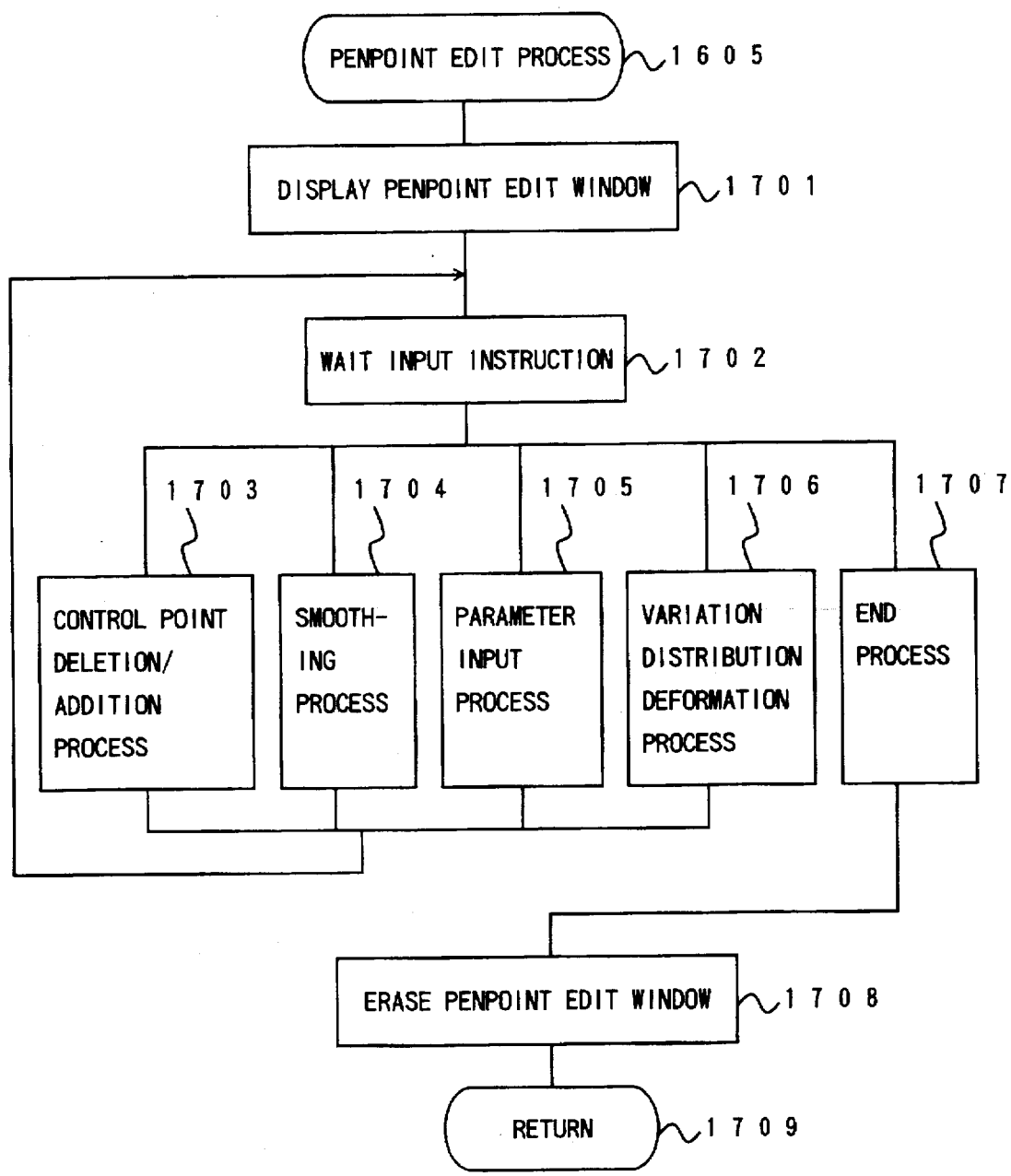
FIG. 17 is a flow chart showing the internal processing steps of a penpoint edit process.

Next, FIG. 17 illustrates the contents of the penpoint edit process 1605 which is called by the image edit process 1505. The penpoint edit process 1605 first displays the penpoint edit window 901 shown in FIG. 10, in a process 1701, and an input from the mouse, the keyboard or the like is thereafter waited in a process 1702. When the input has been received, any of a control point deletion/addition process 1703, a smoothing process 1704, a parameter input process 1705, a variation distribution deformation process 1706 and an end process 1707 is called in accordance with the input. The state of the set penpoint is stored or abandoned in the end process 1707, the penpoint edit window 901 is erased in a process 1708, and the control is returned to the process having called the penpoint edit process 1605, in a process 1709.

Figure 18:
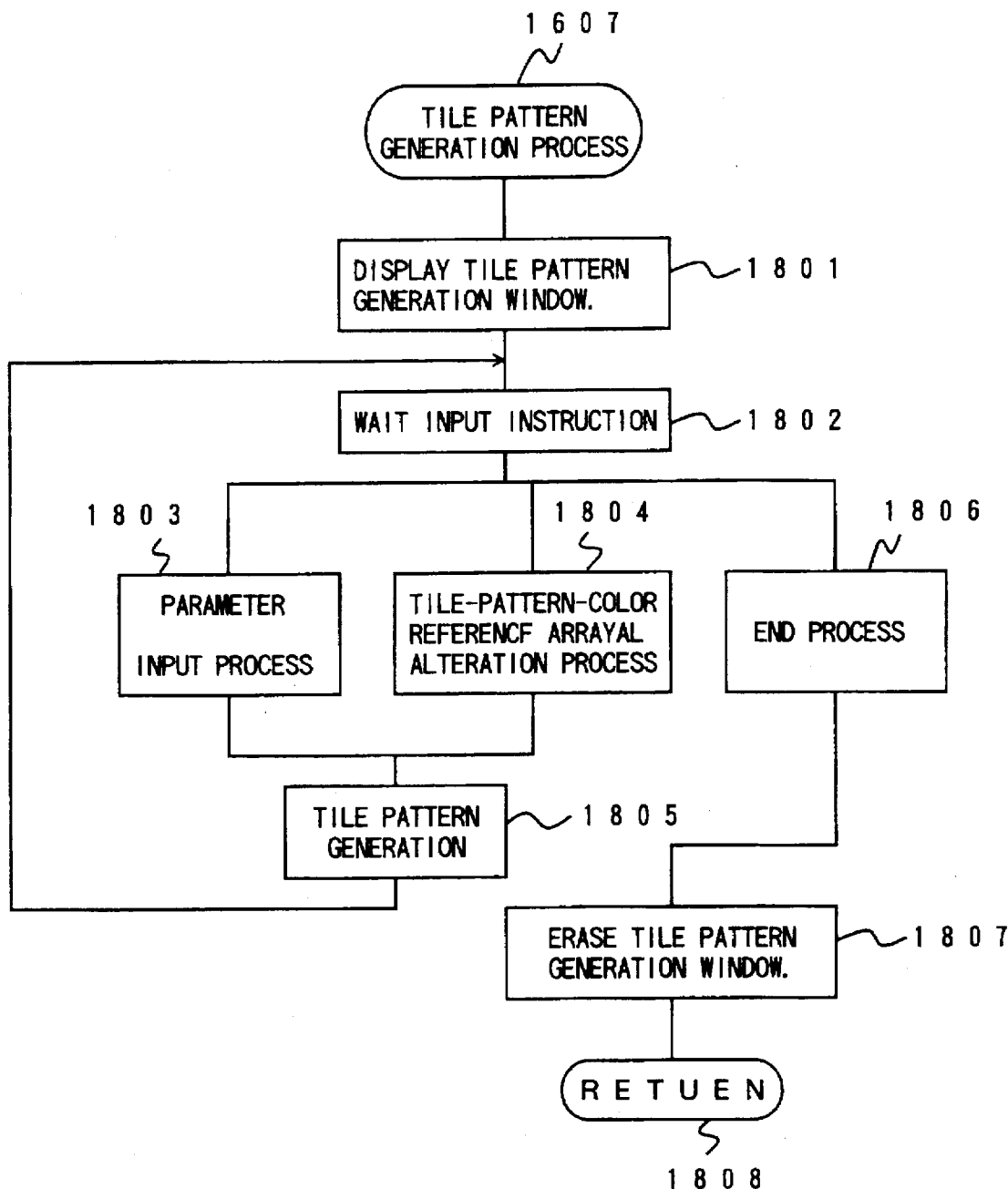
FIG. 18 is a flow chart showing the internal processing steps of a tile pattern generation process.

Next, FIG. 18 illustrates the internal processing of the tile pattern generation process 1607 which is called by the image edit process 1505. The tile pattern generation process 1607 first displays the tile pattern generation window 1101 shown in FIG. 12, in a process 1801. Thereafter, an input from the mouse, the keyboard or the like is waited in a process 1802. When the input has been received, any of a parameter input process 1803, a tile-pattern-color reference arrayal alteration process 1804 and an end process 1806 is executed in accordance with the input. When the input specifies the parameter input process 1803 or the tile-pattern-color reference arrayal alteration process 1804, the tile pattern is generated with new parameters by a process 1805. On the other hand, when the input specifies the end process 1806, the generated tile pattern is stored or abandoned, whereupon the tile pattern generation window 1101 is erased in a process 1807, and the control is returned to the process having called the tile pattern generation process 1607, in a process 1808.

The shape of the object, the image and the other mapping information items defined are delivered to the rendering apparatus 105 directly from the user interface unit 101 or through the shape generation unit 102, image generation unit 103 and mapping coordinate instruction unit 104.

In accordance with the delivered information items, the rendering apparatus 105 maps the image onto the object as stated before. Further, it performs hidden-surface removal and shading to generate a three-dimensional graphic and displays the graphic on the display device 106.

Such a rendering apparatus 105 can be realized by known techniques.

However, the rendering apparatus 105 may well be especially constructed as an apparatus further endowed with a function according to which an image designated by vector representation data can be mapped onto an object as a texture. Besides, an apparatus capable of performing hybrid hidden-surface removal and shading to be explained later may well be employed as the rendering apparatus 105.

The rendering apparatus function so that the image designated by the vector representation data can be mapped onto the object as the texture, and also performs the hidden-surface removal and shading at high speed.

Now, the former of the aforementioned rendering apparatuses will be described.

Figure 19:
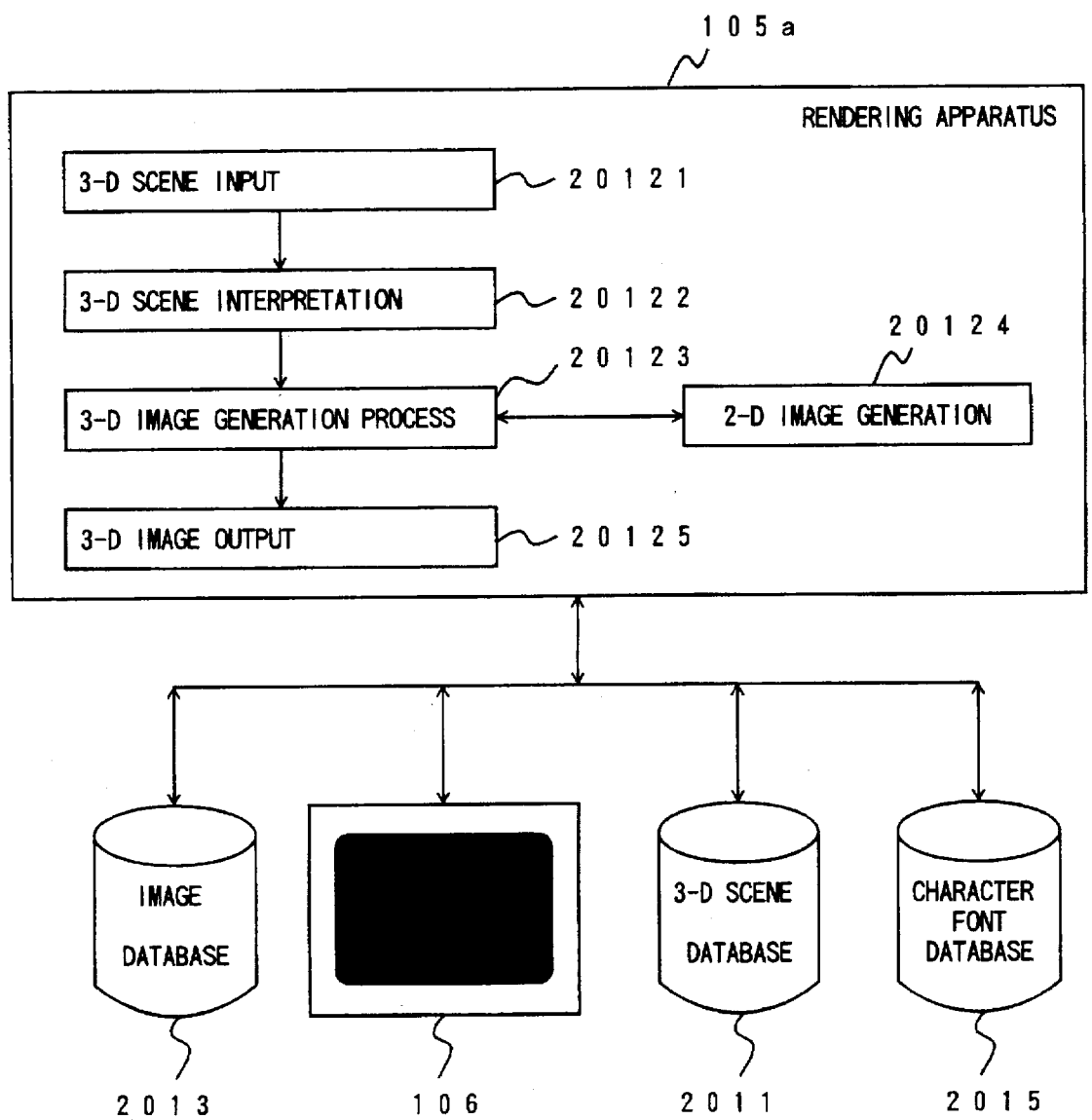
FIG. 19 is a block diagram showing the construction of a rendering/mapping apparatus which can process vector representation data as a texture.

FIG. 19 illustrates the construction of a rendering apparatus 105a which can accept vector representation data as an image to-be-mapped.

As shown in the figure, the rendering apparatus 105a is connected to a three-dimensional scene database 2011, a character font database 2015, an image database 2013 and a display device 106.

Also, the rendering apparatus 105a includes a three-dimensional scene input unit 20121, a three-dimensional scene interpretation unit 20122, a three-dimensional image generation process unit 20123, a two-dimensional image generation unit 20124 and a three-dimensional image output unit 20125.

The three-dimensional scene database 2011 is a database for storing therein various parameters concerning a three-dimensional scene which is to be generated by the rendering apparatus 105a. The three-dimensional scene is a video graphic which is obtained in a case where the space of a world coordinate system has been photographed by an assumed camera.

First, the three-dimensional scene database 2011 will be explained. Among the data items stored in the three-dimensional scene database 2011, data items for generating one three-dimensional scene are listed in Table 1 below. In addition, FIG. 20 concretely illustrates the three-dimensional scene expressed by the data items indicated in Table 1.

Incidentally, the data items listed in Table 1 may well be accumulated in the three-dimensional scene database 2011 by the rendering apparatus 105a after the user interface unit 101 of the scene origination apparatus 100 shown in FIG. 1 has accepted inputs from the user and has delivered them to the rendering apparatus 105a. Alternatively, the data items may well be accumulated in the three-dimensional scene database 2011 directly by the user interface unit 101 of the scene origination apparatus 100 shown in FIG. 1.

TABLE 1

| | |
|---|---|
| HRBegin    #Begin of generation of image | 21101 |
| /emboss {    #Definition of procedure for generating pattern | 21102 |
| /Km 1.0 paramdef #Definition of input parameter | 21103 |
| /GOTHIC findfont 0.02 scalefont setfont    #Process contents | 21104 |
| 0.01 color | 21105 |
| 0.5 0.5 moveto | 21106 |
| "ABCD" show | 21107 |
| } def | 21108 |
| #Begin of Settings of Camera | |
| 640 480 1.0 HRFormat    #Setting of resolution | 21109 |
| 1.0 HRFrameAspectRatio #Setting of aspect ratio of frame | 21110 |
| −1.0 1.0 −1.0 1.0 HRScreenWindow    #Setting of window of screen | 21111 |
| 0.25 0.75 0.25 0.75 HRCropWindow    #Setting of rendering area | 21112 |
| Perspective fov 90.0 HRProjection    #Setting of method of projection on screen | 21113 |
| #Movements of Camera | |
| 90.0 1.0 0.0 0.0 HRRotate | 21114 |
| 0.0 5.0 0.0 HRTranslate | 21115 |
| #End of Settings of Camera Attributes | |
| HRWorldBegin    #Begin of settings of subject to form 3-D scene | 21116 |
| pointlight    #Settings of light source intensity | 21117 |
| lightcolor [1.0 1.0 1.0] | |
| from [5.0 5.0 5.0] HRLightSource | |
| 1.0 1.0 0.0 HRColor #Setting of color of subject pattern | 21118 |
| Km 0.5 HRTexture    #Subject pattern | 21119 |
| 0.0 −1.0 0.0 HRTranslate #Position of subject | 21120 |
| 1.0 −1.0 360.0 HRSphere #Setting of shape of subject | 21121 |
| HRWorldEnd    #End of settings of 3-D scene | 21122 |
| HREnd    #End of generation of image | 21123 |

The data items listed in Table 1 consist of commands for defining the camera which photographs the three-dimensional scene, commands for defining the shape of a subject to-be-photographed, and commands for defining the attributes of the subject. The subject, a light source for illuminating the subject, and the camera for photographing the subject are designated with these commands, whereby the three-dimensional scene is designated. The subject corresponds to the three-dimensional object whose shape has been defined by the shape generation unit 102 of the scene origination apparatus 100.

Figure 20:
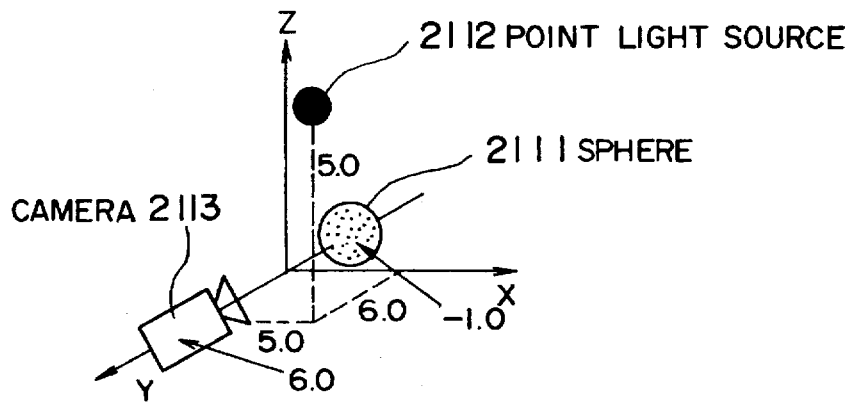
FIG. 20 is an explanatory diagram showing a space which is used for an image generation process.

As shown in FIG. 20, the subject 2111 designated by the data items mentioned in Table 1 is a sphere which has a radius of 1 (unity) and whose center lies at (0, 1, 0). The sphere bears a pattern in which letters are arrayed as "ABCDE". In addition, the light source 2112 is a point light source which exists at coordinates (5, 5, 5), whose emission intensity is 1 (unity) and whose color is of (1, 1, 1). The camera 2113 exists at coordinates (0, 5, 0), and photographs the subject 2111 while facing the minus direction of the Y-axis of the world coordinate system. Hereinbelow, the space shown in FIG. 20 shall be referred to as the world coordinate system space.

The rendering apparatus 105a generates the video graphic of the subject photographed by the camera in the world coordinate system space assumed in this manner. In this embodiment, the space of the world coordinate system and the three spaces of a camera space, a subject space and texture space which are independent of one another are set for the process for generating such a video graphic.

The relationships among these spaces are illustrated in FIG. 21.

A space defined by a coordinate system whose axes are indicated by letter A in the figure, is the camera space. In the illustrated example, the screen of the camera is set on a plane of ZA=0. Besides, it is supposed that those points on the screen on which individual points within the camera space are to be projected are known.

Figures 21A, 21B, 21C, 21D:
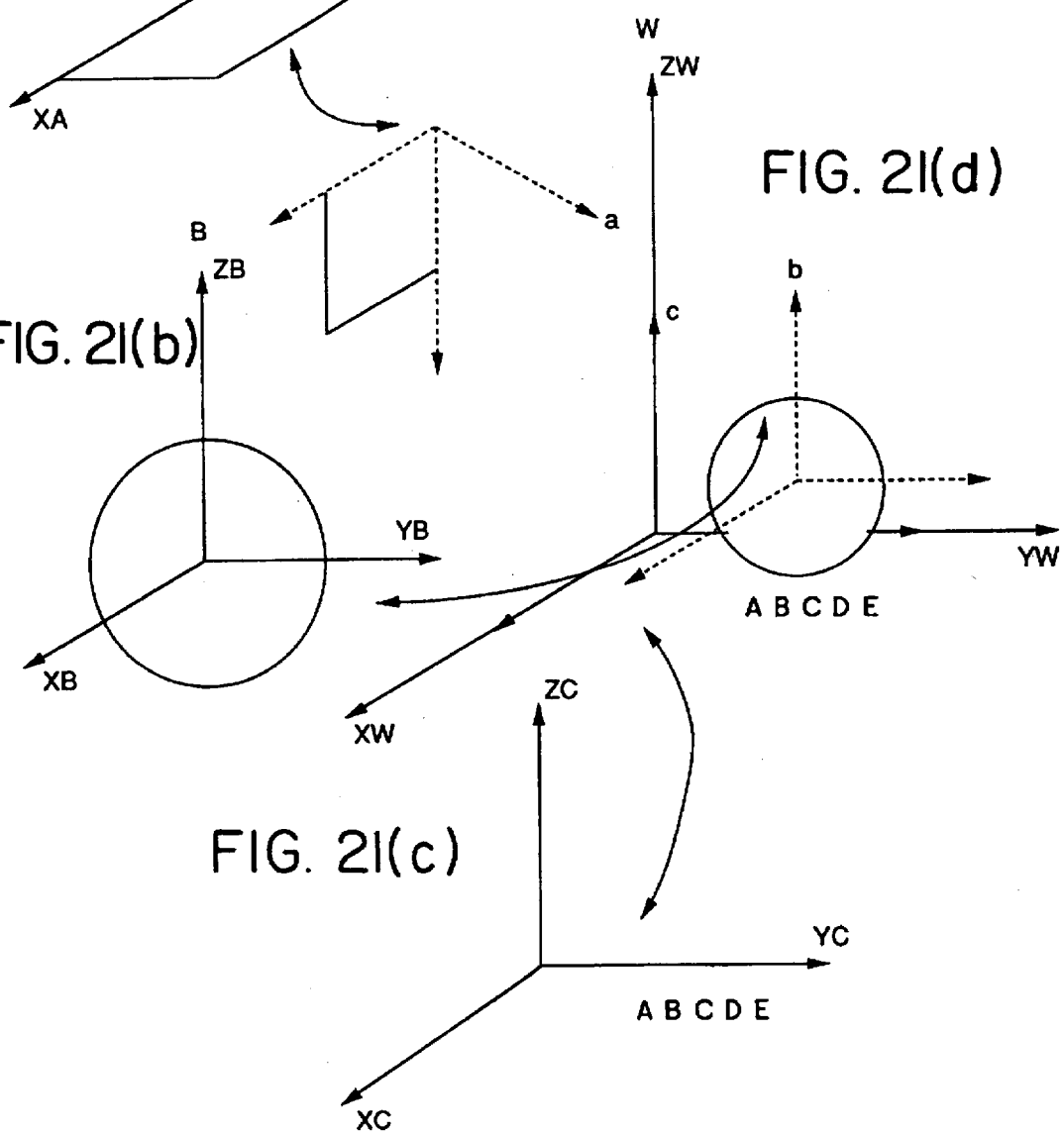
FIGS. 21(a), 21(b), 21(c), and 21(d) are explanatory diagrams showing a method of defining an image to-be-generated.

In addition, a space defined by a coordinate system whose axes are indicated by letter B in FIG. 21(b) is the subject space. In the illustrated example, the center of the sphere being the subject is held in agreement with the origin of the subject space.

Further, a space defined by a coordinate system whose axes are indicated by letter C in FIG. 21(c) is the texture space. In the illustrated example, a texture is set on a plane of ZC=0. Besides, it is supposed that, when the texture is to be mapped, those points on the texture which are to be mapped onto the corresponding points in the texture space are known.

Still further, a space defined by the world coordinate system whose axes are indicated by letter W in FIG. 21(d) is the world coordinate system space.

Referring back to Table 1, the data items are stated in a language called "PostScript". The language PostScript is expressed by the inverse Polish notation. That is, a statement containing a command is expressed in the order of a parameter and the command which uses the parameter. By way of example, in a statement 21105 mentioned in Table 1, "001" written first is a parameter which indicates blue, and "color" is a command which indicates that a color to be displayed is blue indicated by the parameter.

The data items in Table 1 will be explained in the order in which they are listed.

HRBegin in a statement 21101 declares the beginning of the generation of an image. /emboss in a statement 21102 is the name of a "procedure" for generating a pattern.

Commands lying between "{" and "}" succeeding/emboss, namely, statements 21102 thru 21108 form the procedure for generating the pattern of a subject.

The statement 21103 is a parameter which features the pattern. The statements 21104 thru 21107 serve to generate the pattern.

The statement 21104 appoints that the type of characters to be displayed is the Gothic font, and that the size of each character is 0.02. The statement 21105 defines the display color of the characters to be blue. The statement 21106 defines that a character string is displayed at a position (0.5, 0.5) in a coordinate system of two dimensions.

Statements 21109 thru 21115 define the camera 2113. The statement 21109 defines the resolution of the image to-be-generated. The statement 21110 defines the aspect ratio of the frame of the camera 2113. The statement 21111 defines the size of the screen on which the subject is projected. The statement 21112 sets a rendering area. The statement 21113 defines a method of projecting the subject on the screen, etc. The statements 21114 and 21115 define the arrangements of the camera 2113.

Statements 21116 thru 21122 define the subject. The statement 21116 declares the beginning of the definition of the subject concerning a three-dimensional scene. The statement 21117 defines a light source for illuminating the three-dimensional scene. In this manner, the light source is also defined in the defining section of the subject. Here, the statement 21117 defines the point light source 2112. The parameters of the statement 21117 are the intensity, color and position of the light source. The statement 21118 defines the color of the subject 2111. The statement 21119 defines that the pattern of the subject 2111 is set to be the pattern defined beforehand, "/emboss". The statement 21120 defines the position of the subject 2111. The statement 21121 defines that the subject 2111 is set to be the sphere having the radius 1 (unity). The statement 1122 declares the end of the definitions of the subject concerning the three-dimensional scene.

Statement 21123 declares the end of the definitions of all the parameters concerning the three-dimensional scene.

In this embodiment, the rendering apparatus 105a loads the data on the three-dimensional scene as explained above, from the three-dimensional scene database 2011, and it generates the image of the three-dimensional scene. Also, it displays the generated image on the display device 106. Alternatively, it stores the generated image in the image database 2013.

Now, the image generating operation of the rendering apparatus 105a will be described.

The three-dimensional scene input unit 20121 loads the data of the three-dimensional scene database 2011, and sends the loaded character string to the three-dimensional scene interpretation unit 20122.

Figure 22:
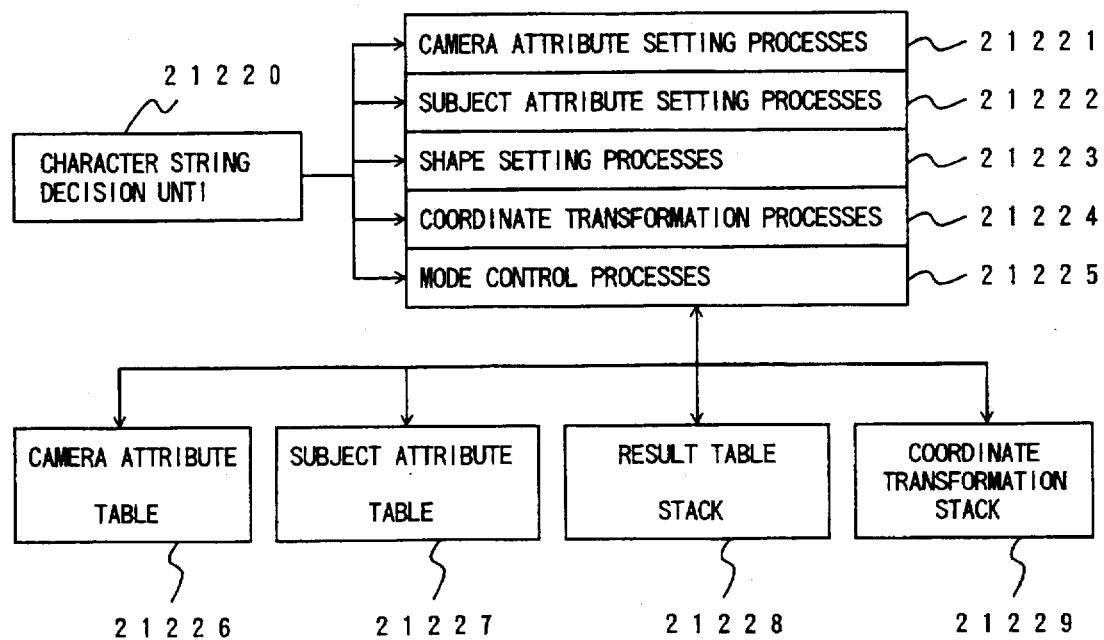
FIG. 22 is a block diagram showing the construction of a three-dimensional scene interpretation unit.

Here, reference will be had to FIG. 22 showing the construction of the three-dimensional scene interpretation unit 20122.

As shown in the figure, the three-dimensional scene interpretation unit 20122 is configured of a character string decision unit 21220, a group of camera attribute setting processes 21221, a group of subject attribute setting processes 21222, a group of shape setting processes 21223, a group of coordinate transformation processes 21224, a group of mode control processes 21225, a camera attribute table 21226, a subject attribute table 21227, a result table stack 21228 and a coordinate transformation stack 21229.

Here, the group of camera attribute setting processes 21221 are a set of processes which correspond respectively to the statements 21109 thru 21115 among the data listed in Table 1. In these processes, the camera attributes designated by the parameters in the statements are set in the camera attribute table 21226.

The group of subject attribute setting processes 21222 are a set of processes which correspond respectively to the statements 21117 thru 21120 among the data listed in Table 1. In these processes, the subject attributes are set in the subject attribute table 21227.

The group of coordinate transformation processes 21224 are a set of processes which correspond respectively to the statements 21114, 21115 and 21120 among the data listed in Table 1. In these processes, the definitions of coordinate transformations are set in the coordinate transformation stack 21229.

The group of mode Control processes 21225 are a set of processes which correspond respectively to the statements 21101, 21116, 21122 and 21123 among the data listed in Table 1. These processes control the processes for setting the current camera attributes, and the processes for setting the subject attributes.

Figure 23:
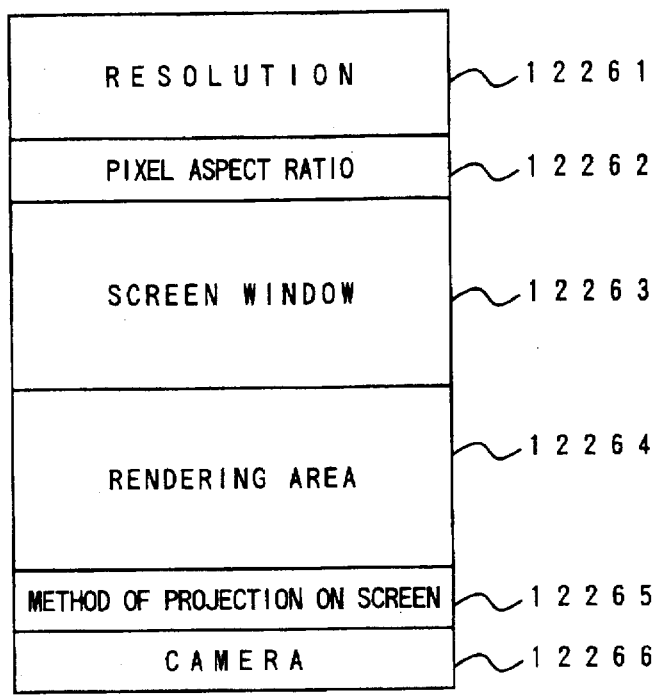
FIG. 23 is an explanatory diagram showing the organization of a camera attribute table.

As illustrated in FIG. 23, the camera attribute table 21226 is composed of the items of a resolution 12261, a pixel aspect ratio 12262, a screen window 12263, a rendering area 12264, a screen projection method 12265 and a camera space 12266.

Figure 24:
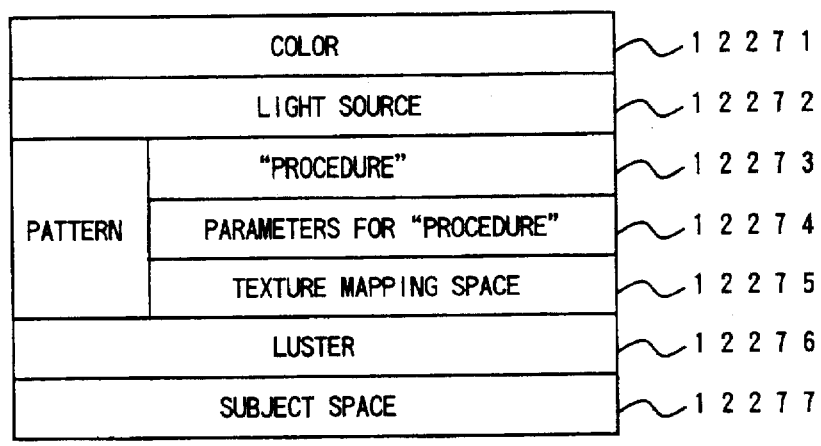
FIG. 24 is an explanatory diagram showing organization of a subject attribute table.

The subject attribute table 21227 defines all the attribute parameters of the subject as illustrated in FIG. 24. As seen from the figure, this table is composed of the items of a color 12271, a light source 12272, the procedural steps for defining a pattern 12273, parameters 12274 for the "procedure", a texture mapping space 12275, luster 12276 and subject coordinates 12277.

Upon receiving the character string from the three-dimensional scene input unit 2121, the character string decision unit 21220 decides whether the received character string indicates a command or a parameter which is to be delivered to a command. If the received character string indicates the parameter, the unit 21220 stacks the parameter into the result table stack 21228.

On the other hand, if the received character string indicates the command, the unit 21220 executes the process corresponding to this command among the group of camera attribute setting processes 21221, the group of subject attribute setting processes 21222, the group of shape setting processes 21223, the group of coordinate transformation processes 21224 or the group of mode control processes 21225.

In addition, when "{" has been input, the character string decision unit 21220 stacks subsequent character strings until the input of "}", as parameters into the interpretation result table stack 21228 without executing any processes even if the character strings indicate commands.

The operation of the three-dimensional scene interpretation unit 20122 having received the data listed in Table 1, will be explained.

First, upon receiving the statement 21101, the character string decision unit 21220 determines the command and executes that process in the group of mode control processes 21225 which corresponds to the statement 21101. The process corresponding to the statement 21101 initializes the three-dimensional image generation process unit 20123 and sets its mode into a camera attribute setting mode. Also, on this occasion, a space transformation matrix for transforming the camera space into the world space coordinates is stored in the coordinate transformation stack 21229. In this embodiment, the transformation matrix to be stored is a linear camera space transformation matrix with which the values of the coordinate axes ZA, YA and XA of the camera space are respectively transformed into the corresponding values of the coordinate axes ZW, YW and XW of the world space (refer to FIGS. 21(a) to (d)).

Subsequently, the character string decision unit 21220 stores the statements 21102–21108 used as inputs, as parameters in the result table stack 21228.

Further, when the statement 21109 has been input, the character string decision unit 21220 stores parameters "640, 480, 1.0" stated in the first half of this statement, in the result table stack 21228, and it starts that process in the group of camera attribute setting processes 21221 which corresponds to a command "HRFormat" stated in the latter half. After acknowledging the camera attribute setting mode, the process corresponding to the command HRFormat sets the image resolution 12261 of the camera attribute table 21226 to those three parameters 640, 480 and 1.0 in the statement 21109 which have been stored in the result table stack 21228 by the character string decision unit 21220.

The statements 21110 thru 21113 subsequently input are similarly processed to set the respective items of the pixel aspect ratio 12262, screen window 12263, rendering area 12264 and screen projection method 12265 of the camera attribute table 21226.

When the statement 21114 has been subsequently input, the process in the group of coordinate transformation processes 21224 corresponding to this statement 21114 is executed to originate a transformation matrix given by the following expression, which is multiplied by the camera space transformation matrix stored in the coordinate transformation stack 21229, to store the resulting product as a transformation matrix in the same stack 21229:

Expression 1:

$$\begin{vmatrix} x^2+(1-x^2)\cos\theta & xy(1-\cos\theta)+z\sin\theta & zx(1-\cos\theta)-y\sin\theta & 0 \\ xy(1-\cos\theta)-z\sin\theta & y^2+(1-y^2)\cos\theta & yz(1-\cos\theta)-x\sin\theta & 0 \\ zx(1-\cos\theta)+y\sin\theta & yz(1-\cos\theta)-x\sin\theta & z^2+(1-z^2)\cos\theta & 0 \\ 0 & 0 & 0 & 1 \end{vmatrix}$$

Here, $\theta$ denotes 90.0 being the first parameter of the statement 21114, x does 1.0 being the second parameter, y does 0.0 being the third parameter, z does 0.0 being the fourth parameter.

When the statement 21115 has been subsequently input, the process in the group of coordinate transformation processes 21224 corresponding to this statement 21115 is executed to originate a transformation matrix in which x in Expression 1 is set at 0.0 being the first parameter of the statement 21115, y at 5.0 being the second parameter, and z at 0.0 being the third parameter. The originated transformation matrix is multiplied by the transformation matrix stored in the coordinate transformation stack 21229, to store the resulting product as a new transformation matrix in the same stack 21229. This transformation matrix transforms the camera space into the space of a position indicated at letter a in FIG. 21 whose origin is the camera position within the world space.

When the statement 21116 has been subsequently input, the character string decision unit 21220 executes the process in the group of mode control processes 21225 corresponding to this command 21116, so as to set the stored transformation matrix of the coordinate transformation stack 21229 for the camera space 12266 of the camera attribute table 21226 and to alter the mode of the three-dimensional image generation process unit 2123 into a subject setting mode. Also, on this occasion, a subject space transformation matrix for transforming the subject space into world space coordinates is stored in the coordinate transformation stack 21229. In this embodiment, the transformation matrix to be stored is a linear subject space transformation matrix with which the values of the coordinate axes ZB, YB and XB of the subject space are respectively transformed into the corresponding values of the coordinate axes ZW, YW and XW of the world space (refer to FIGS. 21(a) to (d)). Also, a texture space transformation matrix for transforming the texture space into world space coordinates is stored in the coordinate transformation stack 21229. In this embodiment, the transformation matrix to be stored is a linear texture space transformation matrix with which the values of the coordinate axes ZC, YC and XC of the texture space are respectively transformed into the corresponding values of the coordinate axes ZW, YW and XW of the world space (refer to FIGS. 21(a) to (d)).

Subsequently, the character string decision unit 21220 stores parameters in the statement 21117 applied as an input, in the result table stack 21228. After acknowledging the subject attribute setting mode, the unit 21220 executes the processes in the group of subject attribute setting processes 21222 corresponding to commands in the statement 21117 and sets the parameters in the statement 21117 once stored in the result table stack 21228, for the light source 12272 of the subject attribute table 21227.

Likewise, when the statement 21118 has been input, the character string decision unit 21220 executes the process in the group of subject attribute setting processes 21222 corresponding to this statement 21118 and sets parameters "1.0 1.0 1.0" in the statement 21118 once stored in the result table stack 21228, for the color 12271 of the subject attribute table 21227.

Subsequently, when the statement 21119 has been input, the character string decision unit 21220 initially stores "pattern" as the first parameter and "Km 0.5" as the second parameter in the result table stack 21228. At the next step, the unit 21220 executes the processes in the group of subject attribute processes 21222 corresponding to the command "HRTexture". More specifically, the unit 21220 decides the first parameter stored in the result table stack 21228, and it alters the pattern definition "Procedure" 12273 of the subject attribute table 21227 into the statements 21102-21108 stored in the result table stack 21228 previously, together with the same character string "/emboss" as the first parameter.

The second parameter in the result table stack 21228 is stored in the procedural parameters 12274 of the subject attribute table 21227.

Also, the texture space transformation matrix stored in the coordinate transformation stack 21229 is set for the texture mapping space 12275.

When the statement 21120 has been subsequently input, the process in the group of coordinate transformation processes 21224 corresponding to this statement 21120 is executed to originate a transformation matrix in which x in Expression 1 is set at 0.0 being the first parameter of the statement 21120, y at 1.0 being the second parameter, and z at 0.0 being the third parameter. The originated transformation matrix is multiplied by the subject space transformation matrix stored in the coordinate transformation stack 21229, so as to store the resulting product as a subject transformation matrix in the same stack 21229. This subject transformation matrix transforms the subject space into the space of a position indicated at letter b in FIG. 21(b) whose origin is a coordinate position (0, 1, 0) within the world space.

At the next step, when the statement 21121 has been input, the character string decision unit 21220 executes the process in the group of shape setting processes 21223 corresponding to the command "HRSphere" and sets the stored subject transformation matrix of the coordinate transformation stack 21229 for the subject space 12277 of the subject attribute table 21227.

Further, the unit 21220 Supplies the three-dimensional image generation process unit 2123 with the contents of the camera attribute table 21226 as well as the subject attribute table 21227, the parameters of the statement 21121 stored in the result table stack 21228, and a shape identifier expressing the sphere.

When the statement 21122 has been subsequently input, the character string decision unit 21220 brings the mode of the three-dimensional image generation process unit 20123 into a camera attribute setting mode by means of the corresponding process in the group of mode control processes 21225.

When the statement 21123 has been input, the character string decision unit 21220 ends the processing of the three-dimensional scene interpretation unit 20122 by means of the corresponding process in the group of mode control processes 21225.

Now, there will be explained the three-dimensional image generation process unit 20123 which has received the contents of the camera attribute table 21226 as well as the subject attribute table 21227, the stored parameters of the result table stack 21228, and the shape identifier expressing the sphere, from the three-dimensional scene interpretation unit 20122.

The three-dimensional image generation process unit 20123 is a unit which originates a three-dimensional image in a three-dimensional image memory 21236 (FIG. 25) on the basis of the shape identifier, the parameters of the statement 21121 and the contents of the camera attribute table 21226 and the subject attribute table 21227 as have been sent from the three-dimensional scene interpretation unit 20122, and which delivers the contents of the three-dimensional image memory 21236 to the three-dimensional image output unit 20125.

Figure 25:
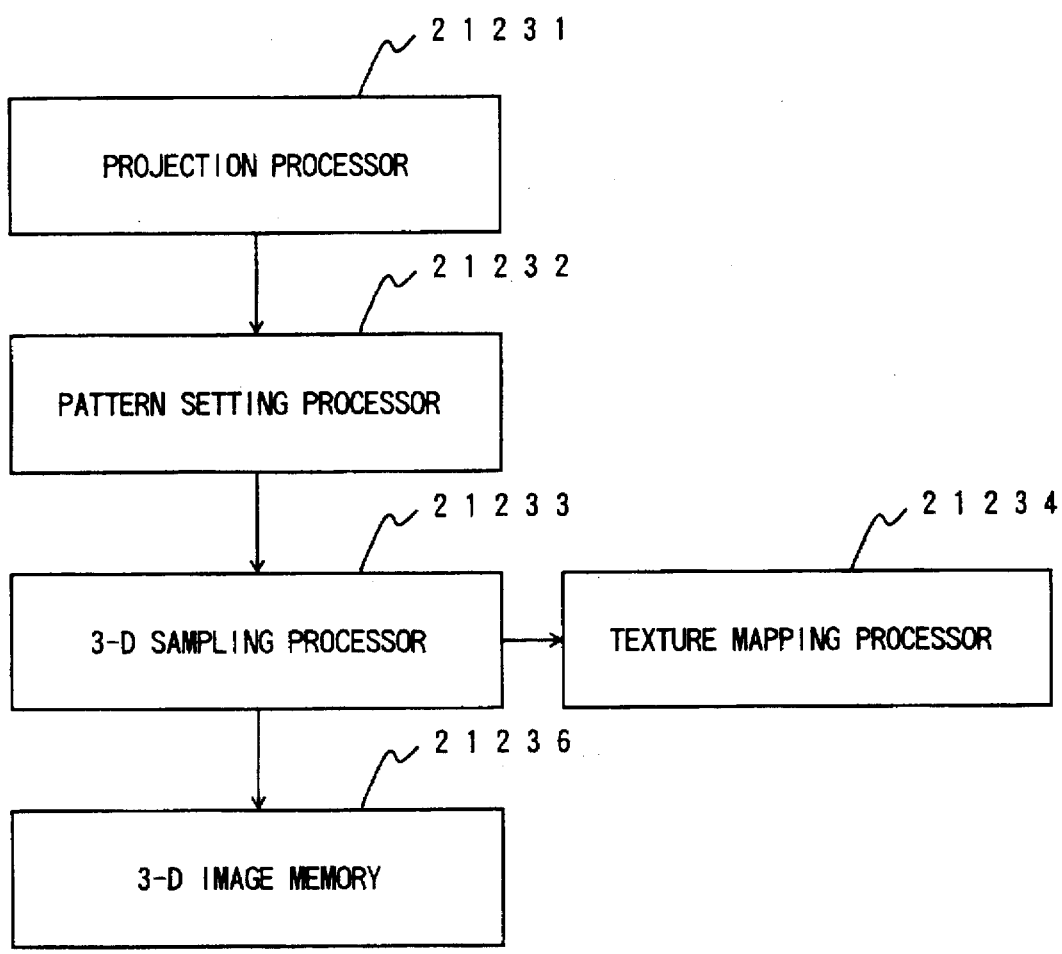
FIG. 25 is a block diagram showing the construction of a three-dimensional image generation process unit.

The construction of the three-dimensional image generation process unit 20123 is illustrated in FIG. 25.

The three-dimensional image generation process unit 20123 includes a projection processor 21231, a pattern setting processor 21232, a three-dimensional sampling processor 21233, a texture mapping processor 21234, a pattern image memory 21235, and the three-dimensional image memory 21236 referred to above.

In the three-dimensional image generation process unit 20123, the projection processor 21231 performs a projection process for obtaining the projection image of the subject on the camera screen.

The projection process proceeds as stated below.

First, the projection processor 21231 construes or interprets the parameters stored in the result table stack 21228, on the basis of the shape identifier sent from the three-dimensional scene interpretation unit 20122.

In this embodiment, the parameters of 1.0, −1.0, 1.0 and 360.0 are stored in the result table stack 21228 in correspondence with the statement 21121 contained in Table 1. In the case where the received shape identifier indicates the sphere, the projection processor 21231 construes the first stored parameter of the result table stack 21228 as the radius of the sphere, the second parameter as the lower cut surface value, the third parameter as the upper cut surface value and the fourth parameter as the sweep angle. The subject sphere thus construed is the sphere whose center lies at the origin in the subject space (refer to B in FIG. 21(c)).

Therefore, those positions of the sphere in the subject space which concern the camera space are evaluated to find the projection image of the subject on the camera screen.

More specifically, the subject transformation matrix stored in the subject space 12277 of the subject attribute table 21227 is applied to the sphere, thereby transforming the parameters of the sphere into parameters in the world space. The obtained parameters of the sphere in the world space are submitted to the inverse matrix of the camera transformation matrix stored in the camera space 12266 of the camera attribute table 21226, thereby calculating the parameters of the sphere in the camera space. Alternatively, the parameters in the subject space may well be directly transformed into the parameters in the camera space by submitting the sphere to the product between the subject transformation matrix stored in the subject space 12277 of the subject attribute table 21227 and the inverse matrix of the camera transformation matrix stored in the camera space 12266 of the camera attribute table 21226.

When the parameters of the sphere in the camera space have been calculated in this way, the parameters of the projection image of the subject on the camera screen can be obtained by projecting the calculated parameters on the camera screen in the camera space. The parameters of the project,on image of the sphere projected on the camera screen become the parameters of a circle.

Meanwhile, the pattern setting processor 21232 determines the resolution of a pattern.

The determination of the resolution of the pattern proceeds as stated below.

First, the pattern setting processor 21232 evaluates the region of the projection image of the subject projected on the camera screen in the camera space, the image having been obtained by the projection processor 21231. Subsequently, the processor 21232 determines the resolution of the pattern from the size of the evaluated region, and it sends the determined resolution of the pattern to the two-dimensional image generation unit 20124 (refer to FIG. 19), together with the arrayal 12273 of the "Procedure" for the generation of the pattern as stored in the subject attribute table 21227.

How to determine the resolution of the pattern will be explained with reference to FIG. 26.

This figure illustrates the screen of the camera 2113.

The size of the camera screen 2113B is 640 in width×480 in height, in accordance with the contents of the resolution 12261 of the camera attribute table 21226.

Figure 26:
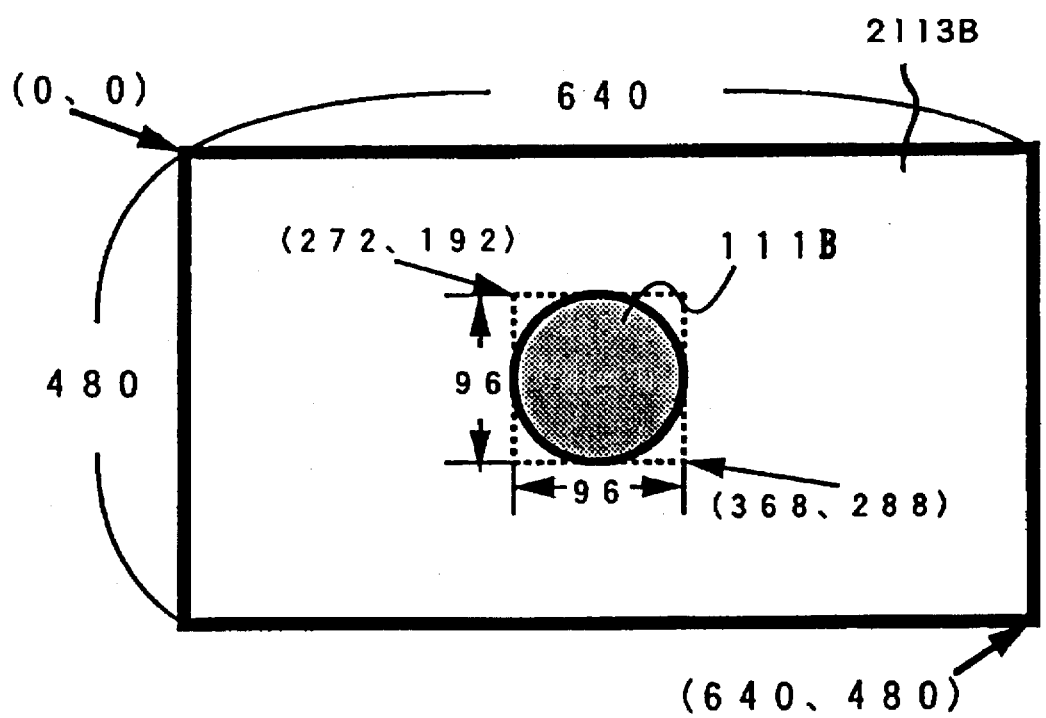
FIG. 26 is an explanatory diagram showing the image of a subject projected on a camera screen.

As shown in FIG. 26, the screen 2113B is defined by a coordinate system whose origin lies at the left upper point of this screen and whose coordinate point (640, 480) lies at the right lower point.

On this occasion, the projection image 2111B of the subject sphere 2111 is obtained with the parameters of the circle calculated by the projection processor 21231 before.

Subsequently, a rectangular region (a region indicated by broken lines in FIG. 26) which contains the projection region of the sphere is found as having the vertices of its diagonal line at coordinate points (272, 192) and (368, 288).

Accordingly, the region which is occupied by the projected sphere has a size of 96 in height×96 in width. Therefore, the pattern setting processor 21232 calculates the resolution of the pattern from the found region in accordance with Expression 2:

$$Tres = region \times 2 \qquad (Exp. 2)$$

Here, the calculated resolution Tres of the pattern becomes double the occupation region (region in Exp. 2) of the rectangular region containing the projection image 2111B. That is, it becomes a resolution of 192 in the vertical direction and 192 in the lateral direction.

According to Nyquist's theorem, the pattern of the subject suffices with an image having a spatial frequency (in other words, a resolution) which is twice the spatial frequency determined by the resolution of the screen. Therefore, when the resolution of the pattern is determined in accordance with Exp. 2, it is possible to generate an image whose pattern is clear and which has a proper resolution.

The pattern setting processor 21232 delivers the resolution thus determined, to the two-dimensional image generation unit 20124 together with the "Procedure" 12273 and the parameters for "Procedure" 12274 for the pattern in the subject attribute table 21227.

By the way, even when the resolution of the pattern is simply determined from the size of the subject and the distance between the subject and the camera screen, a value close to the proper resolution can be attained. Therefore, in a case where a very high image quality is not required, the resolution of the pattern may well be simply determined from the size of the subject and the distance between the subject and the camera screen.

Here, the explanation of the three-dimensional image generation process unit 20123 shall be once quit to elucidate the pattern generating operation of the two-dimensional image generation unit 20124.

Figure 27:
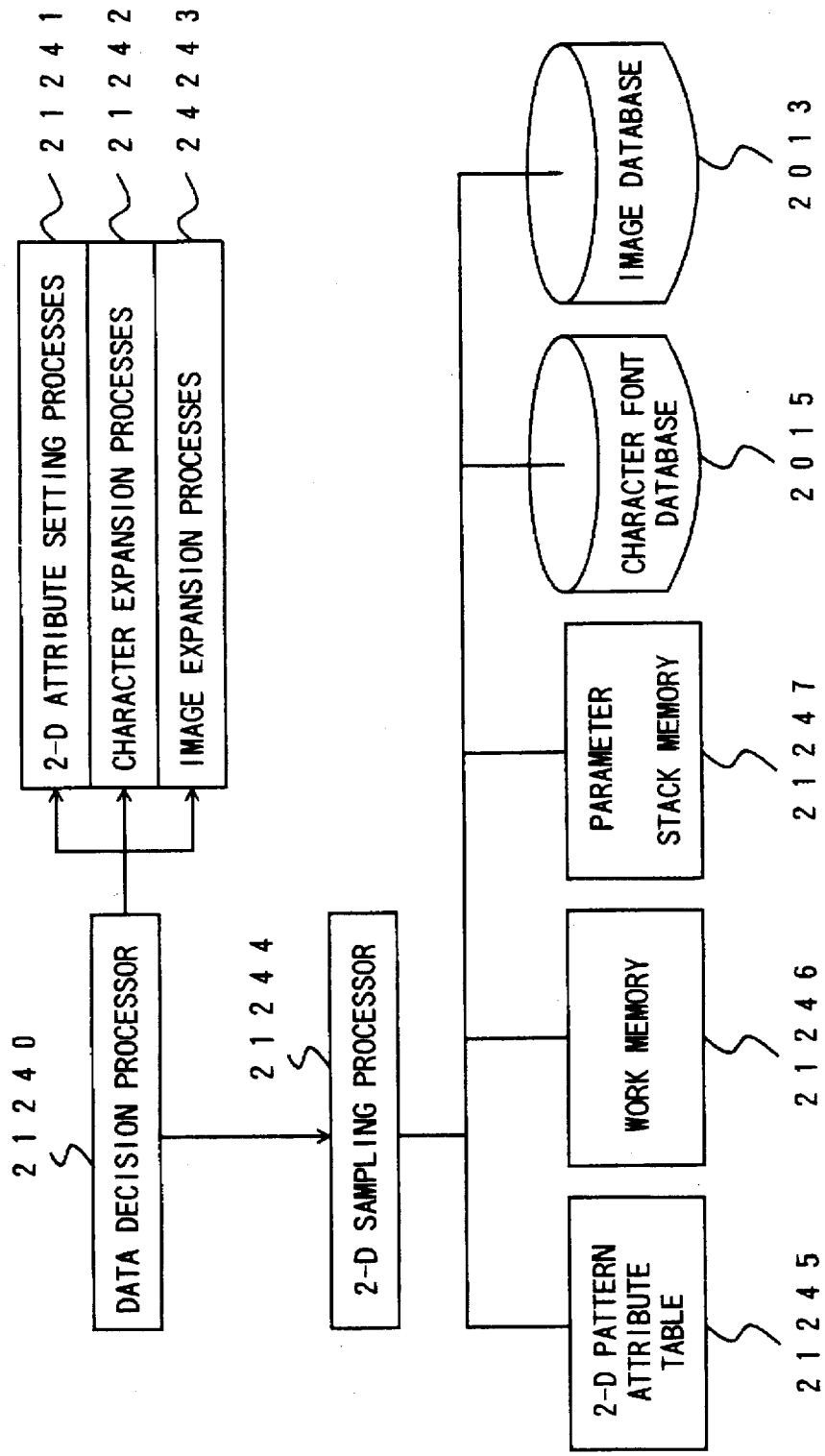
FIG. 27 is a block diagram showing the construction of a two-dimensional image generation unit.

FIG. 27 illustrates the construction of this two-dimensional image generation unit.

As shown in the figure, the two-dimensional image generation unit 20124 includes a data decision unit or processor 21240, a group of two-dimensional attribute setting processes 21241, a group of character expansion processes 21242, a group of image expansion processes 21243, a two-dimensional sampling processor 21244, a two-dimensional pattern attribute table 21245, a work memory 21246 and a parameter stack memory 21247. Numeral 2015 indicates the character font database, and numeral 2013 the image database.

The statements 21103–21107 in the data listed in Table 1 are stored in that pattern "Procedure" 12273 of the subject attribute table 21227 which the two-dimensional image generation unit 2124 receives. Therefore, upon receiving the arrayal 12273 of the pattern procedural steps of the subject attribute table 21227, the data decision processor 21240 of the two-dimensional image generation unit 20124 successively loads character strings in this arrayal and decides whether the character strings indicate commands or parameters to be delivered to the commands. When the character string indicates the parameter, the processor 21240 stores it in the parameter stack memory 21247. Besides, the processor 21240 stores the procedural parameters 12274 of the subject attribute table 21227 in the two-dimensional pattern attribute table 21245.

On the other hand, when the character string indicates the command, the processor 21240 executes that process in the group of two-dimensional attribute setting processes 21241, the group of character expansion processes 21242 or the group of image expansion processes 21243 which corresponds to the loaded command.

When the statement 21103 is input from the pattern "Procedure" 12273 of the subject attribute table 21227, the data decision processor 21240 stores the parameter "Km1.0" of the statement 21103 in the parameter stack memory 21247. Thereafter, the processor 21240 executes that process in the group of two-dimensional attribute setting processes 21241 which corresponds to the command "paramdef" of the statement 21103, and it stores the parameter "Km1.0" 12274 in the two-dimensional pattern attribute table 21245.

The statements 21104, 21105 and 21106 are similarly dealt with until the type and size of a character font, the color of a character and the arrangement position of the character, which are parameters in the respective statements, are set in the two-dimensional pattern attribute table 21245.

In this embodiment, the font type is set at the Gothic type, the font size at 0.02, and the start position of a character string at (0.5, 0.5) as indicated in Table 1.

When the statement 21107 is subsequently input, the data decision processor 21240 stores the parameter "ABCDE" of the statement 21107 in the parameter stack memory 21247 and thereafter executes the process in the group of character expansion processes 21242 corresponding to the command "show".

The process in the group of character expansion processes 21242 is one in which character contour line data is fetched from the character font database 2015 on the basis of the font type in the two-dimensional pattern attribute table 21245 and a character code constituting the character string stacked in the parameter stack memory 21247, and in which the fetched character contour line data is converted into character contour line data in a pattern domain or pattern definition space.

The character contour line data is vector representation data which indicates a curve forming the contour of a character. In general, the vector representation data expressive of a curve in two dimensions is given by Pu={X(u), Y(u)}. For example, the vector representation data expressive of a circle having a radius 1 (unity) is Pu={cos(u), sin(u)}. A shape stipulated by such vector representation data can be enlarged without accompanying the occurrence of shaggy or the like. By way of example, vector representation data Pu={Kcos(u), Ksin(u)} which expresses a circle having a radius K can be derived from the vector representation data Pu={cos(u), sin(u)} which stipulates the circle centered at the origin and having the radius 1. Then, when a curve is drawn in accordance with the vector representation data Pu={Kcos(u), Ksin(u)}, the circle having the radius K can be obtained without accompanying the occurrence of the shaggy or the like.

Incidentally, methods based on the Bezier process and the spline process have been known as expedients for stipulating a shape with such vector representation data.

Figure 28B:
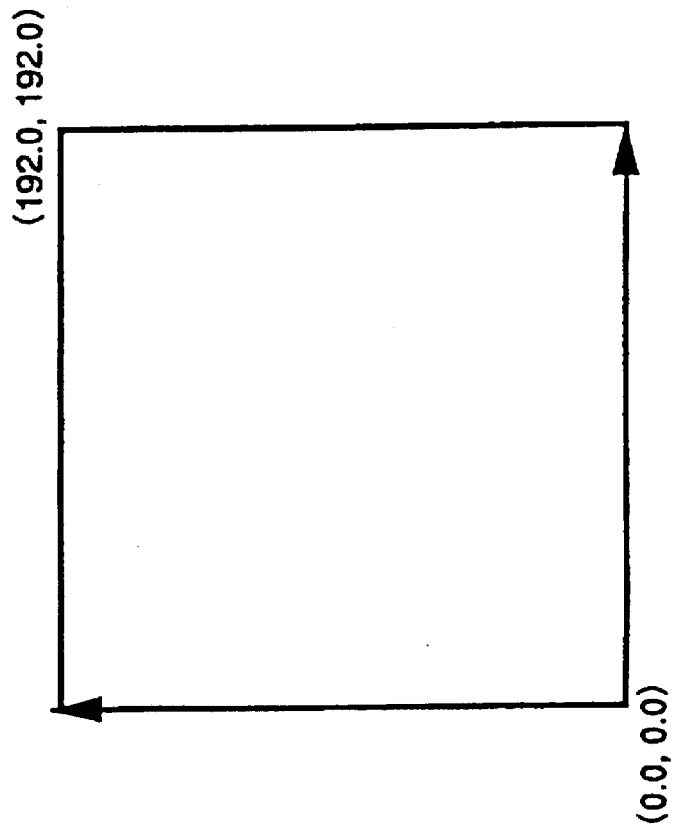
FIGS. 28(a) and 28(b) are explanatory diagrams showing a pattern domain and a pattern generation space, respectively.
Figure 28A:
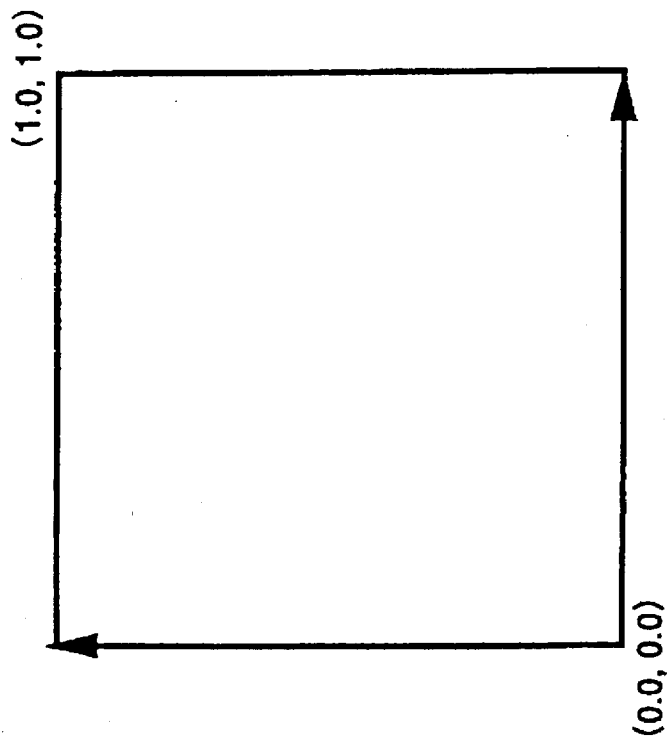

The pattern domain or definition space is a rectangular two-dimensional space in which the vertices of a diagonal line lie at the origin (0.0, 0.0) and a coordinate point (1.0, 1.0) (as shown in FIG. 28(a)).

The conversion into the character contour line data in the pattern domain proceeds as stated below.

The items of character contour line data fetched from the character font database 2015 and received from the three-dimensional image generation process unit 20123 are converted so that, in the pattern domain, each of the character fonts may have the size 0.02, while the positions of the respective characters may laterally shift the font size in succession from the coordinate position (0.5, 0.5). The resulting character contour line data items in the pattern domain are also vector representation data. The character contour line data items in the pattern domain thus obtained are stored in the work memory 21246.

When the items of character contour line data in the pattern domain have been stored in the work memory 21246, the two-dimensional sampling processor 21244 executes a process in which these data items stored in the work memory 21246 are expanded in the texture space (C in FIG. 21(c)) and in which pixels enclosed with the contour lines of the characters tinted with the color attribute of the characters stored in the two-dimensional pattern attribute table 21245 before.

The expansion of the character contour line data of the pattern domain in the texture space proceeds as stated below.

First, a rectangular image area or region in which the vertices of a diagonal line lie at coordinate positions (0.0, 0.0) and (192.0, 192.0) is supposed on the XC-YC plane of the texture space (refer to FIG. 21(c)) on the basis of the resolution of 192 in height and 192 in width received from the three-dimensional image generation process unit 20123. The relationship between the pattern domain or definition space and the image area or region in the texture space is illustrated in FIGS. 28(a) and 28(b).

Subsequently, the character contour line data in the pattern domain is converted into the character contour line data in the texture space. The conversion is done by linear transformation for transforming the pattern domain in order that the pattern domain may be superposed on the rectangular image area supposed in the texture space, with equal sizes as far as possible. In the case of this embodiment, the transformation becomes a simple enlargement one.

Besides, the XC-YC plane of the texture space is set in the work memory 21246 on the basis of the character contour line data in the texture space thus obtained. Further, the values of the pixels in the work memory, at points contained in areas enclosed with the character contour lines on the XC-YC plane, are set in accordance with the color attribute of the characters stored in the two-dimensional pattern attribute table 21245 before.

Figure 29:
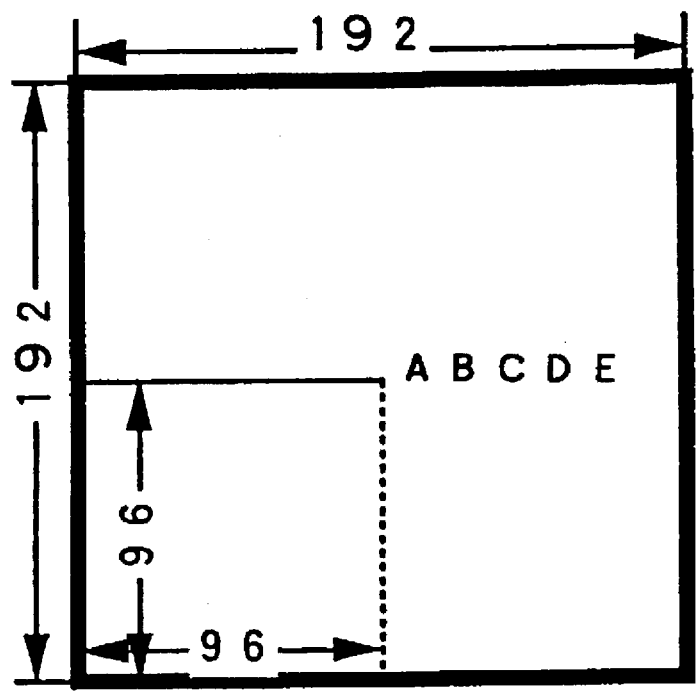
FIG. 29 is an explanatory diagram showing a generated texture.

FIG. 29 illustrates an image generated by the two-dimensional image generation unit 20124 on the basis of the "Procedure" of the pattern defined by Table 1. The generated image has the resolution of 192 in height and 192 in width. As shown in the figure, the defined Character string "ABCDE" is laterally displayed starting at a position of 96 in height and 96 an width.

Now, the explanation of the two-dimensional image generation unit 20124 shall be ended to refer back to the three-dimensional image generation process unit 20123.

The three-dimensional sampling processor 21233 of the three-dimensional image generation process unit 20123 as shown in FIG. 25 generates the image of the projection image of the patterned subject on the camera screen, in the three-dimensional image memory 21236.

Figure 30:
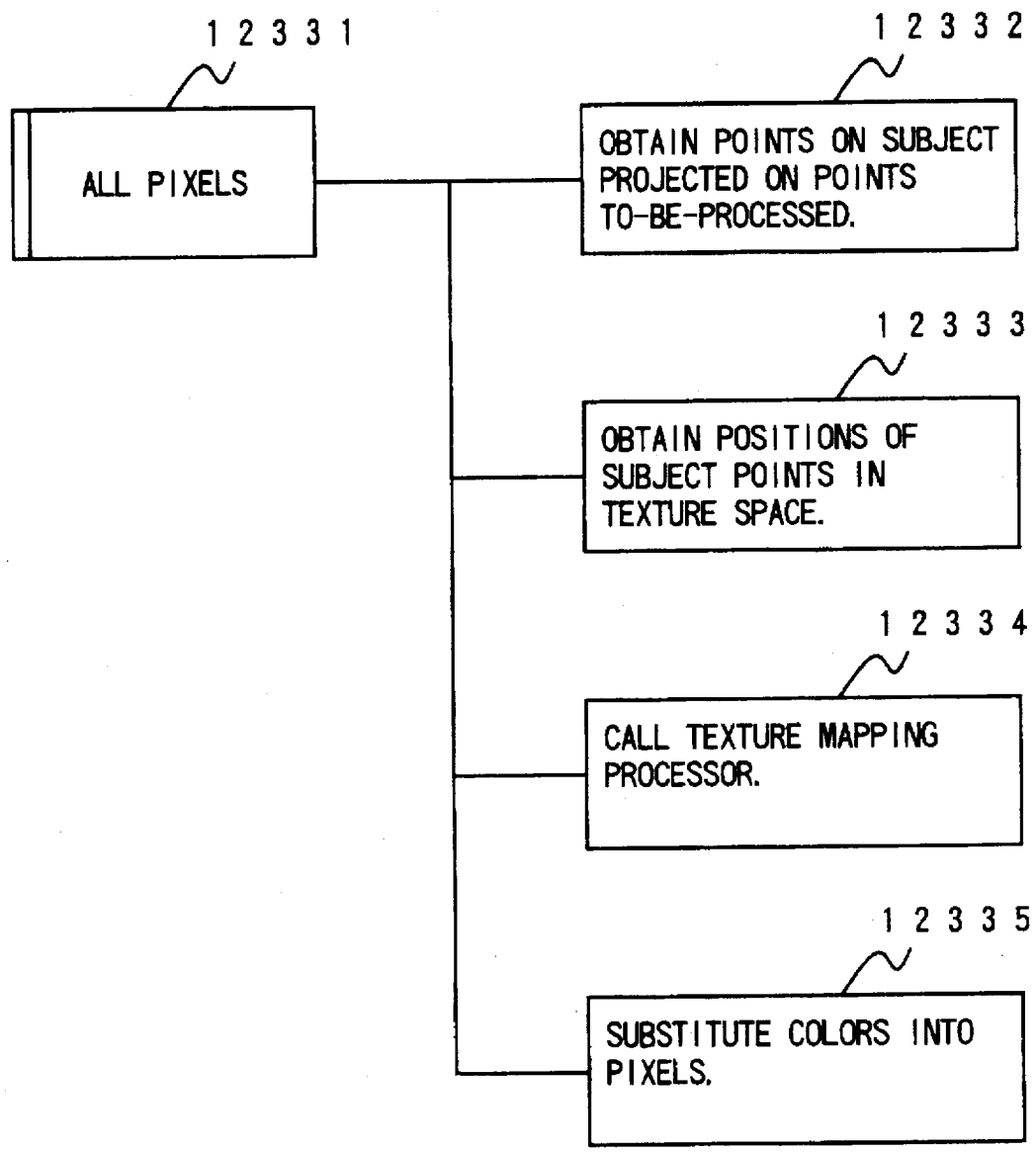
FIG. 30 is a flow chart showing the processing steps of a three-dimensional sampling processor.

The processing steps of the three-dimensional sampling processor 21233 are illustrated in FIG. 30.

First, the three-dimensional sampling processor 21233 sets the camera screen plane of the camera space in the three-dimensional image memory 21236.

Subsequently, the processor 21233 obtains points contained in the projection image of the subject sphere on the camera screen, from the parameters of the circle on the camera screen evaluated before.

Besides, the processor 21233 performs the processing steps to be stated below, as to the obtained points (hatched part in FIG. 26) within the projection image on the camera screen (12331). Here, the points to-be-processed within the projection image on the camera screen shall be called "process points".

At the first step, the point on the subject projected on the process point is sought (12332). This step may be such that the position of the subject in the camera space is obtained in the same way as in the obtainment of the projection image, whereupon the point of the subject projected on the process point is sought.

At the next step, the obtained point of the subject in the camera space has its position in the texture space calculated (12333). This processing step is carried out by evaluating the product between the inverse matrix of the camera transformation matrix set in the camera space 12266 of the camera attribute setting table 21226 and the texture space transformation matrix set in the texture mapping apace 12275 of the subject attribute table 21227, and by transforming-the point of the subject in the camera space into the position in the texture space by means of the evaluated product matrix. The calculated position lies in the texture space.

A processing step 12334 serves to start the texture mapping processor 21234 shown in FIG. 25. In starting the texture mapping processor 21234, the processing step 12334 delivers thereto that position of the point of the subject in the texture space which has been calculated at the processing step 12333.

The texture mapping processor 21234 determines the color of the pattern to be bestowed on the point of the subject, from that position of the point of the subject in the texture space which has been delivered from the processing step 12334. The determined color is the color of that point on the camera screen on which the point of the subject is projected.

The process in which the color of the pattern to be bestowed on the point of the subject is determined from the position in the texture space, proceeds as stated below.

First, the calculated position of the point of the subject in the texture space has its XC and YC coordinate values extracted. Here, the extracted XC and YC coordinate values are respectively denoted by Q and P. Subsequently, the value of that pixel in the work memory 21246 which corresponds to the coordinate position (XC=Q, YC=P, ZC=0) in the XC-YC plane of the texture space set in this work memory is found. Then, the found value of the pixel is determined as that color of the pattern with which the point of the subject is to be tinted.

Here an the above processing, the point on the subject fails to be patterned in a case where, in the texture space, the area of the pattern in the XC-YC plane deviates from the limits of XC coordinates and those of YC coordinates within which the subject exists. In such a case, therefore, the texture mapping processor 21234 moves the position of the point of the subject in the texture space in order that the limits of the XC coordinates and those of the YC coordinates of the area of the pattern in the XC-YC plane may fall within the limits of the XC coordinates and those of the YC coordinates within which the subject exists, respectively. Under this condition, the processor 21234 determines that color of the pattern which is to be bestowed on the point of the subject.

An alternative measure may be such that a statement for designating a position in the world space into which the texture space is transformed is provided in the data items listed in Table 1, and that a transformation matrix originated in compliance with the statement by the three-dimensional scene interpretation unit 2122 is set in the texture mapping space 12275 of the subject attribute table 21227.

Besides, since the position of the point of the subject in the ZC-direction of the texture space is not considered in the above processing, the pattern is mapped onto the subject in a somewhat distorted state. The distortion is corrected by post-processing.

Referring back to FIG. 30, the texture mapping processor 21234 delivers the color of the point of the subject thus determined, to a processing step 12335.

The processing step 12335 concludes the color returned from the texture mapping processor 21234, as the color of the process point, and it sets the value of the corresponding pixel of the camera screen plane in the three-dimensional image memory 21236, to the concluded color.

When the processing steps stated above have been ended for all the points contained in the projection image on the camera screen, the three-dimensional image output unit 20125 is started, and the process of the three-dimensional image generation process unit 20123 is ended.

The three-dimensional image output unit 20125 supplies the image database 2013 and the display device 106 externally provided, with the image of the camera screen plane which has been originated in the three-dimensional image memory 21236 included in the three-dimensional image generation process unit 20123.

By executing the processes thus far explained, the pattern of the subject concerning the three-dimensional scene can be displayed.

By the way, although the sphere has been handled as the subject (object to-be-photographed) of the three-dimensional scene for the brevity of description in this embodiment, a subject in any other shape can be similarly handled.

In addition, although this embodiment has referred to the subject whose shape is stipulated by parameters, even a subject whose shape is directly stipulated by parameters by dot data of three dimensions (voxel data) can be similarly processed.

Besides, in this embodiment, the texture has been mapped onto the subject by preferring the higher speed of processing and without considering the position of the point of the subject in the ZC-direction of the texture space. However, in a case where high-speed processing is not very important, the distortion of the pattern should desirably be relieved by mapping in which the position of the point of the subject in the ZC-direction of the texture space and the curved shape of the subject are taken into consideration.

It is also allowed to perform the various mapping operations which have been explained before in correspondence with the respective items; "texture", "bump", "displacement", "reflection", "refraction" and "transparency" of the mapping sort selection buttons 504 of the detailed mapping information setting window 501 shown in FIG. 5.

Now, there will be described the rendering apparatus capable of hybrid hidden-surface removal and shading as mentioned before.

Figure 31:
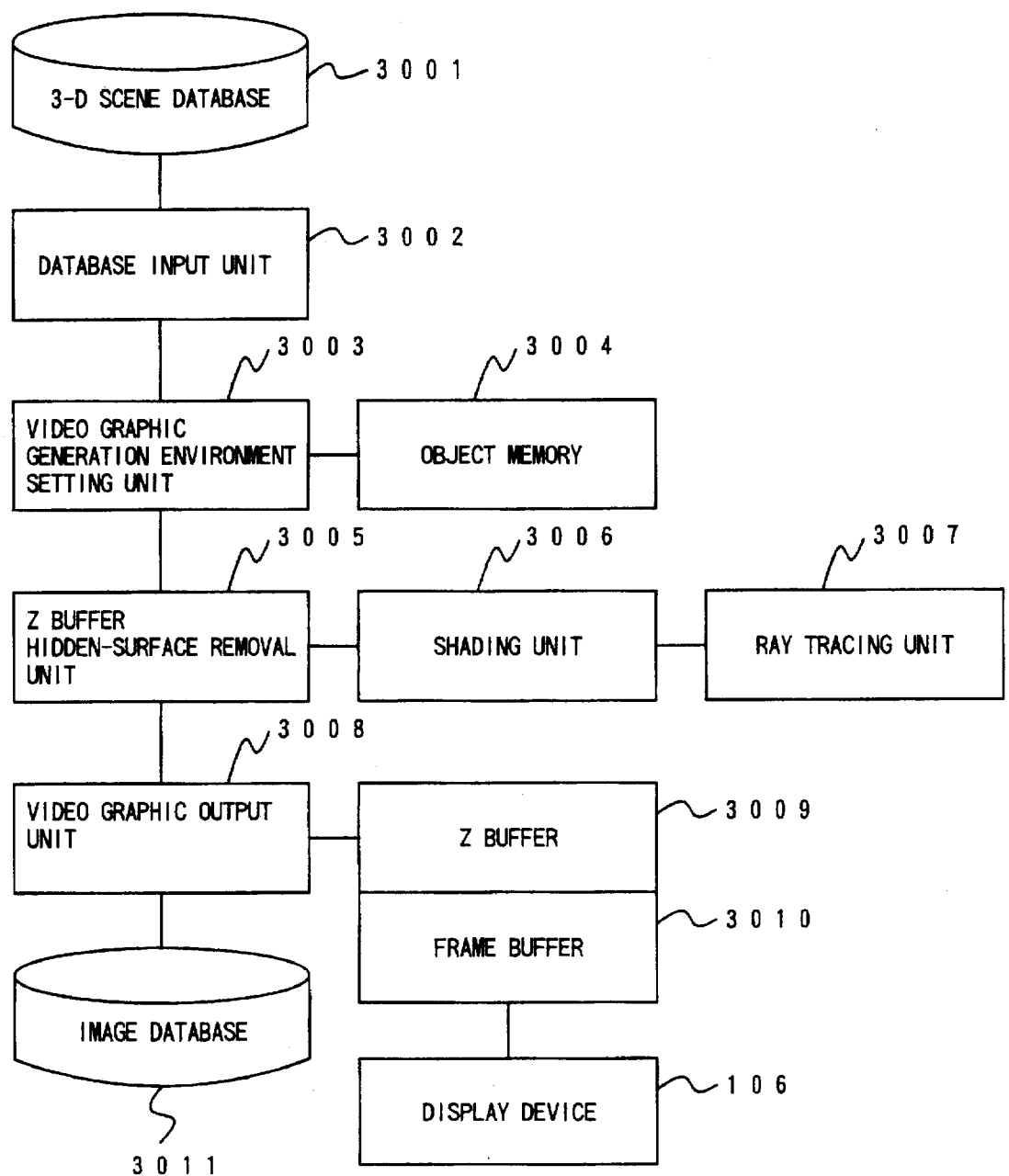
FIG. 31 is a diagram showing the construction of a rendering/mapping apparatus which can perform hidden-surface removal and shading at a heightened speed.

FIG. 31 illustrates the construction of the rendering apparatus in this embodiment.

A database input unit 3002 loads those shape data and optical attribute data of an assumed subject and camera which are stored in a three-dimensional scene database 3001.

These data items may well be generated from the information items on the shapes, images and mapping of objects received from the scene origination apparatus 100 (FIG. 1) and then stored in the three-dimensional scene database 3001.

On the basis of the loaded shape data and optical attribute data of the subject, a video graphic generation environment setting unit 3003 sets data required for a Z buffer hidden-surface removal unit 3005, a shading unit 3006 and a ray tracing unit 3007, in an object memory 3004. The Z buffer hidden-surface removal unit 3005 generates a video graphic which has been submitted to the hidden-surface removal based on the Z buffer method and the shading based on the ray tracing, by the use of the shading unit 3006, the ray tracing unit 3007, a Z buffer 3009 and a frame buffer 3010.

The generated video graphic is delivered to an image database 3011 by a video graphic output unit 3008. The frame buffer 3010 is connected to a display device 106 so as to display the video graphic.

It is now supposed that the surface of the subject is expressed by a set of planes of a plurality of triangles, and that the shape of the subject is stipulated by sets of a plurality of shape data items, each set stipulating the shape of the corresponding one of the plurality of triangular planes.

Figure 32:
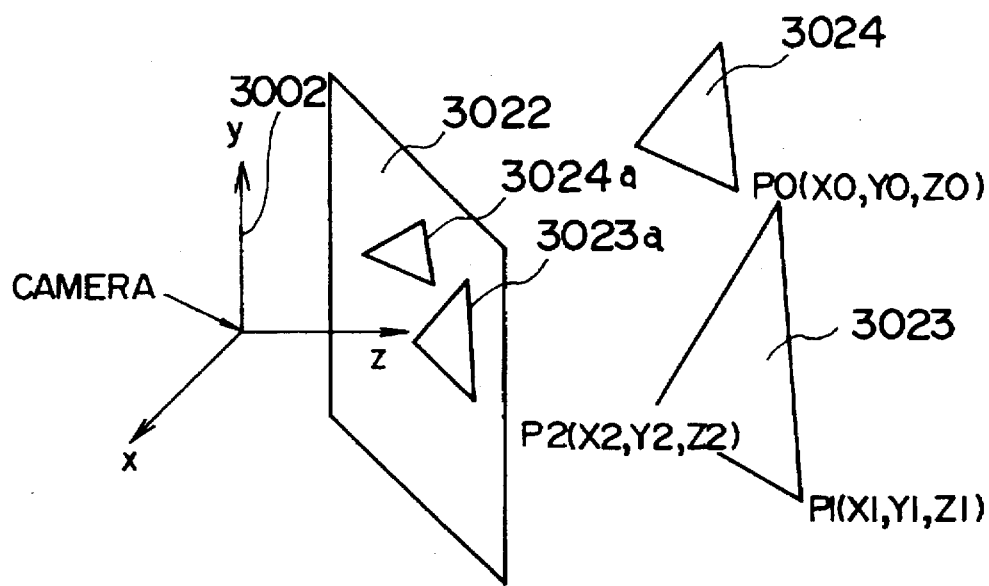
FIG. 32 is a diagram showing the organization of shape data stored in a three-dimensional scene database.

FIG. 32 illustrates an example of the shape data on the subject as stored in the three-dimensional scene database 3001. Numeral 3021 indicates the origin of coordinates. The assumed camera lies at the coordinate origin 3021. Numeral 3022 indicates an assumed camera screen. Shown at numerals 3023 and 3024 are the triangular planes into which the surface of the subject is divided. Symbols 3023a and 3024a denote images formed when the triangular planes 3023 and 3024 are projected on the assumed camera screen 3022. As shown in FIG. 32, the set of the shape data of each triangular plane stored in the three-dimensional scene database 3001 consists of the coordinate data items P0(X0, Y0, Z0), P1(X1, Y1, Z1) and P2(X2, Y2, Z2) of the three vertices of the pertinent triangle.

Figure 33:
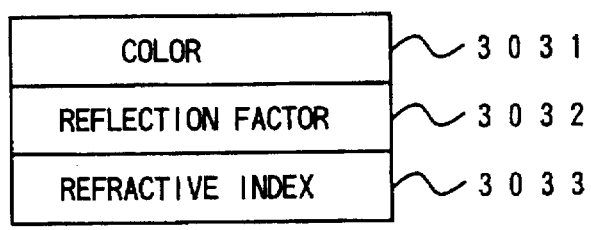
FIG. 33 is a diagram showing the organization of optical attribute data stored in a three-dimensional scene database.

FIG. 33 illustrates the organization of the optical attribute data on the subject as stored in the three-dimensional scene database 3001. Numeral 3031 indicates the data of the color of the subject. Numeral 3032 indicates the data of the reflection factor of the subject. Besides, numeral 3033 represents the refractive index of the subject. These three data items are provided for each triangular plane. Such optical attribute data items may well be obtained by performing texture mapping.

Figure 34:
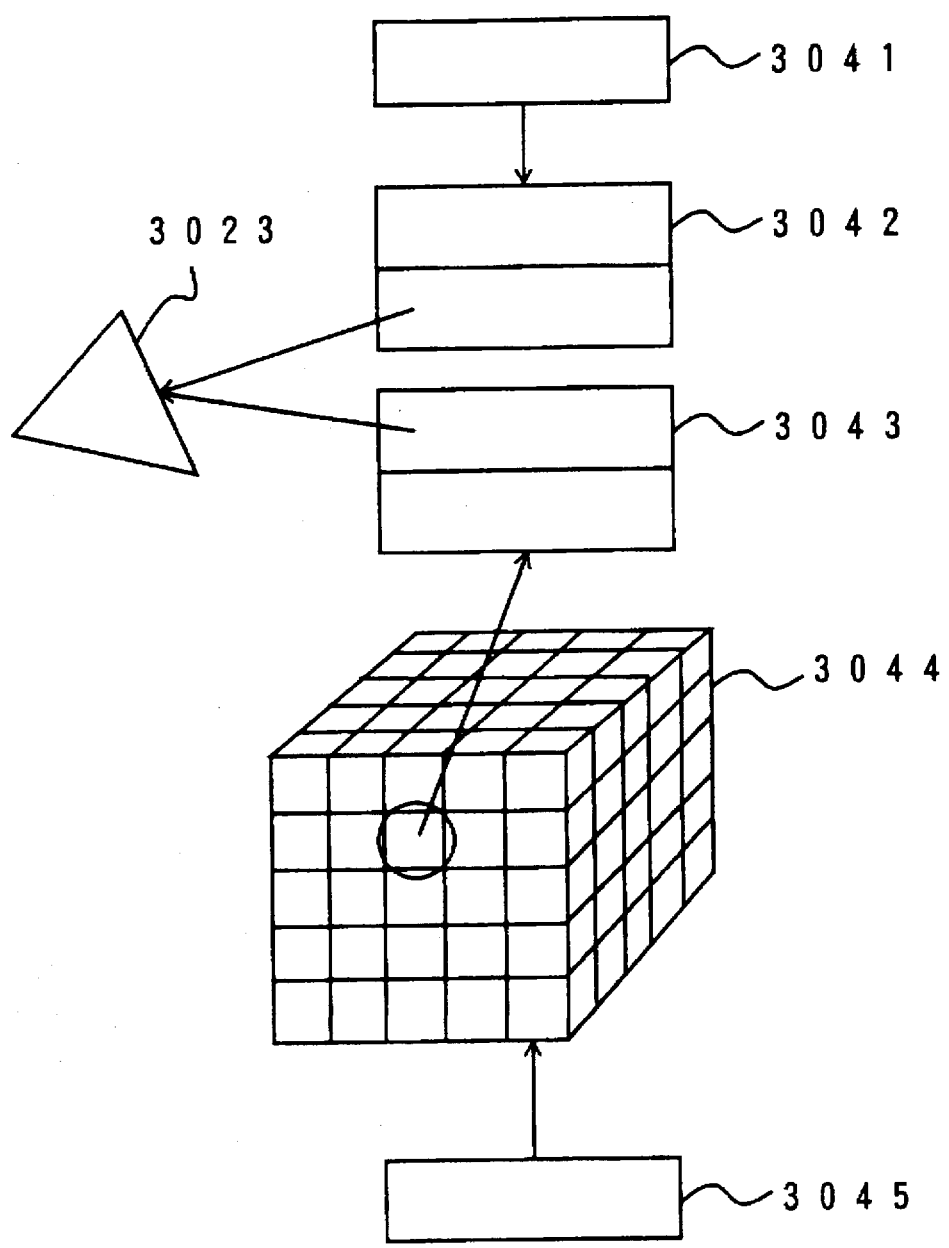
FIG. 34 is a diagram showing an object memory which is constructed by a video graphic generation setting unit.

FIG. 34 illustrates the object memory 3004 which is formed by the video graphic generation environment setting unit 3003. The data items of the subject element indicated at numeral 3023 are loaded by the database input unit 3002, and are stored in this object memory 3004. A route pointer 3041 for the Z buffer hidden-surface removal unit 3005 and a route pointer 3045 for the ray tracing unit 3007 are data items prepared beforehand, and they register the head addresses of a plurality of lists and the addresses of voxel sets to be stated below. The voxel sets indicated at numeral 3044 contain data for the ray tracing unit 3007, and they are the sets of voxel data which correspond respectively to subspaces (voxels) obtained by equally dividing a three-dimensional space where the whole subject exists. Each set of voxel data registers the list concerning the triangular plane which exists in the corresponding voxel. The voxel data items serve to efficiently process the computation of an intersection point. A list part 3042 is used by the Z buffer hidden-surface removal unit 3005, while a list part 3043 is used by the ray tracing unit 3007. The respective list parts 3042 and 3043 are independently managed by the route pointer 3041 for the Z buffer hidden-surface removal unit 3005 and the route pointer 3045 for the ray tracing unit 3007. Here, each of the list parts contains data for connecting the data items of the plurality of triangular planes, and it is composed of the address of the data of the triangular plane having been input (indicated by symbol → in FIG. 34) and that of the data of the triangular plane to be subsequently input. In the case of FIG. 34, then the shape data of one triangular plane has been input, the lists for both the units 3005 and 3007 are formed in the object memory 3004. In this Manner, the addresses concerning the shape of the subject are managed independently by the list part 3042 for the Z buffer hidden-surface removal unit 3005 and by the list part 3043 for the ray tracing unit 3007, whereby the processes of the Z buffer hidden-surface removal and the ray tracing can be simultaneously performed.

Figure 35:
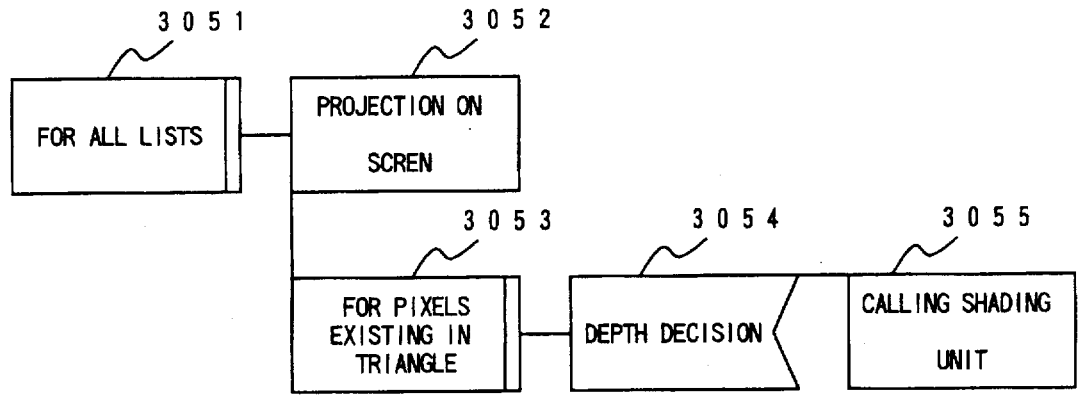
FIG. 35 is a flow chart showing the processing steps of a Z buffer hidden-surface removal unit.

FIG. 35 illustrates the flow of processing which is executed by the Z buffer hidden-surface removal unit 3005. A process 3051 begins with the route pointer for the Z buffer hidden-surface removal unit 3005, formed in the object memory 3004, and it is iterated until all the lists connected to the route pointer are dealt with. A processing step 3052 is such that the data items of the vertices of the triangle at the addresses indicated by the list are projected on the assumed camera screen 3022. Here, the respective points on the camera screen 3022, addresses in the Z buffer 3009, pixels in the frame buffer 3010 are held in correspondence. A process 3053 indicates that those addresses of the Z buffer 3009 and those pixels of the frame buffer 3010 which correspond to the area of the projected triangle are to be dealt with.

A processing step 3054 is such that a depth value stored in the address of the Z buffer 3009 currently noted is compared with the depth of the projected triangle by the use of the shape data stated above. On condition that the projected triangle lies this side, the processing step 3054 is followed by a processing step 3055. At the processing step 3055, the color of that pixel in the frame buffer 3010 which corresponds to the noted address of the Z buffer 3009 is rewritten into a color evaluated by the shading unit 3006. Simultaneously, this step 3055 supplies the shading unit 3006 with the optical attributes of the pertinent point of the projected triangular plane and the position of the pertinent point in the three-dimensional space. Also, where optical data items are not prepared in advance, and after a point on the triangular plane projected on the camera screen has been sought, texture mapping is carried out to acquire the optical data of the point.

Incidentally, although the Z buffer hidden-surface removal unit 3005 which performs the hidden-surface removal based on the Z buffer method is used in this embodiment, a scan-line hidden-surface removal unit which performs the hidden-surface removal based on the scan line method may well be used. More specifically, the individual triangles are rearranged so as to be arrayed in succession from this side with respect to the camera screen, foremost points on the triangular planes of individual camera screens are determined as the points of the surface of the three-dimensional object to be photographer by the camera, and the colors of the pixels of a frame memory corresponding to the determined points are rewritten into colors evaluated by the shading unit 3006.

Figure 36:
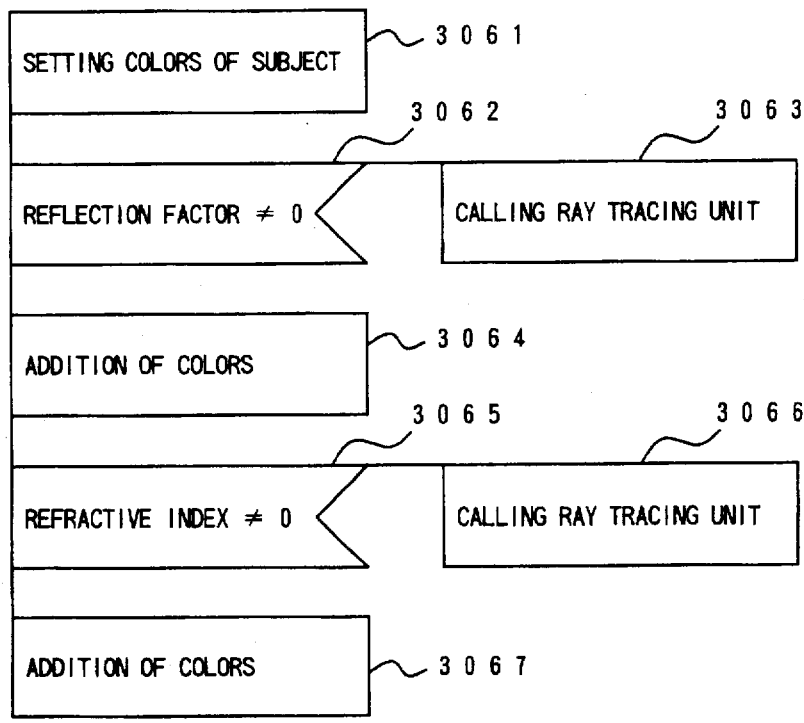
FIG. 36 is a flow chart showing the processing steps of a shading unit.

FIG. 36 illustrates the flow of processing which is executed by the shading unit 3006. A processing Step 3061 such that the color of the pixel of the frame buffer 3010 corresponding to the point on the triangular plane projected on the camera screen 3022 is set to the color supplied to the shading unit 3006. A processing step 3062 decides the reflection factor which is the optical attribute of the triangular plane. When the reflection factor is 0 (zero), the surrounding subject is not mirrored, and hence, this step 3062 prevents the ray tracing unit 3007 from being called. A processing step 3063 calculates a reflected light ray and calls the ray tracing unit 3007. A processing step 3064 is such that the intersection point between the triangular plane and the reflected light ray sought by the ray tracing unit 3007 has its color found from the optical data of the triangular plane to which the intersection point belongs, whereupon the found color to be mirrored by the reflection is added to the color set previously. In other words, this step 3064 multiplies the found color by the reflection factor and adds the resulting product to the preset color.

A processing step 3065 decides the refractive index which is the optical attribute of the subject. When the refractive index is 0 (zero), the surrounding subject is not mirrored by refraction, and hence, this Step 3065 prevents the ray tracing unit 3007 from being called. A processing step 3066 calculates a refracted light ray and calls the ray tracing unit 3007. A processing step 3067 is such that, as in the case of the reflected light ray at the processing step 3064, the found color to be mirrored by the refraction is added to the color set previously.

In the case where the optical data items are not prepared beforehand, the intersection point between the triangular plane and the reflected or refracted light ray is sought, and texture mapping is thereafter carried out to obtain the color of the intersection point.

Figure 37:
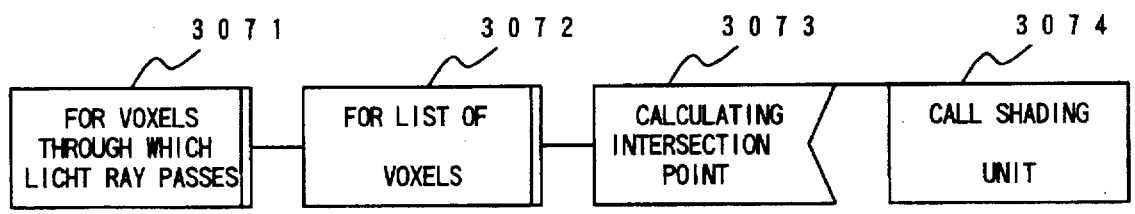
FIG. 37 is a flow chart showing the processing steps of a ray tracing unit.

FIG. 37 illustrates the flow of processing of the ray tracing unit 3007. Individual processing steps are performed as to the reflected light ray or refracted light ray delivered from the Shading unit 3006 which is a calling source. A process 3071 indicates that the voxels through which the light ray passes in the voxel set indicated by the route pointer for the ray tracing are to be dealt with. A process 3072 indicates that all the lists registered in the voxel data corresponding to the pertinent voxel are to be dealt with. The processing step 3073 calculates the intersection point between the light ray and the triangular plane indicated by the pertinent list. On condition that the intersection point exists, this processing step 3073 is followed by the processing step 3074. This processing step 3074 is such that the shading unit 3006 is called in order to find the color of the subject where the intersection point exists.

The texture mapping in the above processing can be implemented by the mapping technique stated before, in which the vector representation data is used for the texture.

Meanwhile, a video graphic production system for producing the video graphics of an animation etc. in compliance with the instructions of a user can be constructed by employing the three-dimensional graphic system shown in FIG. 1 or the rendering apparatus shown in FIG. 19 or FIG. 31.

Now, such a video graphic production system will be described.

Figure 38:
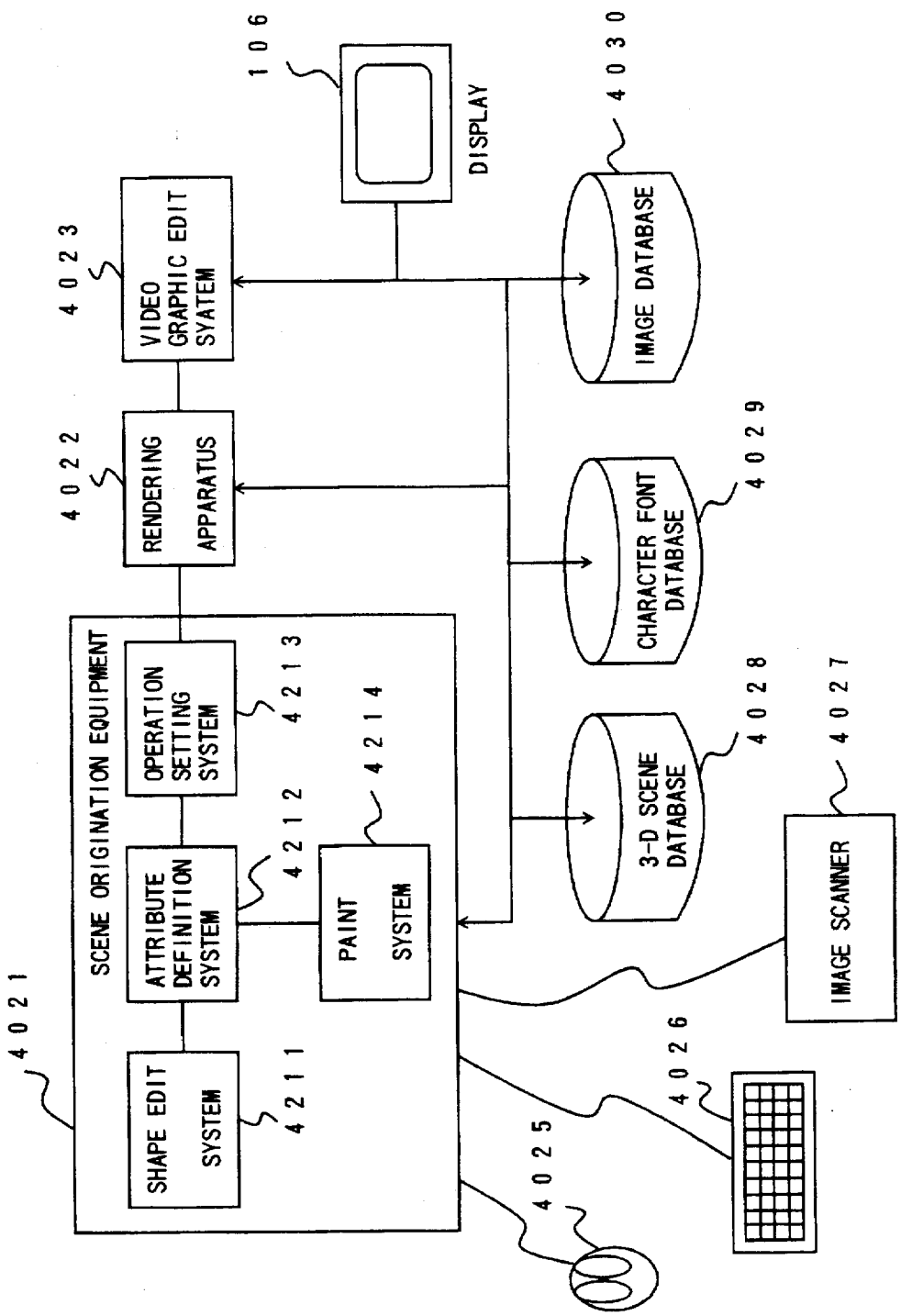
FIG. 38 is a block diagram showing the architecture of a video graphic production system according to an embodiment of the present invention.

FIG. 38 illustrates the architecture of the video graphic production system.

As shown in the figure, the video graphic production system according to this embodiment includes a scene origination equipment 4021 for originating and editing a three-dimensional scene, a rendering apparatus 4022, a video graphic edit system 4023 for recording and editing an originated image, a mouse 4025, a keyboard 4026, an image scanner 4027 for picking up an image such as photograph, a three-dimensional scene database 4028, a character font database 4029, an image database 4030, and a display device 106.

As the scene origination equipment 4021, the foregoing scene origination apparatus 100 shown in FIG. 1 can be employed, but one of different construction shall be exemplified here.

The scene origination equipment 4021 shown here is configured of a shape edit system 4211 which originates and edits a shape, an attribute definition system 4212 by which optical attributes and the attributes of patterns etc. are defined for the originated shape, an operation setting system 4213 by which movements are defined for the generated shape, and a paint system 4214 which originates and edits the pattern of a subject.

The foregoing rendering apparatus shown in FIG. 19 or FIG. 31 can be employed as the rendering apparatus 4022.

Here, this embodiment shall be described as employing the rendering apparatus 105a shown in FIG. 19. In FIG. 38, the three-dimensional scene database 4028, character font database 4029 and image database 4030 are depicted in the state in which they are taken out of the rendering apparatus 4022.

The operation of the video graphic production system will be outlined.

The scene origination equipment 4021 displays an inputting frame on the display device 106 so as to accept the inputs of the subject, the movement thereof, the pattern thereof, etc.

The user gives the inputs of the subject, the movement of the subject, the image pattern to be mapped onto the subject, etc. by means of the keyboard 4026, the mouse 4025 and the image scanner 4027.

In accordance with the contents of the inputs, the scene origination equipment 4021 originates data items as listed in Table 1 before and writes them into the three-dimensional scene database 4028.

The rendering apparatus 4022 reads and interprets the contents of the three-dimensional scene database 4028 so as to originate the image in which the three-dimensional scene is mirrored. Subsequently, the rendering apparatus 4022 stores the originated image in the image database 4030. Alternatively, it sends the originated image directly to the video graphic edit system 4023.

The video graphic edit system 4023 edits the image sent from the image database 4030 or directly from the rendering apparatus 4022, so as to generate the animation or the final image.

Next, the operation of the video graphic production system will be described in detail.

Figure 39:
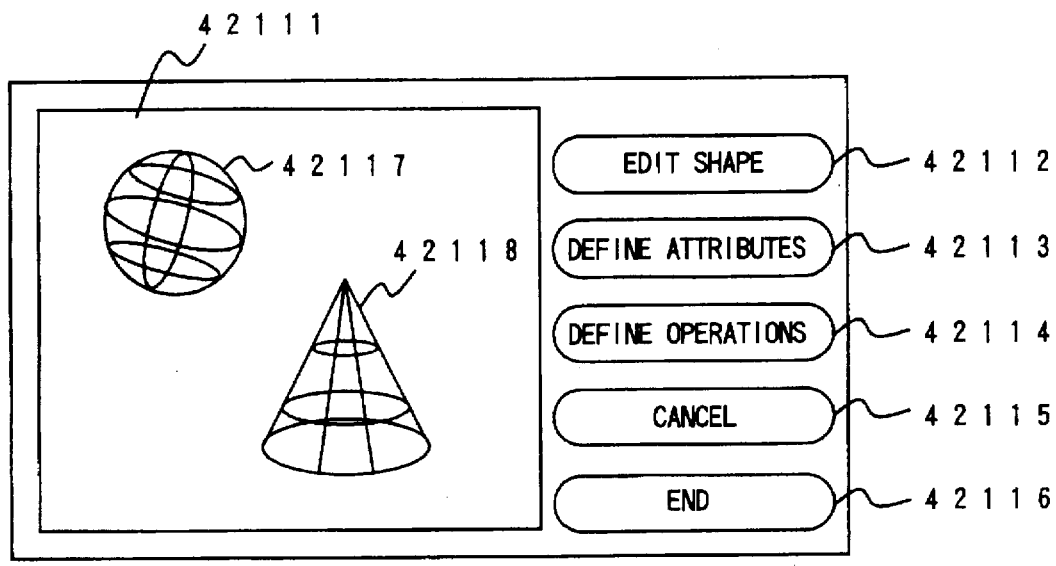
FIG. 39 is an explanatory diagram showing the displayed contents of an inputting frame which is generated by a scene origination equipment in the embodiment of FIG. 38.

When started, the scene origination equipment 4021 displays the inputting frame shown in FIG. 39.

Referring to FIG. 39, an area 42111 serves to input the arrangement of the subject. An area 42112 accepts a start instruction for the shape edit system 4211. An area 42113 accepts a start instruction for the subject attribute definition system 4212. An area 42114 accepts a start instruction for the movement definition system 4213. An area 42115 accepts a start instruction for a process for canceling any process afforded as an input. An area 42116 accepts a start for a process for ending an input operation. When any of these areas has been picked with the mouse 4025, the system corresponding to the designated area is started.

Shapes 42117 and 42118 in FIG. 39 are the shapes of three-dimensional objects afforded as inputs.

The shape edit system 4211 functions to define and edit the three-dimensional shape. When started, this system 4211 displays a shape editing frame as predetermined, by which a quadratic curved surface, a free curved surface defined by control points, or the like is accepted as the shape of the subject. When the processing of the shape edit system 4211 has ended, the inputting frame of the scene origination equipment 4021 as shown in FIG. 39 is resumed.

Figure 40:
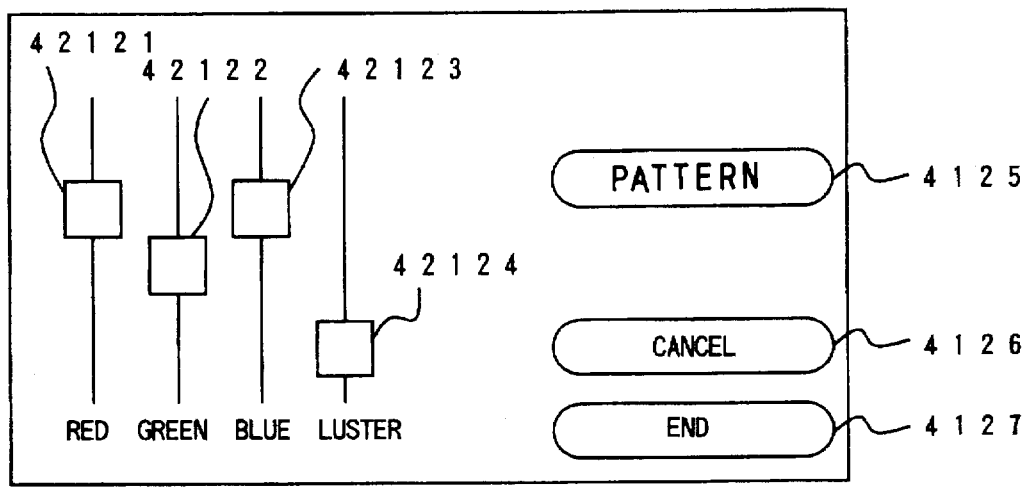
FIG. 40 is an explanatory diagram showing the displayed contents of an inputting frame which is generated by an attribute definition system in the embodiment of FIG. 38.

The attribute definition system 4212 is a system by which an inputting frame shown in FIG. 40 is displayed on the screen of the display device 106 so as to accept the inputs of the parameters of colors, luster and a pattern as the optical attributes of the subject.

Referring to FIG. 40, areas 42121, 42122 and 42123 are sliders which accept the settings of the parameters of the colors. An area 42124 is a slider which accepts the setting of the parameter of the luster.

The user moves the position of the slider in such a way that the area of the slider is vertically shifted while it is kept picked by means of the mouse 4025. The attribute definition system 4212 accepts a value determined according to the moved position of the slider, as the parameter.

Further, an area 42125 accepts the start of the paint system 4214 which sets the pattern. When the area 42125 has been picked with the mouse 4025, the attribute definition system 4212 transfers processing to the paint system 4214. This paint system 4214 performs the processing to be stated later, and returns the data of the pattern to the attribute definition system 4212. Then, the attribute definition system 4212 accepts the returned data of the pattern as a pattern attribute. An area 42126 accepts the start of a process for canceling any set attribute. An area 42127 accepts the start of a process for ending the processing of the attribute definition system 4212. When the processing of the attribute definition system 4212 has ended, the inputting frame of the scene origination equipment 4021 as shown in FIG. 39 is resumed.

Figure 41:
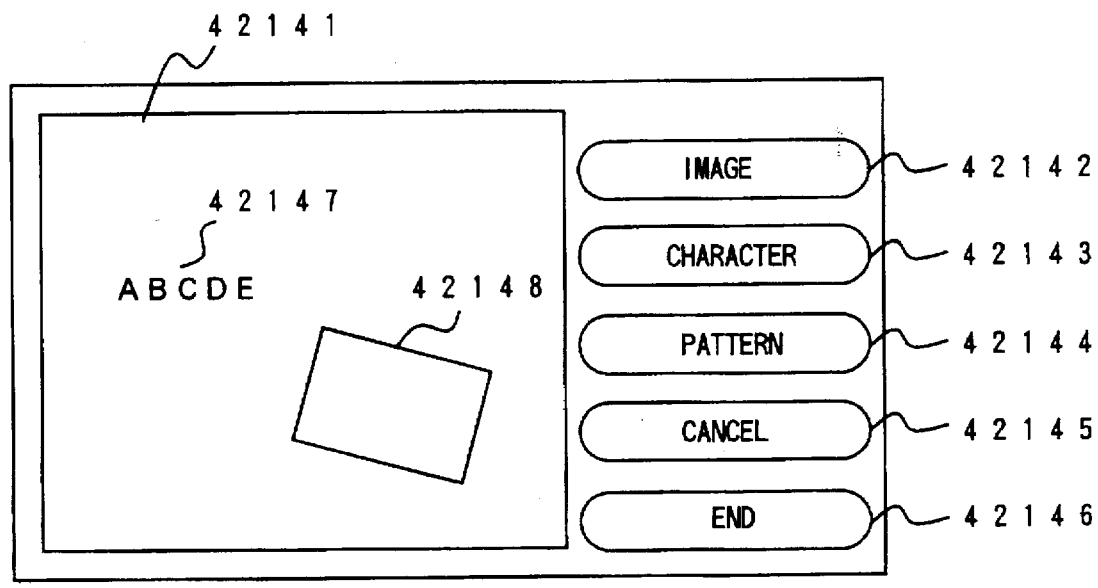
FIG. 41 is an explanatory diagram showing the displayed contents of an inputting frame which is generated by a paint system in the embodiment of FIG. 38.

The paint system 4214 is a system by which an inputting frame shown in FIG. 41 is displayed on the screen of the display device 106 so as to accept the inputs of a pattern, an image and a character of two dimensions for the patterns of the subject.

Referring to FIG. 41, an area 42141 is an area with which the user performs an input operation. Processes for the shift, edit, deformation etc. of the character, pattern or image afforded as the input are executed in this area 42141. An area 42142 accepts the start of a process for picking up the photograph or the image by means of the image scanner 4027 or a process for fetching the image from the image database 4030. An area 42143 accepts the start of a process for accepting a character string or the character. An area 42144 accepts the start of a process for defining the two-dimensional pattern. An area 42145 accepts the start o a process for canceling the contents of the inputs set with the paint system 4214 then and for reverting to the attribute definition system 4212. An area 42146 accepts the stack of a process for ending the processing of the paint system 4214 and for reverting to the attribute definition system 4212. When all the input operations have ended, this area 42146 is picked to start the above process for reverting to the attribute definition system 4212.

The paint system 4214 registers the pattern(s), character (s) and image(s) afforded as the inputs, in the order in which they have been generated. Herein, regarding the pattern, the vector data and attributes of this pattern are directly registered. Besides, regarding the character, the attributes and code of this character are registered. Regarding the image, pixel information is stored in the image database 4030, and the name and attributes of the stored image are registered. When the area 42146 has been picked, the paint system 4214 returns the registered data of the character(s), pattern(s) and image(s) to the attribute definition system 4212 and then ends its processing. Numerals 42147 and 42148 in FIG. 41 represent the character string and the pattern which have been input with the paint system 4214, respectively. The keyboard 4026 is used for inputting such a character string, while the mouse 4025 is used for inputting such a pattern. The patterns are rectangles, circles, free curves, etc.

The movement definition system 4213 accepts the movements of the defined three-dimensional shape. The movement is input in the form of movement definition data for defining this movement.

When the edit operations with the scene origination equipment 4021 as thus far explained have ended, this equipment 4021 originates the data of the data format of the three-dimensional scene database 4028 as elucidated before in conjunction with Table 1, while analyzing the registered shape and attributes of the accepted subject, and it stores the originated data in the three-dimensional scene database 4028, whereupon it ends its processing. In the storing operation, data items oh the pattern are also stored in the database 4028 as the "Procedure" stated before.

The rendering apparatus 4022 generates the image by loading the data stored in the three-dimensional scene database 4028. On this occasion, when the image is the pattern, the data loaded from the three-dimensional scene database 4028 contains only the information of the name of the definition of the image. Therefore, the rendering apparatus 4022 searches the image database 4030 for the image on the basis of the name and fetches the pattern therefrom. Regarding the character and the pattern, the rendering apparatus 4022 processes them similarly to the rendering apparatus 105a explained with reference to FIG. 19 before. The image finally generated is stored in the image database 4030 or delivered to the video graphic edit system 4023, whereupon the rendering apparatus 4022 ends its processing.

The video graphic edit system 4023 is a system in which the image originated by the rendering apparatus 4022 is edited to originate the animation.

Figure 42:
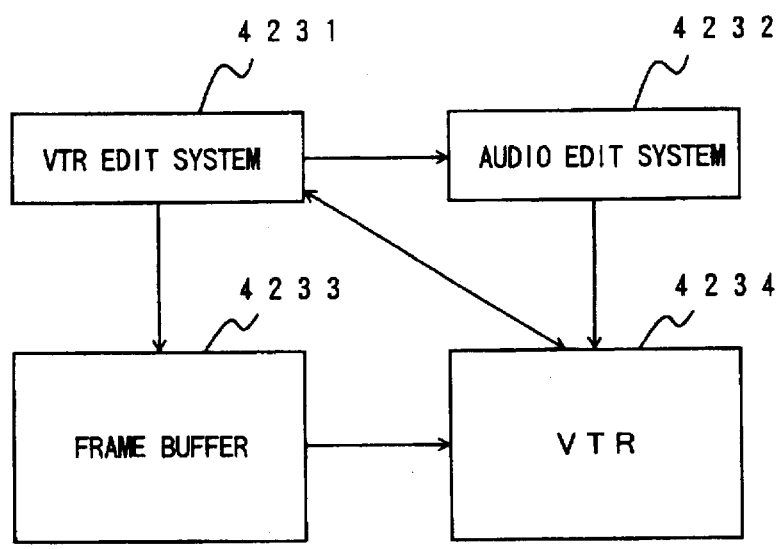
FIG. 42 is an explanatory diagram showing the block arrangement of a video graphic edit system in the embodiment of FIG. 38.

FIG. 42 illustrates the construction of the video graphic edit system 4023. As shown in the figure, this system 4023 includes a VTR edit system 4231, an video edit system 4232, a frame buffer 4233 and a VTR 4234.

The frame buffer 4233 is a memory in which the images are temporarily stored. The VTR 4234 records the images. The VTR edit system 4231 fetches the images from the image database 4030 and stores them in the frame buffer 4233 so as to record the images in succession by means of the VTR 4234.

The audio edit system 4232 serves to bestow a sound on the video graphic recorded on a video tape by the VTR 4234. The sound generated by the audio edit system 4232 is recorded on the video tape by the VTR 4234 under the control of the VTR edit system 4231.

What is claimed is:

1. An image generating method, wherein a cursor is displayed on a display screen to generate an image in which a first point is located by the displayed cursor and points vicinal to the first point are drawn, comprising the steps of:

(a) determining a relationship between densities each representing a gray level to be used for a drawing and distances from the first point respectively; and (b) generating an image in which said first point and each of said points vicinal to said first point are drawn at the gray level represented by the densities related to the distances between said first point and each of said points vicinal to said first point respectively by the determined relationship.

2. An image generation method wherein a cursor is displayed on a display screen to generate an image in which a first point is located by the displayed cursor and points vicinal to the first point are drawn, comprising the steps of:

(a) determining a relationship between a density representing gray level and a distance of said vicinal points from the first point; and (b) generating an image in which said first point and said points vicinal to said first point are drawn at the density representing gray level conforming to the determined relationship;

wherein step (a) comprises the steps of:

displaying on said display screen a graph which represents a relationship between a distance from the first point of said cursor and a density representing gray level of said first point, accepting a setting of a shape of the displayed graph on said display screens, and determining said relationship between said distance from said first point of said cursor and said density representing gray level of said first point, in accordance with the accepted setting of said shape of said graph.

3. An image generating method, wherein an image is formed by generating a recurrent pattern of tiles, comprising the steps of:

accepting as parameters, at least one of settings of a width and a height of each of said tiles, a shift of a reference position in an arrangement of said tiles, a thickness of an edge line of said each tile, recurrence numbers of said tiles in vertical and lateral directions, recurring colors of said tiles, and a color of said edge line;

accepting variant magnitudes for at least one of the respective parameters; and forming said image by generating the recurrent pattern of said tiles in which the set parameters are varied, for the individual tiles, by the corresponding variant magnitudes varied using random numbers for the individual tiles.

4. An environmental mapping method, wherein a two-dimensional image is mapped on a three-dimensional object arranged in a three-dimensional space, in such a manner that a scene around the three-dimensional object in the three-dimensional space is generated, comprising the steps of:

generating six tetragonal images which are obtained in six directions viewed forwards and backwards, rightwards and leftwards, and upwards and downwards from a center position of said three-dimensional object within said three-dimensional space said forwards direction corresponding to a predetermined direction set on said three-dimensional space;

laterally arraying four of the generated images, the forward, backward, rightward and leftward images in either of an order of said forward, rightward, backward and leftward images or an order of said leftward, rearward, rightward and forward images;

converting each of two of said generated images into four triangular images partitioned by two diagonal lines;

transforming each of the resulting eight triangular images into a tetragonal image one line of which corresponds to one line of the tetragonal image before the conversion, two opposing lines of which correspond to two lines constituting said diagonal lines, and a remaining line of which corresponds to an intersection point of said diagonal lines;

generating a single image in which the eight tetragonal images resulting from said eight triangular images are respectively arranged over and under said four images of said forward, backward, rightward and leftward images laterally arrayed, so that corresponding lines in a hexahedron composed of said six tetragonal images of said forward, backward, rightward, leftward, upward and downward images may come into agreement; and mapping the single generated image on said three-dimensional object.

5. An environmental mapping method as defined in claim 4, further comprising the step of subjecting said four images of said forward, backward, rightward and leftward images and the four upper and four lower triangular images an elongation processes.

6. A three-dimensional graphic generation method, wherein a two-dimensional image is mapped on a surface of a three-dimensional object, and an image of the three-dimensional object with the two-dimensional image mapped thereon, the three-dimensional image being formed on an assumed camera screen, is generated comprising the steps of:

determining a resolution of said two-dimensional image to-be-mapped in accordance with a positional relationship between said assumed camera screen and said three-dimensional object;

accepting vector representation data which stipulate an image pattern of two dimensions;

generating the two-dimensional image of the determined resolution from said image pattern which is stipulated by the accepted vector representation data;

mapping the generated two-dimensional image on said surface of said three-dimensional object; and generating said image of said three-dimensional object with said two-dimensional image mapped thereon, said three-dimensional image being formed on said assumed camera screen.

7. A three-dimensional graphic generation method as defined in claim 6, wherein said step of determining a resolution of said image includes:

finding a projected image of said three-dimensional object on said assumed camera screen in accordance with said positional relationship between said assumed camera screen and said three-dimensional object;

calculating a size of the found projected image of said three-dimensional object; and obtaining a resolution of the calculated projected image, and determining a resolution equal to the obtained resolution of said projected image as said resolution of said two-dimensional image to-be-mapped.

8. A texture mapping method, wherein a two-dimensional image is mapped on a surface of a three-dimensional object, comprising the steps of:

determining a plurality of directions as mapping directions in which said two-dimensional image is to be mapped on said three-dimensional object;

calculating a direction normal to said surface of said three-dimensional object on which said two-dimensional image is to be mapped;

selecting a direction which is most closely aligned with the calculated normal direction of said surface of said three-dimensional object, from among the plurality of predetermined mapping directions; and mapping said two-dimensional image on said surface of said three-dimensional object in the selected mapping direction.

9. A three-dimensional graphic generation method, wherein an image of a three-dimensional object which is arranged in an assumed three-dimensional space and which is stipulated by a definition of the three-dimensional object as well as definitions of optical characteristics, the image being formed on an assumed camera screen arranged in the three-dimensional space, is generated, comprising the steps of:

determining depths of respective points on surfaces of said three-dimensional objects relative to said camera screen from the definitions of shapes of said three-dimensional objects, thereby obtaining those points of said surface of said three-dimensional object which are to be formed on said camera screen; and determining colors only of the obtained points of said surface of said three-dimensional object to be formed on said camera screen, with ray tracing.

10. A three-dimensional graphic generation method, wherein an image is generated, the generated image is mapped on a surface of a three-dimensional object, and an image of the three-dimensional object formed on an assumed camera screen is generated, comprising the step of:

generating a two-dimensional image wherein a cursor is displayed on a display screen to generate an image in which a first point is located by the displayed cursor and points vicinal to the first point are drawn;

said generating a two-dimensional shape step comprising the steps of:
determining a relationship between a density and a distance of said vicinal points from the first point, and
generating an image in which said first point and said points vicinal to said first point are drawn at the density conforming to the determined relationship;

mapping the generated two-dimensional image on said surface of said three-dimensional object;

varying either normal lines or positions of points of said surface of said three-dimensional object in accordance with densities of those points on said two-dimensional image which have been mapped on said points of said surface; and generating the image of the resulting three-dimensional object formed on said assumed camera screen.

11. A rendering apparatus which generates an image of a three-dimensional object formed on an assumed camera screen comprising:

texture data memory for storing therein vector representation data which stipulate image patterns of two dimensions;

three-dimensional scene data memory for storing therein shape data which stipulate shapes of three-dimensional objects;

input unit for accepting a designation of a positional relationship between said camera screen and a subject;

texture supply means for determining a resolution of a two-dimensional image in accordance with the shape data fetched from said three-dimensional scene data memory and said positional relationship accepted by said input, and for generating said two-dimensional image of the determined resolution from the vector representation data stored in said texture data memory; and texture mapping unit for generating the image of the three-dimensional object with the generated two-dimensional image mapped thereon, said image being formed on said assumed camera screen.

12. A rendering apparatus as defined in claim 11, wherein:
said input accepts a texture generation procedure which contains a designation of the two-dimensional image pattern to be used, and designations of attributes of said two-dimensional image pattern to be generated; and
said texture supply unit fetches from said texture data memory the vector representation data which stipulate said image pattern designated by said texture generation procedure accepted by said input, and generates said two-dimensional image in accordance with said attributes designated by said texture generation procedure.

13. A rendering apparatus as defined in claim 12, wherein the plurality of image patterns stored by said texture data memory are character fonts of a plurality of characters, and said designation of said image pattern to be used in said mapping, by said texture generation procedure is a designation using a character code of the font to be used as said image pattern in said mapping.

14. A rendering apparatus as defined in claim 11, wherein said texture supply unit includes:
projection image calculator for finding a projected image of said subject on said camera screen, in accordance with said shape data stored in said three-dimensional scene data memory and said positional relationship accepted by said input;

projection image resolution calculator for calculating a size of said projected image found by said projection image calculator, thereby obtaining a resolution of said projected image; and texture generation unit for generating said two-dimensional image of the resolution equal to said resolution of said projected image obtained by said projection image resolution calculator, from said vector representation data stored in said texture data memory.

15. A rendering apparatus which generates an image of a three-dimensional object arranged in an assumed three-dimensional space, the image being formed on an assumed camera screen arranged in the three-dimensional space comprising:

three-dimensional scene data memory for storing therein shape data defining shapes of three-dimensional objects, and optical data defining optical characteristics of the three-dimensional objects;

hidden-surface removal unit for deciding depths of respective points on surfaces of said three-dimensional objects relative to said camera screen from the shape data stored in said three-dimensional scene data memory, thereby obtaining those points of said surface of the three-dimensional object which are to be formed on said camera screen;

ray tracing unit for obtaining intersection points between said three-dimensional objects and either/both of reflected light rays and refracted light rays at those obtained points of said surface of said three-dimensional object which are to be formed on said camera screen;

shading unit for finding colors of said points of said surface of said three-dimensional object to be formed on said camera screen, by the use of the optical data stored in said three-dimensional scene data memory for said points to-be-formed and those points of said surfaces of said three-dimensional objects which intersect with either/both of said reflected light rays and said refracted light rays at said points to-be-formed; and image generator in which said colors found by said shading unit are formed on those points of said surface of said three-dimensional object to be formed on said camera screen which have been obtained by said hidden-surface removal unit.

16. A rendering apparatus as defined in claim 15, wherein said hidden-surface removal unit projects said surfaces of said three-dimensional objects on said camera screen, and sets points of the smallest depths relative to said camera screen among those points of said surfaces of said three-dimensional objects which are projected on points existing within the projected image, as said those points of said surface of said three-dimensional object which are to be formed on said camera screen.

17. A rendering apparatus as defined in claim 15, wherein said hidden-surface removal unit rearranges said respective points of said surfaces of said three-dimensional objects so as to be arrayed in succession relative to said camera screen, and sets foremost points among said points of individual camera screens, as points of said surface of said three-dimensional object which are to be formed on said camera screen.

18. In a three-dimensional graphic system having scene origination equipment which generates shape data stipulating a shape of a three-dimensional object, a rendering apparatus which generates an image of the three-dimensional object arranged in an assumed three-dimensional space by the use of the shape data, the image being formed on an assumed camera screen arranged in the three-dimensional space, and a display device which displays the image of the three-dimensional object, comprising said scene origination equipment includes:
- means for displaying a cursor on a display screen of said display device;
- means for displaying on said display screen of said display device a graph which represents a relationship between a distance from a located point of said cursor and a density representing gray level of said located point;
- means for accepting a setting of a shape of the displayed graph on said display screen of said display device;
- means for determining said relationship between said distance from said located point of said cursor and said density representing gray level of said located point, in accordance with the accepted setting of said shape of said graph; and
- means for generating a two-dimensional image in which said generated point are formed at the density representing gray level conforming to the determined relationship; and said rendering apparatus includes:
- texture mapping means for mapping said two-dimensional image generated by said scene origination equipment, onto said three-dimensional object in said shape stipulated by said shape data generated by said scene origination equipment, and
- means for generating said image of the three-dimensional object with said two-dimensional image mapped thereon, said three-dimensional object image being formed on said assumed camera screen, and for displaying the generated image on said display screen on said display device.

19. A three-dimensional graphic system as defined in claim 18, wherein:

said rendering apparatus further includes:
- texture data memory means for storing therein vector representation data which stipulate image patterns of two dimensions;
- three-dimensional scene data memory means for storing therein the shape data;
- input means for accepting a designation of a positional relationship between said camera screen and the subject; and
- texture supply means for determining a resolution of a two-dimensional image in accordance with the shape data fetched from said three-dimensional scene data memory means and said positional relationship accepted by said input means, and for generating said two-dimensional image of the determined resolution from the vector representation data stored in said texture data memory means; and said texture mapping means has a function of mapping said two-dimensional image generated by said texture supply means, onto said three-dimensional object.

20. A three-dimensional graphic system as defined in claim 18, wherein said rendering apparatus further includes:
- means for generating optical data defining optical characteristics of said three-dimensional object on which said texture mapping means has mapped said two-dimensional image;
- three-dimensional scene data memory means for storing therein the shape data and the optical data;
- hidden-surface removal means for deciding depths of respective points on surfaces of the three-dimensional objects relative to said camera screen from said shape data stored in said three-dimensional scene data memory means, thereby obtaining points of a surface of said three-dimensional object which are to be formed on said camera screen;
- ray tracing means for obtaining intersection points between said three-dimensional objects and either/both of reflected light rays and refracted light rays at those obtained points of said surface of said three-dimensional object which are to be formed on said camera screen;
- shading means for finding colors of said points of said surface of said three-dimensional object to be formed on said camera screen, by the use of said optical data stored in said three-dimensional scene data memory means for said points to-be-formed and those points of said surfaces of said three-dimensional objects which intersect with either/both of said reflected light rays and said refracted light rays at said points to-be-formed; and
- means for generating the image in which said colors found by said shading means are formed on those points of said surface of said three-dimensional object to be formed on said camera screen which have been obtained by said hidden-surface removal means.

21. In a three-dimensional graphic system having a scene origination equipment which generates shape data stipulating a shape of a three-dimensional object, a rendering apparatus which generates an image of the three-dimensional object arranged in an assumed three-dimensional space by using the shape data, the image being formed on an assumed camera screen arranged in the three-dimensional space, and a display device which displays the image of the three-dimensional object, comprising said scene origination equipment includes:
- means for accepting as parameters, at least one of settings of a width and a height of each of tiles, a shift of a reference position in an arrangement of said tiles, a thickness of an edge line of said each tile, recurrence numbers of said tiles in vertical and lateral directions, recurring colors of said tiles, and a color of said edge line;
- means for accepting variant magnitudes for at least one of the respective parameters; and
- means for generating that image of the recurrent pattern of said tiles in which the set parameters are varied, for the individual tiles, by the corresponding variant magnitudes varied using random numbers for the individual tiles; and said rendering apparatus includes:
- means for mapping said image generated by said scene origination equipment, onto said three-dimensional object in said shape defined by said scene origination equipment; and
- means for generating said image of the three-dimensional object with said image mapped thereon, said image being formed on said assumed camera screen, and for displaying the generated image on said display screen on said display device.

22. A three-dimensional graphic system as defined in claim 21, wherein:

said rendering apparatus further includes:

texture data memory means for storing therein vector representation data which stipulate image patterns of two dimensions;

three-dimensional scene data memory means for storing therein the shape data;

input means for accepting a designation of a positional relationship between said camera screen and the subject; and texture supply means for determining a resolution of a two-dimensional image in accordance with the shape data fetched from said three-dimensional scene data memory means and said positional relationship accepted by said input means, and for generating said two-dimensional image of the determined resolution from the vector representation data stored in said texture data memory means; and said texture mapping means has a function of mapping said two-dimensional image generated by said texture supply means, onto said three-dimensional object.

23. A three-dimensional graphic system as defined in claim 21, wherein said rendering apparatus further includes:

means for generating optical data defining optical characteristics of said three-dimensional object on which said texture mapping means has mapped said two-dimensional image;

three-dimensional scene data memory means for storing therein the shape data and the optical data;

hidden-surface removal means for deciding depths of respective points on surfaces of the three-dimensional objects relative to said camera screen from said shape data stored in said three-dimensional scene data memory means, thereby obtaining those points of a surface of said three-dimensional object which are to be formed on said camera screen;

ray tracing means for obtaining intersection points between said three-dimensional objects and either/both of reflected light rays and refracted light rays at those points of said surface of said three-dimensional object which are to be formed on said camera screen;

shading means for finding colors of said points of said surface of said three-dimensional objects to be formed on said camera screen, by the use of said optical data stored in said three-dimensional scene data memory means for said points to-be-formed and those points of said surfaces of said three-dimensional objects which intersect with either/both of said reflected light rays and said refracted light rays at said points to-be-formed; and means for generating the image in which said colors found by said shading means are formed on those points of said surface of said three-dimensional object to be formed on said camera screen which have been obtained by said hidden-surface removal means.

24. A three-dimensional graphic system comprising:

a scene origination equipment;

a rendering apparatus which generates an image of a three-dimensional object formed on an assumed camera screen;

said rendering apparatus comprising:

texture data memory for storing therein vector representation data which stipulate image patterns of two dimensions, three-dimensional scene data memory for storing therein shape data which stimulate shapes of three-dimensional objects, an input for accepting a designation of a positional relationship between said camera screen and a subject, texture supply unit for determining a resolution of a two-dimensional image in accordance with the shape data fetched from said three-dimensional scene data memory and said positional relationship accepted by said input, and for generating said two-dimensional image of the determined resolution from the vector representation data stored in said texture data memory, and texture mapping unit for generating the image of the three-dimensional object with the generated two-dimensional image mapped thereon, said image being formed on said assumed camera screen; and a display device;

said scene origination equipment includes:

user interface control means for interactually accepting a designation of an image pattern of two dimensions to be used as a texture, and designations of attributes of said texture to be generated, and procedure origination means for originating a texture generation procedure which contains said designation of the texture pattern and said designations of the texture attributes accepted by said user interface control means;

said input means of said rendering apparatus accepts said texture generation procedure originated by said procedure origination means of said scene origination equipment;

said texture supply means fetches from said texture data memory the vector representation data which stipulate the two-dimensional image pattern designated by said texture generation procedure, and generates said two-dimensional image in accordance with said attributes designated by said texture generation procedure; and said display device displays said image of said subject generated by said texture mapping unit of said rendering apparatus.

25. A three-dimensional graphic system as defined in claim 24, wherein:

said user interface control means of said scene origination equipment interactually accepts said designation of said positional relationship between said camera screen and said subject and a designation of a three-dimensional shape of said subject, in addition to said designation of said image pattern to be used as said texture and said designations of said attributes of said texture to be generated;

said procedure origination means originates a three-dimensional scene generation procedure which contains the originated texture generation procedure, and said designation of said positional relationship between said camera screen and said subject and said designation of said three-dimensional shape of said subject, the designations having been accepted by said user interface control means;

said input means of said rendering apparatus accepts said three-dimensional scene generation procedure originated by said procedure origination means of said scene origination equipment; and said texture supply means fetches the subject data from said three-dimensional scene data memory means in accordance with said designation of said three-dimensional shape contained in said three-dimensional scene generation procedure accepted by said input means, so as to determine said resolution of said two-dimensional image in accordance with the fetched subject data and said designation of said positional relationship between said camera screen and said subject contained in said three-dimensional scene generation procedure, and it fetches the vector representation data designated by said texture generation procedure, from said texture data memory so as to generate said two-dimensional image of the determined resolution in accordance with said attributes designated by said texture generation procedure.

26. A three-dimensional graphic system as defined in claim 24, wherein:

the plurality of two-dimensional image patterns stored in said texture data memory are character fonts of a plurality of characters; and said user interface control means of said scene origination equipment accepts the designation of the character font to be used as said texture, in compliance with a designation of the character.

27. A three-dimensional graphic system as defined in claim 24, wherein said rendering apparatus executes in real time the generation and display of said two-dimensional image based on the designations accepted by said user interface control means of said scene origination equipment.

* * * * *